US010318541B2

United States Patent
Bingham et al.

(10) Patent No.: US 10,318,541 B2
(45) Date of Patent: Jun. 11, 2019

(54) CORRELATING LOG DATA WITH PERFORMANCE MEASUREMENTS HAVING A SPECIFIED RELATIONSHIP TO A THRESHOLD VALUE

(71) Applicant: Splunk Inc., San Francisco, CA (US)

(72) Inventors: Brian Bingham, Denver, CO (US); Tristan Fletcher, Pleasant Hill, CA (US); Alok Anant Bhide, Mountain View, CA (US)

(73) Assignee: SPLUNK INC., San Francisco, CA (US)

( * ) Notice: Subject to any disclaimer, the term of this patent is extended or adjusted under 35 U.S.C. 154(b) by 0 days.

(21) Appl. No.: 15/421,395

(22) Filed: Jan. 31, 2017

(65) Prior Publication Data

US 2017/0255683 A1     Sep. 7, 2017

Related U.S. Application Data

(63) Continuation-in-part of application No. 14/167,316, filed on Jan. 29, 2014, now abandoned, which is a
(Continued)

(51) Int. Cl.
*G06F 16/248* (2019.01)
*G06F 3/0484* (2013.01)
(Continued)

(52) U.S. Cl.
CPC .......... *G06F 16/248* (2019.01); *G06F 3/0482* (2013.01); *G06F 3/04847* (2013.01);
(Continued)

(58) Field of Classification Search
CPC ......... G06F 17/30554; G06F 2201/875; G06F 3/0482
See application file for complete search history.

(56) References Cited

U.S. PATENT DOCUMENTS

| | | | |
|---|---|---|---|
| 4,956,774 | A | 9/1990 | Shibamiya et al. |
| 5,121,443 | A | 6/1992 | Tomlinson et al. |

(Continued)

FOREIGN PATENT DOCUMENTS

| | | |
|---|---|---|
| EP | 1480100 A1 | 11/2004 |
| KR | 100745483 B1 | 8/2007 |

(Continued)

OTHER PUBLICATIONS

Final Office Action dated Aug. 11, 2017 for U.S. Appl. No. 15/421,348 of Bingham et al. filed Jan. 31, 2017.
(Continued)

*Primary Examiner* — Elias Desta
(74) *Attorney, Agent, or Firm* — Shook, Hardy & Bacon, L.L.P.

(57) ABSTRACT

The disclosed system and method acquire and store performance measurements relating to performance of a component in an information technology (IT) environment and log data produced by the IT environment, in association with corresponding time stamps. The disclosed system and method correlate at least one of the performance measurements with at least one of the portions of log data.

30 Claims, 27 Drawing Sheets

Related U.S. Application Data continuation-in-part of application No. 13/874,423, filed on Apr. 30, 2013, now Pat. No. 8,904,389, and a continuation-in-part of application No. 13/874,434, filed on Apr. 30, 2013, now Pat. No. 8,683,467, and a continuation-in-part of application No. 13/874,441, filed on Apr. 30, 2013, now Pat. No. 9,164,786, and a continuation-in-part of application No. 13/874,448, filed on Apr. 30, 2013, now Pat. No. 9,495,187, application No. 15/421,395, which is a continuation-in-part of application No. 14/801,721, filed on Jul. 16, 2015, now Pat. No. 9,754,395, which is a continuation of application No. 14/253,548, filed on Apr. 15, 2014, now Pat. No. 9,142,049, which is a continuation-in-part of application No. 14/167,316, filed on Jan. 29, 2014, now abandoned, and a continuation-in-part of application No. 13/874,423, filed on Apr. 30, 2013, now Pat. No. 8,904,389, and a continuation-in-part of application No. 13/874,434, filed on Apr. 30, 2013, now Pat. No. 8,683,467, and a continuation-in-part of application No. 13/874,441, filed on Apr. 30, 2013, now Pat. No. 9,164,786, and a continuation-in-part of application No. 13/874,448, filed on Apr. 30, 2013, now Pat. No. 9,495,187.

(60) Provisional application No. 61/883,869, filed on Sep. 27, 2013, provisional application No. 61/900,700, filed on Nov. 6, 2013, provisional application No. 61/979,484, filed on Apr. 14, 2014.

(51) Int. Cl.
  *G06F 3/0482* (2013.01)
  *G06F 9/455* (2018.01)
  *G06F 11/32* (2006.01)
  *G06F 16/26* (2019.01)
  *G06F 11/34* (2006.01)

(52) U.S. Cl.
  CPC ........ *G06F 9/45533* (2013.01); *G06F 11/323* (2013.01); *G06F 16/26* (2019.01); *G06F 11/3409* (2013.01); *G06F 2201/815* (2013.01)

(56) References Cited

U.S. PATENT DOCUMENTS

| | | |
|---|---|---|
| 5,276,629 A | 1/1994 | Reynolds |
| 5,347,540 A | 9/1994 | Karrick |
| 5,414,838 A | 5/1995 | Kolton et al. |
| 5,613,113 A | 3/1997 | Goldring |
| 5,627,886 A | 5/1997 | Bowman |
| 5,737,600 A | 4/1998 | Geiner et al. |
| 5,745,693 A | 4/1998 | Knight et al. |
| 5,751,965 A | 5/1998 | Mayo et al. |
| 5,761,652 A | 6/1998 | Wu et al. |
| 5,847,972 A | 12/1998 | Eick et al. |
| 5,951,541 A | 9/1999 | Simpson et al. |
| 5,953,439 A | 9/1999 | Ishihara et al. |
| 5,960,434 A | 9/1999 | Schimmel |
| 6,088,717 A | 7/2000 | Reed et al. |
| 6,115,705 A | 9/2000 | Larson |
| 6,137,283 A | 10/2000 | Williams et al. |
| 6,212,494 B1 | 4/2001 | Boguraev |
| 6,341,176 B1 | 1/2002 | Shirasaki et al. |
| 6,363,131 B1 | 3/2002 | Beidas et al. |
| 6,449,618 B1 | 9/2002 | Blott et al. |
| 6,490,553 B2 | 12/2002 | Van Thong et al. |
| 6,496,831 B1 | 12/2002 | Baulier et al. |
| 6,516,189 B1 | 2/2003 | Frangione et al. |
| 6,598,078 B1 | 7/2003 | Ehrlich et al. |
| 6,598,087 B1 | 7/2003 | Dixon, III et al. |
| 6,604,114 B1 | 8/2003 | Toong et al. |
| 6,658,367 B2 | 12/2003 | Conrad |
| 6,658,487 B1 | 12/2003 | Smith |
| 6,662,176 B2 | 12/2003 | Brunet et al. |
| 6,678,674 B1 | 1/2004 | Saeki |
| 6,751,228 B1 | 6/2004 | Okamura et al. |
| 6,760,903 B1 | 7/2004 | Morshed et al. |
| 6,763,347 B1 | 7/2004 | Zhang |
| 6,768,994 B1 | 7/2004 | Howard et al. |
| 6,789,046 B1 | 9/2004 | Murstein et al. |
| 6,907,422 B1 | 6/2005 | Predovic et al. |
| 6,907,545 B2 | 6/2005 | Ramadei et al. |
| 6,920,468 B1 | 7/2005 | Cousins et al. |
| 6,951,541 B2 | 10/2005 | Desmarais |
| 6,980,963 B1 | 12/2005 | Hanzek |
| 6,993,246 B1 | 1/2006 | Pan et al. |
| 7,035,925 B1 | 4/2006 | Nareddy et al. |
| 7,069,176 B2 | 6/2006 | Swaine et al. |
| 7,084,742 B2 | 8/2006 | Haines |
| 7,085,682 B1 | 8/2006 | Heller et al. |
| 7,127,456 B1 | 10/2006 | Brown et al. |
| 7,146,416 B1 | 12/2006 | Yoo et al. |
| 7,184,777 B2 | 2/2007 | Diener et al. |
| 7,231,403 B1 | 6/2007 | Howitt et al. |
| 7,301,603 B2 | 11/2007 | Chen et al. |
| 7,379,999 B1 | 5/2008 | Zhou et al. |
| 7,437,266 B2 | 10/2008 | Ueno et al. |
| 7,454,761 B1 | 11/2008 | Roberts |
| 7,457,872 B2 | 11/2008 | Aton et al. |
| 7,493,304 B2* | 2/2009 | Day ................. G06F 17/30477 |
| 7,546,553 B2 | 6/2009 | Bozak et al. |
| 7,565,425 B2 | 7/2009 | Van Vleet et al. |
| 7,580,938 B1 | 8/2009 | Pai et al. |
| 7,580,944 B2 | 8/2009 | Zhuge et al. |
| 7,593,953 B1 | 9/2009 | Malalur |
| 7,617,314 B1 | 11/2009 | Bansod et al. |
| 7,620,697 B1 | 11/2009 | Davies |
| 7,627,544 B2 | 12/2009 | Chkodrov et al. |
| 7,673,340 B1 | 3/2010 | Cohen et al. |
| 7,685,109 B1 | 3/2010 | Ransil et al. |
| 7,747,641 B2 | 6/2010 | Kim et al. |
| 7,783,750 B1 | 8/2010 | Casey et al. |
| 7,810,155 B1 | 10/2010 | Ravi |
| 7,827,182 B1 | 11/2010 | Panigrahy et al. |
| 7,856,441 B1 | 12/2010 | Kraft et al. |
| 7,885,954 B2 | 2/2011 | Barsness et al. |
| 7,895,167 B2 | 2/2011 | Berg et al. |
| 7,937,164 B2* | 5/2011 | Samardzija ........ G05B 23/021 700/108 |
| 7,962,489 B1 | 6/2011 | Chiang et al. |
| 7,970,934 B1 | 6/2011 | Patel |
| 7,974,728 B2 | 7/2011 | Lin et al. |
| 7,979,439 B1 | 7/2011 | Nordstrom et al. |
| 7,991,758 B2 | 8/2011 | Beeston et al. |
| 8,005,992 B1 | 8/2011 | Pichumani et al. |
| 8,031,634 B1 | 10/2011 | Artzi et al. |
| 8,046,749 B1 | 10/2011 | Owen et al. |
| 8,112,425 B2 | 2/2012 | Baum et al. |
| 8,301,603 B2 | 10/2012 | Kan et al. |
| 8,321,448 B2 | 11/2012 | Zeng et al. |
| 8,601,112 B1 | 12/2013 | Nordstrom et al. |
| 8,645,390 B1 | 2/2014 | Oztekin et al. |
| 8,683,467 B2 | 3/2014 | Bingham et al. |
| 8,707,194 B1 | 4/2014 | Jenkins et al. |
| 8,793,118 B2 | 7/2014 | Srinivasa et al. |
| 8,813,039 B2 | 8/2014 | Maczuba |
| 8,825,623 B2 | 9/2014 | Samuelson et al. |
| 8,904,299 B1 | 12/2014 | Owen et al. |
| 8,904,389 B2 | 12/2014 | Bingham et al. |
| 8,909,622 B1 | 12/2014 | Emigh et al. |
| 8,924,376 B1 | 12/2014 | Lee |
| 8,990,184 B2 | 3/2015 | Baum et al. |
| 9,002,854 B2 | 4/2015 | Baum et al. |
| 9,037,555 B2 | 5/2015 | Genest et al. |
| 9,043,185 B2 | 5/2015 | Bender et al. |
| 9,047,352 B1 | 6/2015 | Dong et al. |
| 9,128,995 B1 | 9/2015 | Fltecher et al. |
| 9,130,832 B1 | 9/2015 | Boe et al. |
| 9,130,860 B1 | 9/2015 | Boe et al. |

(56) References Cited

U.S. PATENT DOCUMENTS

| | | |
|---|---|---|
| 9,146,954 B1 | 9/2015 | Boe et al. |
| 9,146,962 B1 | 9/2015 | Boe et al. |
| 9,152,726 B2 | 10/2015 | Lymperopoulos et al. |
| 9,158,811 B1 | 10/2015 | Choudhary et al. |
| 9,164,786 B2 | 10/2015 | Bingham et al. |
| 9,208,463 B1 | 12/2015 | Bhide et al. |
| 9,256,501 B1 | 2/2016 | Rahut |
| 9,294,361 B1 | 3/2016 | Choudhary et al. |
| 9,420,050 B1 | 8/2016 | Sakata et al. |
| 9,465,713 B2 * | 10/2016 | Tonouchi ............ G06F 11/3409 |
| 9,495,187 B2 | 11/2016 | Bingham et al. |
| 9,514,175 B2 | 12/2016 | Swan et al. |
| 9,521,047 B2 | 12/2016 | Alekseyev et al. |
| 9,590,877 B2 | 3/2017 | Choudhary et al. |
| 9,594,789 B2 | 3/2017 | Baum |
| 9,740,755 B2 | 8/2017 | Lamas et al. |
| 9,767,197 B1 | 9/2017 | Agarwal et al. |
| 9,785,417 B2 | 10/2017 | Crossley et al. |
| 9,785,714 B2 | 10/2017 | Gabriel |
| 2001/0044795 A1 | 11/2001 | Cohen et al. |
| 2002/0042821 A1 | 4/2002 | Muret et al. |
| 2002/0069223 A1 | 6/2002 | Goodisman et al. |
| 2002/0129137 A1 | 9/2002 | Mills, III et al. |
| 2002/0154175 A1 | 10/2002 | Abello et al. |
| 2002/0169735 A1 | 11/2002 | Kil et al. |
| 2003/0014399 A1 | 1/2003 | Hansen et al. |
| 2003/0018435 A1 | 1/2003 | Jenner et al. |
| 2003/0037034 A1 | 2/2003 | Daniels et al. |
| 2003/0074401 A1 | 4/2003 | Connell et al. |
| 2003/0110186 A1 | 6/2003 | Markowski et al. |
| 2003/0120593 A1 | 6/2003 | Bansal et al. |
| 2003/0141879 A1 | 7/2003 | Wilsher |
| 2003/0154192 A1 | 8/2003 | Laborde et al. |
| 2003/0182310 A1 | 9/2003 | Charnock et al. |
| 2003/0204698 A1 | 10/2003 | Sachedina et al. |
| 2004/0024773 A1 | 2/2004 | Stoffel et al. |
| 2004/0034795 A1 | 2/2004 | Anderson et al. |
| 2004/0122656 A1 | 6/2004 | Abir |
| 2004/0143602 A1 | 7/2004 | Ruiz et al. |
| 2004/0169688 A1 | 9/2004 | Burdick et al. |
| 2004/0170392 A1 | 9/2004 | Lu et al. |
| 2004/0194141 A1 | 9/2004 | Sanders |
| 2004/0243618 A1 | 12/2004 | Malaney et al. |
| 2004/0254919 A1 | 12/2004 | Giuseppini |
| 2004/0267691 A1 | 12/2004 | Vasudeva |
| 2005/0010564 A1 | 1/2005 | Metzger et al. |
| 2005/0015624 A1 | 1/2005 | Ginter et al. |
| 2005/0021736 A1 | 1/2005 | Carusi et al. |
| 2005/0022207 A1 | 1/2005 | Grabarnik et al. |
| 2005/0033803 A1 | 2/2005 | Vleet et al. |
| 2005/0055357 A1 | 3/2005 | Campbell |
| 2005/0071379 A1 | 3/2005 | Kekre et al. |
| 2005/0076067 A1 | 4/2005 | Bakalash et al. |
| 2005/0080806 A1 | 4/2005 | Doganata et al. |
| 2005/0114707 A1 | 5/2005 | DeStefano et al. |
| 2005/0138111 A1 | 6/2005 | Aton et al. |
| 2005/0177372 A1 | 8/2005 | Wang et al. |
| 2005/0203888 A1 | 9/2005 | Woosley et al. |
| 2005/0235356 A1 | 10/2005 | Wang |
| 2005/0273281 A1 | 12/2005 | Wall et al. |
| 2005/0289540 A1 | 12/2005 | Nguyen et al. |
| 2006/0004731 A1 | 1/2006 | Seibel et al. |
| 2006/0004909 A1 | 1/2006 | Takuwa et al. |
| 2006/0026164 A1 | 2/2006 | Jung et al. |
| 2006/0048101 A1 | 3/2006 | Krassovsky et al. |
| 2006/0059238 A1 | 3/2006 | Slater et al. |
| 2006/0069717 A1 | 3/2006 | Mamou et al. |
| 2006/0085163 A1 | 4/2006 | Nader |
| 2006/0143175 A1 | 6/2006 | Ukrainczyk et al. |
| 2006/0153097 A1 | 7/2006 | Schultz et al. |
| 2006/0161816 A1 | 7/2006 | Gula et al. |
| 2006/0184529 A1 | 8/2006 | Gal Berg et al. |
| 2006/0184615 A1 | 8/2006 | Park et al. |
| 2006/0197766 A1 | 9/2006 | Raz |
| 2006/0197768 A1 | 9/2006 | Van Hook et al. |
| 2006/0198359 A1 | 9/2006 | Fok et al. |
| 2006/0218278 A1 | 9/2006 | Uyama et al. |
| 2006/0224254 A1 | 10/2006 | Rumi et al. |
| 2006/0224583 A1 | 10/2006 | Fikes et al. |
| 2006/0229931 A1 | 10/2006 | Fligler et al. |
| 2006/0265406 A1 | 11/2006 | Chkodrov et al. |
| 2007/0027612 A1 | 2/2007 | Barfoot et al. |
| 2007/0033632 A1 | 2/2007 | Baynger et al. |
| 2007/0038603 A1 | 2/2007 | Guha |
| 2007/0038889 A1 | 2/2007 | Wiggins et al. |
| 2007/0043562 A1 | 2/2007 | Holsinger et al. |
| 2007/0043704 A1 | 2/2007 | Raub et al. |
| 2007/0067575 A1 | 3/2007 | Morris et al. |
| 2007/0073519 A1 | 3/2007 | Long |
| 2007/0073743 A1 | 3/2007 | Bammi et al. |
| 2007/0100873 A1 | 5/2007 | Yako et al. |
| 2007/0113031 A1 | 5/2007 | Brown et al. |
| 2007/0124437 A1 | 5/2007 | Chervets et al. |
| 2007/0156786 A1 | 7/2007 | May et al. |
| 2007/0156789 A1 | 7/2007 | Semerdzhiev et al. |
| 2007/0192300 A1 | 8/2007 | Reuther et al. |
| 2007/0255529 A1 | 11/2007 | Biazetti et al. |
| 2007/0283194 A1 | 12/2007 | Villella et al. |
| 2008/0077558 A1 | 3/2008 | Lawrence et al. |
| 2008/0083314 A1 | 4/2008 | Hayashi et al. |
| 2008/0184110 A1 | 7/2008 | Barsness et al. |
| 2008/0215546 A1 | 9/2008 | Baum et al. |
| 2008/0279113 A1 | 11/2008 | Kalliola et al. |
| 2008/0319975 A1 | 12/2008 | Morris et al. |
| 2009/0083314 A1 | 3/2009 | Maim |
| 2009/0172014 A1 | 7/2009 | Huetter |
| 2009/0172666 A1 | 7/2009 | Yahalom et al. |
| 2009/0182866 A1 | 7/2009 | Watanabe et al. |
| 2009/0192982 A1 | 7/2009 | Samuelson et al. |
| 2009/0237404 A1 | 9/2009 | Cannon, III et al. |
| 2009/0259628 A1 | 10/2009 | Farrell et al. |
| 2009/0271511 A1 | 10/2009 | Peracha |
| 2010/0205212 A1 | 8/2010 | Quadracci et al. |
| 2010/0223619 A1 | 9/2010 | Jaquet et al. |
| 2010/0332661 A1 | 12/2010 | Tameshige et al. |
| 2011/0055256 A1 | 3/2011 | Phillips et al. |
| 2011/0161851 A1 | 6/2011 | Barber et al. |
| 2011/0179160 A1 | 7/2011 | Liu et al. |
| 2011/0261055 A1 | 10/2011 | Wong et al. |
| 2011/0298804 A1 | 12/2011 | Hao et al. |
| 2011/0307905 A1 | 12/2011 | Essey et al. |
| 2012/0022707 A1 | 1/2012 | Budhraja et al. |
| 2012/0036484 A1 | 2/2012 | Zhang et al. |
| 2012/0120078 A1 | 5/2012 | Hubbard et al. |
| 2012/0124503 A1 | 5/2012 | Coimbatore et al. |
| 2012/0174097 A1 | 7/2012 | Levin |
| 2012/0216135 A1 | 8/2012 | Wong et al. |
| 2012/0221314 A1 | 8/2012 | Bourlatchkov et al. |
| 2012/0278292 A1 | 11/2012 | Zahavi et al. |
| 2012/0284713 A1 | 11/2012 | Ostermeyer et al. |
| 2012/0311153 A1 | 12/2012 | Morgan et al. |
| 2012/0311475 A1 | 12/2012 | Wong |
| 2012/0317266 A1 | 12/2012 | Abbott |
| 2012/0323941 A1 | 12/2012 | Chkodrov et al. |
| 2013/0007261 A1 | 1/2013 | Dutta et al. |
| 2013/0030764 A1 * | 1/2013 | Chatterjee ........... G06F 11/3409 |
| | | 702/182 |
| 2013/0055092 A1 | 2/2013 | Cannon, III et al. |
| 2013/0124714 A1 | 5/2013 | Bednar et al. |
| 2013/0204948 A1 | 8/2013 | Zeyliger et al. |
| 2013/0247133 A1 | 9/2013 | Price et al. |
| 2013/0262347 A1 | 10/2013 | Dodson |
| 2013/0300747 A1 | 11/2013 | Wong et al. |
| 2013/0332594 A1 | 12/2013 | Dvir et al. |
| 2013/0346615 A1 | 12/2013 | Gondi |
| 2014/0040306 A1 | 2/2014 | Gluzman Peregrine et al. |
| 2014/0075029 A1 | 3/2014 | Lipchuk et al. |
| 2014/0214888 A1 | 7/2014 | Marquardt et al. |
| 2014/0280894 A1 | 9/2014 | Reynolds et al. |
| 2014/0324862 A1 | 10/2014 | Bingham et al. |
| 2014/0351217 A1 | 11/2014 | Bostock |
| 2015/0026167 A1 | 1/2015 | Neels et al. |
| 2015/0143180 A1 | 5/2015 | Dawson et al. |
| 2015/0149879 A1 | 5/2015 | Miller et al. |

(56) References Cited

U.S. PATENT DOCUMENTS

| | | |
|---|---|---|
| 2015/0154269 A1 | 6/2015 | Miller et al. |
| 2015/0178342 A1 | 6/2015 | Seering et al. |
| 2015/0293954 A1 | 10/2015 | Hsiao et al. |
| 2015/0295778 A1 | 10/2015 | Hsiao et al. |
| 2015/0339351 A1 | 11/2015 | Swan et al. |
| 2016/0019215 A1 | 1/2016 | Murphey et al. |
| 2016/0034555 A1 | 2/2016 | Rahut et al. |
| 2016/0055225 A1 | 2/2016 | Xu et al. |
| 2016/0070736 A1 | 3/2016 | Swan et al. |
| 2016/0125314 A1 | 5/2016 | Mulukutla et al. |
| 2016/0140128 A1 | 5/2016 | Swan et al. |
| 2016/0140238 A1 | 5/2016 | Swan et al. |
| 2016/0154836 A1 | 6/2016 | Swan et al. |
| 2016/0360382 A1 | 12/2016 | Gross et al. |
| 2017/0046402 A1 | 2/2017 | Swan et al. |
| 2017/0046403 A1 | 2/2017 | Swan et al. |
| 2017/0114810 A1 | 4/2017 | Angerhausen et al. |
| 2017/0139961 A1 | 5/2017 | Baum et al. |
| 2017/0139962 A1 | 5/2017 | Baum et al. |
| 2017/0139963 A1 | 5/2017 | Baum et al. |
| 2017/0139968 A1 | 5/2017 | Baum et al. |
| 2017/0337230 A1 | 11/2017 | Baum et al. |
| 2017/0337231 A1 | 11/2017 | Baum et al. |
| 2017/0344591 A1 | 11/2017 | Baum et al. |

FOREIGN PATENT DOCUMENTS

| | | |
|---|---|---|
| WO | 1997038376 A2 | 10/1997 |
| WO | 2003096220 A1 | 11/2003 |
| WO | 2008043082 A1 | 4/2008 |

OTHER PUBLICATIONS

Final Office Action dated Aug. 11, 2017 for U.S. Appl. No. 15/421,382 of Bingham et al. filed Jan. 31, 2017.
Advisory Action dated Sep. 14, 2017 for U.S. Appl. No. 15/421,412 of Bingham, B., et al. filed Jan. 31, 2017.
Final Office Action dated Aug. 25, 2017, for U.S. Appl. No. 15/421,353 of Bingham et al. filed Jan. 31, 2017.
Non-Final Office Action dated Aug. 18, 2017 for U.S. Appl. No. 14/167,316 of Bingham et al. filed Jan. 29, 2014.
Corrected Notice of Allowability dated Jul. 5, 2017, for U.S. Appl. No. 14/167,316 of Bingham et al. filed Jan. 29, 2014.
Non-Final Office Action dated Jun. 28, 2017, for U.S. Appl. No. 15/421,068 of Baum, M.J. et al. filed Jan. 31, 2017.
Non-Final Office Action dated Jun. 1, 2017, for U.S. Appl. No. 15/421,398 of Bingham et al. filed Jan. 31, 2007.
Non-Final Office Action dated Jun. 19, 2017, for U.S. Appl. No. 15/421,382 of Bingham et al. filed Jan. 31, 2017.
Notice of Allowance dated Jun. 15, 2017, for U.S. Appl. No. 15/420,938 of Baum, M.J. et al. filed Jan. 31, 2017.
Notice of Allowance dated Jun. 26, 2017, for U.S. Appl. No. 14/167,316 of Bingham et al. filed Jan. 29, 2014.
**Advisory Action dated Apr. 3, 2017, for U.S. Appl. No. 14/815,980 of Baum, M.J. et al. filed Aug. 1, 2015.
**Advisory Action dated Aug. 25, 2014, for U.S. Appl. No. 13/353,135 of Baum, M.J, et al. filed Jan. 18, 2012.
**Advisory Action dated Dec. 14, 2016, for U.S. Appl. No. 15/008,428 of Swan, E.K. et al. filed Jan. 27, 2016.
**Advisory Action dated Mar. 29, 2017, for U.S. Appl. No. 15/008,425 of Swan, E.K. et al. filed Jan. 27, 2016.
**Chinese Patent Office, Application No. 200780044899.5, Official Communication, dated Mar. 9, 2011.
Chinese Patent Office, Application No. 200780044899.5, Official Communication, dated Feb. 23, 2012.
**Chinese Patent Office, Application No. 201210293010.X Pending Claims dated May 4, 2016.
Chinese Patent Office, Application No. 201210293010.X Foreign Office Action dated Oct. 27, 2015.
**Chinese Patent Office, Application No. 201210293010.X Foreign Office Action dated May 4, 2016.
**Chinese Patent Office, Application No. 201210293010.X Pending Claims dated Oct. 27, 2015. (Splunk).
**European Patent Office, Application No. 07853813.9, Examination Report dated Mar. 15, 2010.
**European Patent Office, Application No. 07853813.9, Extended Search Report dated Dec. 11, 2009.
**European Patent Office, Application No. 07853813.9, Foreign Office Action dated Nov. 24, 2015.
**European Patent Office, Application No. 07853813.9, Foreign Official Communication dated Apr. 9, 2013.
**European Patent Office, Application No. 07853813.9, Pending Claims dated Nov. 24, 2015.
**European Patent Office, Application No. 12159074.9, Extended Search Report dated Jul. 4, 2012.
**European Patent Office, Application No. 12159074.9, Foreign Office Action dated Jun. 23, 2015.
**European Patent Office, Application No. 12159074.9, Pending Claims dated Jun. 23, 2015.
**Final Office Action dated Jan. 18, 2017, for U.S. Appl. No. 14/815,980 of Baum, M.J. et al. filed Aug. 1, 2015.
**Final Office Action dated Jan. 31, 2017, for U.S. Appl. No. 15/008,425 of Swan, E.K. et al. filed Jan. 27, 2016.
**Final Office Action dated Jul. 25, 2014, for U.S. Appl. No. 13/353,135 of Baum, M.J, et al. filed Jan. 18, 2012.
**Final Office Action dated Jul. 9, 2014, for U.S. Appl. No. 13/664,186, of Baum, M.J. et al. filed Oct. 30, 2012.
**Final Office Action dated May 13, 2011, for U.S. Appl. No. 11/868,370 of Baum, M.J. et al. filed Oct. 5, 2007.
**Final Office Action dated Oct. 13, 2016, for U.S. Appl. No. 15/008,428 of Swan, E.K. et al. filed Jan. 27, 2016.
**Final Office Action dated Sep. 10, 2013, for U.S. Appl. No. 13/664,186, of Baum, M.J. et al. filed Oct. 30, 2012.
**Final Office Action dated Sep. 20, 2013, for U.S. Appl. No. 13/353,135 of Baum, M.J, et al. filed Jan. 18, 2012.
**International Patent Office, Application No. PCT/US2006/029019, International Search Report and Written Opinion, dated Aug. 3, 2007.
**International Patent Office, Application No. PCT/US2007/080616, International Search Report and Written Opinion, dated Jun. 12, 2008.
**Japanese Patent Office, Application No. 2009-531632, Official Communication dated Jul. 27, 2012.
**Korean Patent Office, Application No. 10-2009-7009378, Official Communication, dated Jun. 21, 2012.
**Korean Patent Office, Application No. 10-2012-7009888, Official Communication, dated Feb. 15, 2013.
**Non-Final Office Action dated Apr. 22, 2016, for U.S. Appl. No. 15/007,176 of Swan, E.M. et al. filed Jan. 26, 2016.
**Non-Final Office Action dated Aug. 9, 2016, for U.S Appl. No. 15/008,425 of Swan, E.K. et al. filed Jan. 27, 2016.
**Non-Final Office Action dated Feb. 22, 2013, for U.S. Appl. No. 13/353,135 of Baum, M.J, et al. filed Jan. 18, 2012.
**Non-Final Office Action dated Feb. 25, 2013, for U.S. Appl. No. 13/664,186, of Baum, M.J. et al. filed Oct. 30, 2012.
**Non-Final Office Action dated Feb. 26, 2014, for U.S. Appl. No. 13/353,135 of Baum, M.J, et al. filed Jan. 18, 2012.
**Non-Final Office Action dated Jan. 27, 2014, for U.S. Appl. No. 13/664,186, of Baum, M.J. et al. filed Oct. 30, 2012.
**Non-Final Office Action dated Jul. 15, 2016, for U.S. Appl. No. 14/815,980 of Baum, M.J. et al. filed Aug. 1, 2015.
**Non-Final Office Action dated Jun. 2, 2016, for U.S. Appl. No. 14/611,170, of Baum, M.J. et al. filed Jan. 30, 2015.
**Non-Final Office Action dated Mar. 22, 2017, for U.S. Appl. No. 14/929,248 of Swan, E.M. et al. filed Oct. 30, 2015.
**Non-Final Office Action dated May 28, 2010, for U.S. Appl. No. 11/868,370 of Baum, M.J. et al. filed Oct. 5, 2007.
**Non-Final Office Action dated May 4, 2016, for U.S. Appl. No. 15/008,428 of Swan, E.K. et al. filed Jan. 27, 2016.
**Non-Final Office Action dated Nov. 25, 2010, for U.S. Appl. No. 11/868,370 of Baum, M.J. et al. filed Oct. 5, 2007.

(56) References Cited

OTHER PUBLICATIONS

\*\*Non-Final Rejection dated Mar. 20, 2017, for U.S. Appl. No. 15/008,428 of Swan, E.K. et al. filed Jan. 27, 2016.
\*\*Notice of Allowance dated Dec. 2, 2011, for U.S. Appl. No. 11/868,370 of Baum, M.J. et al. filed Oct. 5, 2007.
\*\*Notice of Allowance dated Jan. 9, 2015, for U.S. Appl. No. 13/664,186, of Baum, M.J. et al. filed Oct. 30, 2012.
\*\*Notice of Allowance dated Nov. 16, 2016, for U.S. Appl. No. 14/611,170, of Baum, M.J. et al. filed Jan. 30, 2015.
\*\*Notice of Allowance dated Nov. 26, 2014, for U.S. Appl. No. 13/353,135 of Baum, M.J, et al. filed Jan. 18, 2012.
\*\*Notice of Allowance dated Oct. 31, 2016, for U.S. Appl. No. 15/007,176 of Swan, E.M. et al. filed Jan. 26, 2016.
\*\*Bounsaythip, C et al., "Overview of Data Mining for Customer Behavior Modeling", VTT Information Technology, Research Report TTE1-2001-18, Retrieved from the Internet: <http://citeseerx.ist.psu.edu/viewdoc/download?doi10.1.1.22.3279&rep=rep1&type=pdf> [Sep. 20, 2010]., Jun. 29, 2001, 59 pages.
\*\*Cooley, R. et al., "Data Preparation for Mining World Wide Web Browing Patterns", Knowledge and Information Systems 1, Springer-Verlab, Retrieved from the Internet on Sep. 21, 2010: <http://citeseerx.ist.psu.edu/viewdoc/download?doi=10.1.1.161.5884&rep=rep1&type=pdf>.,1999, 25 pages.
\*\*Forlizzi, L. et al., "A data model and data structures for moving objects databases", SIGMOD Record, ACM, New York, NY, vol. 29, No. 2, XP002503045, Jun. 1, 2000, pp. 319-330.
\*\*Han, E.H. et al., "Text Categorization Using Weight Adjusted k-Nearest Neighbor Classification", PAKDD 2001, LNAI 2035, Retrieved from the Internet: <http://springlerlink.com/index25gnd0jb6nkIffhh.pdf> [Sep. 23, 2010]., 2001, pp. 23-65.
\*\*Kolovson, C. et al., "Indexing Techniques for Historical Databases", Proceedings of the Fifth International Conference on Data Engineering, Los Angeles, CA, IEEE Comput. Soc.,, Feb. 6-10, 1989, pp. 127-137.
\*\*Leung, T.Y.C. et al., "Query processing for temporal databases", Proceedings of the International Conference on Data Engineering, Los Angeles, IEEE, Comp. Soc. Press, vol. Conf. 6, XP010018207, Feb. 5-9, 1990, pp. 200-208.
\*\*Matsuo, Y. , "Keyword Extraction from a Single Document Using Word Co-Occurrence Statistical Information", Proceedings of the Sixteenth International Florida Artificual Intelligence Research Society Conference, Retrieved from the Internet: <http://www.aaai.org/Papers/FLAIRS/2003/Flairs03-076.pdf> [Sep. 27, 2010]., May 12-14, 2003, 5 pages.
\*\*Russel, S.J. et al., "Artificial Intelligence: A Modern Approach", 2nd Edition, Pearson Education, Inc., 2003, pp. 733-739.
\*\*Srivastava, J. et al., "Web Usage Mining: Discovery and Application of Usage Patterns from Web Data", ACM SIGKDD Explorations Newsletter, vol. 1, Issue <http://www.portal.acm.org/citation.cfm?is=846188>, retrieved Sep. 21, 2010., Jan. 2000, pp. 12-23.
\*\*Stamatatos, E. et al., "ext Genre Detection Using Common Word Frequencies", Proceedings of the 18th International Conference on Computational Linguistics, vol. 2, Retrieved on Sep. 23, 2010, from the Internet: <http://portal.acm/citation.cfm?id=992763>, 2000, pp. 808-814.
\*\*Witten, I.H. et al., "Data Mining: Practical Machine Learning Tools and Techniques with Java Implementations", Morgan Kaufmann Publishers, 2000, pp. 80-82, 114-118, 210-218, 220-227, 329-335.
Advisory Action dated Mar. 25, 2014, for U.S. Appl. No. 13/874,441 of Bingham et al. filed Apr. 30, 2013.
Corrected Notice of Allowability dated Feb. 11, 2014, for U.S. Appl. No. 13/874,434 of Bingham et al. filed Apr. 30, 2013.
Final Office Action dated Jan. 16, 2014, for U.S. Appl. No. 13/874,441 of Bingham et al. filed Apr. 30, 2013.
Final Office Action dated Jan. 28, 2015, for U.S. Appl. No. 13/874,448 of Bingham et al. filed Apr. 30, 2013.
Final Office Action date Jan. 6, 2014, for U.S. Appl. No. 13/874/423 of Bingham et al. filed Apr. 30, 2013.
Final Office Action dated Mar. 25, 2014, for U.S. Appl. No. 13/874,448 of Bingham et al. filed Apr. 30, 2013.
Non Final Office Action dated Apr. 27, 2017, for U.S. Appl. No. 15/421,412 of Bingham, B., et al. filed Jan. 31, 2017.
Non Final Office Action dated May 19, 2017, for U.S. Appl. No. 15/421,348 of Bingham, B., et al. filed Jan. 31, 2017.
Non Final Office Action dated May 19, 2017, for U.S. Appl. No. 15/421,382 of Bingham, B., et al. filed Jan. 31, 2017.
Non-Final Office Action dated Apr. 27, 2017, for U.S. Appl. No. 15/421,370 of Bingham et al. filed Jan. 31, 2017.
Non-Final Office Action dated Apr. 3, 2017, for U.S. Appl. No. 15/420,985 of Baum, M.J. et al. filed Jan. 31, 2017.
Non-Final Office Action dated Aug. 26, 2013, for U.S. Appl. No. 13/874,441 of Bingham et al. filed Apr. 30, 2013.
Non-Final Office Action dated Aug. 8, 2013 for U.S. Appl. No. 13/874,434 of Bingham et al. filed Apr. 30, 2013.
Non-Final Office Action dated Jul. 16, 2014, for U.S. Appl. No. 13/874,448 of Bingham et al. filed Apr. 30, 2013.
Non-Final Office Action dated Jul. 26, 2013, for U.S. Appl. No. 13/874,448 of Bingham et al. filed Apr. 30, 2013.
Non-Final Office Action dated Jul. 30, 2013, for U.S. Appl. No. 13/874,423, of Bingham et al. filed Apr. 30, 2013.
Non-Final Office Action dated Jun. 5, 2014, for U.S. Appl. No. 13/874,441 of Bingham et al. filed Apr. 30, 2013.
Non-Final Office Action dated May 26, 2017, for U.S. Appl. No. 15/421,353 of Bingham et al. filed Jan. 31, 2007.
Non-Final Office Action dated May 27, 2014, for U.S. Appl. No. 13/874,423 of Bingham et al. filed Apr. 30, 2013.
Notice of Allowance and Fees Due dated Dec. 23, 2013, for U.S. Appl. No. 13/874,434 of Bingham et al. filed Apr. 30, 2013.
Notice of Allowance and Fees Due dated Jul. 6, 2016, for U.S. Appl. No. 13/874,448 of Bingham et al. filed Apr. 30, 2013.
Notice of Allowance and Fees Due dated Sep. 22, 2014. For U.S. Appl. No. 13/874,423 of Bingham et al. filed Apr. 30, 2013.
Notice of Allowance dated Oct. 22, 2014, for U.S. Appl. No. 13/874,441 of Bingham et al. filed Apr. 30, 2013.
Final Office Action dated Nov. 4, 2014, for U.S. Appl. No. 14/167,316 of Bingham et al. filed Jan. 29, 2014.
Non-Final Office Action dated Oct. 19, 2015, for U.S. Appl. No. 14/167,316 of Bingham et al. filed Jan. 29, 2014.
Final Office Action dated Feb. 22, 2016, for U.S. Appl. No. 14/167,316 of Bingham et al. filed Jan. 29, 2014.
Non-Final Office Action dated Sep. 13, 2016, for U.S. Appl. No. 14/167,316 of Bingham et al. filed Jan. 29, 2014.
Notice of Allowance dated Apr. 25, 2017, U.S. Appl. No. 14/167,316 of Bingham et al. filed Jan. 29, 2014.
First Action Interview Pilot Program Pre-Interview Communication dated May 19, 2014, for U.S. Appl. No. 14/167,316 of Bingham et al. filed Jan. 29, 2014.
U.S. Appl. No. 15/420,938 of Baum, M.J. et al. filed Jan. 31, 2017.
U.S. Appl. No. 15/420,985 of Baum, M.J. et al. filed Jan. 31, 2017.
U.S. Appl. No. 15/421,068 of Baum, M.J. et al. filed Jan. 31, 2017.
U.S. Appl. No. 15/421,353 of Bingham et al. filed Jan. 31, 2007.
U.S. Appl. No. 15/421,370 of Bingham et al. filed Jan. 31, 2017.
U.S. Appl. No. 15/421,382 of Bingham et al. filed Jan. 31, 2017.
U.S. Appl. No. 15/421,395 of Bingham et al. filed Jan. 31, 2017.
U.S. Appl. No. 15/421,398 of Bingham et al. filed Jan. 31, 2007.
U.S. Appl. No. 15/421,412 of Bingham et al. filed Jan. 31, 2017.
U.S. Appl. No. 15/421,348 of Bingham et al. filed Jan. 31, 2017.
Dell Inc., "Foglight for Virtualization, Free Edition," http://www.quest.com/foglight-for-virtualization-free-edition/, 1 pages, published prior to Apr. 30, 2013.
VMware, Inc., "VMware vCenter Operations Manager Documentation, vCenter Operations Manager 5.7," http://www.vmware.com/support/pubs/vcops-pubs.html, 1 page, Apr. 4, 2013.
Gleed, Kyle , "Viewing ESXi Logs from the DCUI", Retrieved from the internet on Apr. 20, 2017: <<https://blogs.vmware.com/vsphere/author/kyle_gleed>>, Jun. 2012, 9 pages.
Hoke, Evan et al., "InteMon: Continuous Mining of Sensor Data in Large-scale Self-*Infrastructures", ACM SIGOPS Operating Systems Review, vol. 40 Issue 3, Jul. 2006, ACM Press, 7 pgs.
Goldin, D., Mardales, R., & Nagy, G. (Nov. 2006). In search of meaning for time series subsequence clustering: matching algo-

(56) References Cited

OTHER PUBLICATIONS rithms based on a new distance measure. In Proceedings of the 15th ACM international conference on Information and knowledge management (pp. 347-356). ACM.
Witten, I. H., Eibe, F. (2000). Algorithms: the basic methods. In D. D. Cerra (Ed.) Data Mining Practical Machine Learning Tools and Techniques with Java Implementations (pp. 78-118). San Francisco, CA: Morgan Kaufmann Publishers.
Witten, I. H., Eibe, F. (2000). Clustering. In D. D. Cerra (Ed.) Data Mining Practical Machine Learning Tools and Techniques with Java Implementations (pp. 210-227). San Francisco, CA: Morgan Kaufmann Publishers.
Witten, I. H., Eibe, F. (2000). Looking Forward. In D. D. Cerra (Ed.) Data Mining Practical Machine Learning Tools and Techniques with Java Implementations (pp. 329-337). San Francisco, CA: Morgan Kaufmann Publishers.
Preinterview first office action dated May 19, 2014 in U.S. Appl. No. 14/167,316. 4 pages.
First action interview—office action dated Jul. 15, 2014 in U.S. Appl. No. 14/167,316. 5 pages.
Final Rejection dated Nov. 4, 2014 in U.S. Appl. No. 14/167,316. 13 pages.
Non-Final Rejection dated Oct. 19, 2015 in U.S. Appl. No. 14/167,316. 11 pages.
Final Rejection dated Feb. 22, 2016 in U.S. Appl. No. 14/167,316. 14 pages.
Non-Final Rejection dated Sep. 13, 2016 in U.S. Appl. No. 14/167,316. 11 pages.
Notice of Allowance and Fees Due dated Apr. 25, 2017 in U.S. Appl. No. 14/167,316. 17 pages.
Notice of Allowance and Fees Due dated Jun. 26, 2017 in U.S. Appl. No. 14/167,316. 8 pages.
Corrected Notice of Allowability dated Jul. 5, 2017 in U.S. Appl. No. 14/167,316. 5 pages.
Non-Final Rejection dated Aug. 18, 2017 in U.S. Appl. No. 14/167,316. 8 pages.
Non-Final Rejection dated May 19, 2017 in U.S. Appl. No. 15/421,348. 24 pages.
Final Rejection dated Aug. 11, 2017 in U.S. Appl. No. 15/421,348. 18 pages.
Non-Final Rejection dated Dec. 29, 2017 in U.S. Appl. No. 15/421,348. 25 pages.
Non-Final Rejection dated May 26, 2017 in U.S. Appl. No. 15/421,353. 27 pages.
Final Rejection dated Aug. 25, 2017 in U.S. Appl. No. 15/421,353. 31 pages.
Non-Final Rejection dated Apr. 27, 2017 in U.S. Appl. No. 15/421,370. 13 pages.
Final Rejection dated Oct. 20, 2017 in U.S. Appl. No. 15/421,370. 15 pages.
Non-Final Rejection dated Mar. 8, 2018 in U.S. Appl. No. 15/421,370. 16 pages.
Non-Final Rejection dated May 19, 2017 in U.S. Appl. No. 15/421,382. 25 pages.
Non-Final Rejection dated Jun. 19, 2017 in U.S. Appl. No. 15/421,382. 30 pages.
Final Rejection dated Aug. 11, 2017 in U.S. Appl. No. 15/421,382. 27 pages.
Non-Final Rejection dated Jun. 1, 2017 in U.S. Appl. No. 15/421,398. 6 pages.
Final Rejection dated Nov. 2, 2017 in U.S. Appl. No. 15/421,398. 8 pages.
Non-Final Rejection dated Apr. 27, 2017 in U.S. Appl. No. 15/421,412. 32 pages.
Final Rejection dated Aug. 3, 2017 in U.S. Appl. No. 15/421,412, 34 pages.
Advisory Action dated Sep. 14, 2017 in U.S. Appl. No. 15/421,412. 3 pages.
Notice of Allowance and Fees Due dated Mar. 15, 2018 in U.S. Appl. No. 15/421,412. 5 pages.
Notice of Allowance and Fees Due dated Dec. 19, 2017 in U.S. Appl. No. 15/661,268. 17 pages.
Notice of Allowance and Fees Due dated Nov. 17, 2017 in U.S. Appl. No. 15/661,286. 18 pages.
Non-Final Rejection dated Jun. 28, 2017 in U.S. Appl. No. 15/421,068. 45 pages.
Notice of Allowance and Fees Due dated Feb. 9, 2018 in U.S. Appl. No. 15/661,260. 19 pages.
Non-Final Rejection dated Apr. 5, 2018 in U.S. Appl. No. 15/421,382. 29 pages.
Non-Final Rejection dated Apr. 5, 2018 in U.S. Appl. No. 15/421,398, 7 pages.
Non-Final Rejection dated Apr. 23, 2018 in U.S. Appl. No. 15/421,353. 31 pages.
Final Rejection dated Jul. 20, 2018 in U.S. Appl. No. 15/421,348. 24 pages.
Final Office Action dated Aug. 8, 2018 in U.S. Appl. No. 15/421,382, 29 pages.
Final Office Action dated Aug. 15, 2018 in U.S. Appl. No. 15/421,370, 11 pages.
Final Office Action dated Aug. 31, 2018 in U.S. Appl. No. 15/421,398, 7 pages.
Notice of Allowance dated Oct. 15, 2018 in U.S. Appl. No. 15/421,353, 22 pages.
Non-Final Office Action dated Dec. 31, 2018 in U.S. Appl. No. 15/421,348, 34 pages.
Notice of Allowance dated Feb. 20, 2019 in U.S. Appl. No. 15/421,398, 7 pages.
Notice of Allowance dated Feb. 27, 2019 in U.S. Appl. No. 15/421,370, 8 pages.
Non-Final Office Action dated Mar. 1, 2019 in U.S. Appl. No. 15/421,382, 26 pages.

* cited by examiner

VM-SYSTEM CONFIGURATION

Total VMs: 74
Total VM Migrations: 17
Total Hosts: 4

HOST STATUS

Storage Amounts

| Name  | Committed | Capacity | Overprovisioned % |
|-------|-----------|----------|-------------------|
| Host1 | 9.8 GB    | 144.7    | -71.6             |
| Host2 | 159.2     | 224.3    | -29.0             |
| Host3 | 143.7     | 149.8    | 73.9              |
| Host4 | 75.0      | 149.8    | -39.61            |

VM ALARM HISTORY

| Time        | Name | Message                            |
|-------------|------|------------------------------------|
| 04/16 13:27 | VM1  | Memory alarm from gray to green    |
| 04/16 14:01 | VM2  | CPU usage alarm from red to yellow |

```
CUSTOM TIME RANGE
RANGE TYPE
○ DATE   ○ RELATIVE   ○ REAL-TIME   ● ADVANCED SEARCH LANGUAGE
EARLIEST                          LATEST
[-2D@M        ]                   [+5D@H        ]
EFFECTIVE EARLIEST                EFFECTIVE LATEST
[NOV 18, 2013 1:46:00.000 PM]     [NOV 26, 2013 1:00:00.000 PM]

[CANCEL]  [APPLY]
```

FIG. 19C

```
CUSTOM TIME RANGE
RANGE TYPE
○ DATE   ○ RELATIVE   ● REAL-TIME   ○ ADVANCED SEARCH LANGUAGE
TIME WINDOW
[1]  [MINUTE(S)▼]
SEARCH LANGUAGE EQUIVALENT
[rt-1m        ]

[CANCEL]  [APPLY]
```

FIG. 19D

```
CUSTOM TIME RANGE
RANGE TYPE
○ DATE   ● RELATIVE   ○ REAL-TIME   ○ ADVANCED SEARCH LANGUAGE
EARLIEST TIME
[1]  [DAY(S) AGO ▼]  SNAP TO [DAY ▼]
SEARCH LANGUAGE EQUIVALENT        EFFECTIVE RANGE
[-1d@d        ]                   [NOV 19, 2013 12:00:00.000 AM-(NOW)]

[CANCEL]  [APPLY]
```

FIG. 19E

```
CUSTOM TIME RANGE
RANGE TYPE
● DATE   ○ RELATIVE   ○ REAL-TIME   ○ ADVANCED SEARCH LANGUAGE
EARLIEST TIME                     LATEST TIME
  ● SPECIFIC DATE ○ EARLIEST DATE   ● SPECIFIC DATE ○ NOW
[11/04/2013    03:04:03.000]      [11/20/2013    05:05:03.000]

[CANCEL]  [APPLY]
```

CORRELATING LOG DATA WITH PERFORMANCE MEASUREMENTS HAVING A SPECIFIED RELATIONSHIP TO A THRESHOLD VALUE

This application is a continuation-in-part of U.S. patent application Ser. No. 14/167,316, filed on Jan. 29, 2014, which is a continuation-in-part of:

U.S. patent application Ser. No. 13/874,423, filed on Apr. 30, 2013 (issued on Dec. 2, 2014 as U.S. Pat. No. 8,904, 389);

U.S. patent application Ser. No. 13/874,434, filed on Apr. 30, 2013 (issued on Mar. 25, 2014, as U.S. Pat. No. 8,683,467);

U.S. patent application Ser. No. 13/874,441, filed on Apr. 30, 2013 (issued on Oct. 20, 2015 as U.S. Pat. No. 9,164, 786); and U.S. patent application Ser. No. 13/874,448, filed on Apr. 30, 2013 (issued on Nov. 15, 2016 as U.S. Pat. No. 9,495, 187).

U.S. patent application Ser. No. 14/167,316 further claims the benefit under 35 U.S.C. § 119 of U.S. Provisional application No. 61/883,869, filed on Sep. 27, 2013 and U.S. Provisional application No. 61/900,700, filed on Nov. 6, 2013.

This application is also a continuation-in-part of U.S. patent application Ser. No. 14/801,721, filed on Jul. 16, 2015, which is a continuation of U.S. patent application Ser. No. 14/253,548 filed on Apr. 15, 2014 (issued on Sep. 22, 2015 as U.S. Pat. No. 9,142,049), which is a continuation-in-part of:

U.S. patent application Ser. No. 14/167,316, filed on Jan. 29, 2014;

U.S. patent application Ser. No. 13/874,423, filed on Apr. 30, 2013 (issued on Dec. 2, 2014 as U.S. Pat. No. 8,904, 389);

U.S. patent application Ser. No. 13/874,434, filed on Apr. 30, 2013 (issued on Mar. 25, 2014 as U.S. Pat. No. 8,683, 467);

U.S. patent application Ser. No. 13/874,441, filed on Apr. 30, 2013 (issued on Oct. 20, 2015 as U.S. Pat. No. 9,164, 786); and U.S. patent application Ser. No. 13/874,448, filed on Apr. 30, 2013 (issued on Nov. 15, 2016 as U.S. Pat. No. 9,495, 187).

U.S. patent application Ser. No. 14/253,548 further claims the benefit under 35 U.S.C. § 119 of U.S. Provisional application No. 61/883,869, filed on Sep. 27, 2013, U.S. Provisional application No. 61/900,700, filed on Nov. 6, 2013, and U.S. Provisional application No. 61/979,484, filed on Apr. 14, 2014.

Each of the above-listed applications is incorporated by reference herein in its entirety.

TECHNICAL FIELD

The present disclosure relates generally to techniques for processing log data and/or performance data relating to components in an information technology (IT) environment.

BACKGROUND

Along with the advancement in computing technology, users' expectations of computational capabilities are similarly increasing. Users are constantly seeking resources that can provide the ability to achieve a computational result quickly and appropriately. Attending to users' requests is complicated by the fact that user projects vary in terms of required processing power, memory allocation, software capabilities, rights licensing, etc. Recently, systems have been organized to include a plurality of virtual machines. Tasks can then be assigned to virtual machines based on the task requirements, the machines' capabilities and the system load. However, given the dynamic nature of assignments and the many components in these systems, monitoring the systems' performance is difficult.

SUMMARY

In accordance with the teachings provided herein, systems and methods for monitoring a hypervisor system are provided. A hypervisor system can coordinate operations of a set of virtual machines (VM) and/or hosts. Characterizing the overall operation of the system and/or operation of various system components can be complicated by the coordinated operation of the system components and the potential architecture flexibility of the system.

According to some embodiments, an architecture of a hypervisor structure is represented to a reviewer, along with indications characterizing how well individual components of the system are performing. In one instance, the architecture (which may be defined by an architecture provider and flexible in its structure) is represented as a tree with individual nodes corresponding to system components. For individual VMs, a performance number is calculated based on task completions and/or resource utilization of the VM, and a performance state is assigned to the component based on the number and state criteria. For higher-level components (e.g., hosts, host clusters, and/or a Hypervisor), another performance number is calculated based on the states of the underlying components. A performance state is assigned to the higher-level components using different state criteria and the respective performance number.

A reviewer is presented with a performance indicator (which can include a performance statistic or state) of one or more high-level components. At this point, lower level architecture and/or corresponding performance indicators are hidden from the reviewer. The reviewer can then select a component and "drill down" into performance metrics of underlying components. That is, upon detecting a reviewer's selection of a component, low-level architecture beneath the selected component is presented along with corresponding performance indicators.

In some instances, a performance event can be generated based on one or more performance assessments. Each performance event can correspond to one or more specific hypervisor components and/or a Hypervisor in general. Each performance event can include performance data for the component(s) and/or Hypervisor, such as a performance metric (e.g., CPU usage), performance statistic or performance state. In some instances, performance is assessed using different types of assessments (e.g., CPU usage versus memory usage). Multiple types of performance data can be represented in a single event or split across events.

A time stamp can be determined for each performance event. The time stamp can identify a time at which a performance was assessed. The events can then be stored in a time-series index, such that events are stored based on their time stamps. Subsequently, the index can be used to generate a result responsive to a query. In one instance, upon receiving a query, performance events with time stamps within a time period associated with the query are first retrieved. A late-binding schema is then applied to extract values of interest (e.g., identifiers of hypervisor components, or a type of performance). The values can then be used to identify query-responsive events (e.g., such that only performance events for component #1 are further considered) or identify values of interest (e.g., to determine a mode CPU usage).

Time stamped events can also be stored for other types of information. Events can identify tasks (e.g., collecting, storing, retrieving, and/or processing of big-data) assigned to and/or performed by hypervisor components and/or data received and/or processed by a hypervisor component. For example, a stream of data (e.g., log files, big data, machine data, and/or unstructured data) can be received from one or more data sources. The data can be segmented, time stamped and stored as data events (e.g., including machine data, raw data and/or unstructured data) in a time-series index (e.g., a time-series data store). Thus, rather than extracting field values at an intake time and storing only the field values, the index can retain the raw data or slightly processed versions thereof and extraction techniques can be applied at query time (e.g., by applying an iteratively revised schema).

While it can be advantageous to retain relatively unprocessed data, it will be appreciated that data events can include any or all of the following: (1) time stamped segments of raw data, unstructured data, or machine data (or transformed versions of such data); (2) the kinds of events analyzed by vendors in the Security Information and Event Management ("SIEM") field; (3) any other logical piece of data (such as a sensor reading) that was generated at or corresponds to a fixed time (thereby enabling association of that piece of data with a time stamp representing the fixed time); and (4) occurrences where some combination of one or more of any of the foregoing types of events either meets specified criteria or was manually selected by a data analyst as notable or a cause for an alert.

Data events can be used to generate a response to a received query. Select data events (e.g., matching a time period and/or field constraint in a query) can be retrieved. A defined or learned schema can be applied to extract field values from the retrieved events, which can be processed to generate a statistical query result (e.g., a count or unique identification) and/or selection (e.g., selecting events with particular field values). A query event can include information from the query and/or from the result and can also be time stamped and indexed.

Thus, one or more time-series indices can store a variety of time stamped events. This can allow a reviewer to correlate (e.g., based on a manual sampling or larger scale automated process) poor performance characteristics with processing tasks (e.g., data being indexed).

Particular embodiments of the subject matter described in this specification can be implemented to realize one or more of the following advantages. Techniques disclosed herein provide for the capability to characterize an operation of a hypervisor system at a variety of levels. By presenting the performance in a top-down manner, a reviewer can identify a level at which a system is experiencing problems and how an architecture may be modified to alleviate the problems. Further, by classifying different types of performance metrics (for various levels in the hierarchy) into one of a same set of states, a reviewer can easily understand how each portion of the system is performing.

The details of one or more embodiments of the disclosure are set forth in the accompanying drawings and the description below. Other features, aspects, and advantages of the disclosure will become apparent from the description, the drawings, and the claims.

BRIEF DESCRIPTION OF THE DRAWINGS

The present disclosure is described in conjunction with the appended figures:

FIGS. 7A-7C further illustrate example detailed information that can be presented to characterize performance of a hypervisor system, a host and a VM, respectively;

FIGS. 19A-19F illustrate examples of ways to select a time range for retrieving performance measurements and log data;

FIG. 21 illustrates an example of a presentation of log data that is associated with performance measurements.

Like reference numbers and designations in the various drawings indicate like elements.

DETAILED DESCRIPTION

The ensuing description provides preferred exemplary embodiment(s) only and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes can be made in the function and arrangement of elements without departing from the spirit and scope as set forth in the appended claims.

Each of the following U.S. patent applications is incorporated by reference herein in its entirety: U.S. patent application Ser. No. 13/874,423; U.S. patent application Ser. No. 13/874,434; U.S. patent application Ser. No. 13/874,441; U.S. patent application Ser. No. 13/874,448; U.S. patent application Ser. No. 14/167,316; and U.S. patent application Ser. No. 14/801,721. Additionally, each of U.S. provisional patent applications Nos. 61/883,869 and 61/900,700 is incorporated by reference herein in its entirety.

Figure 1:
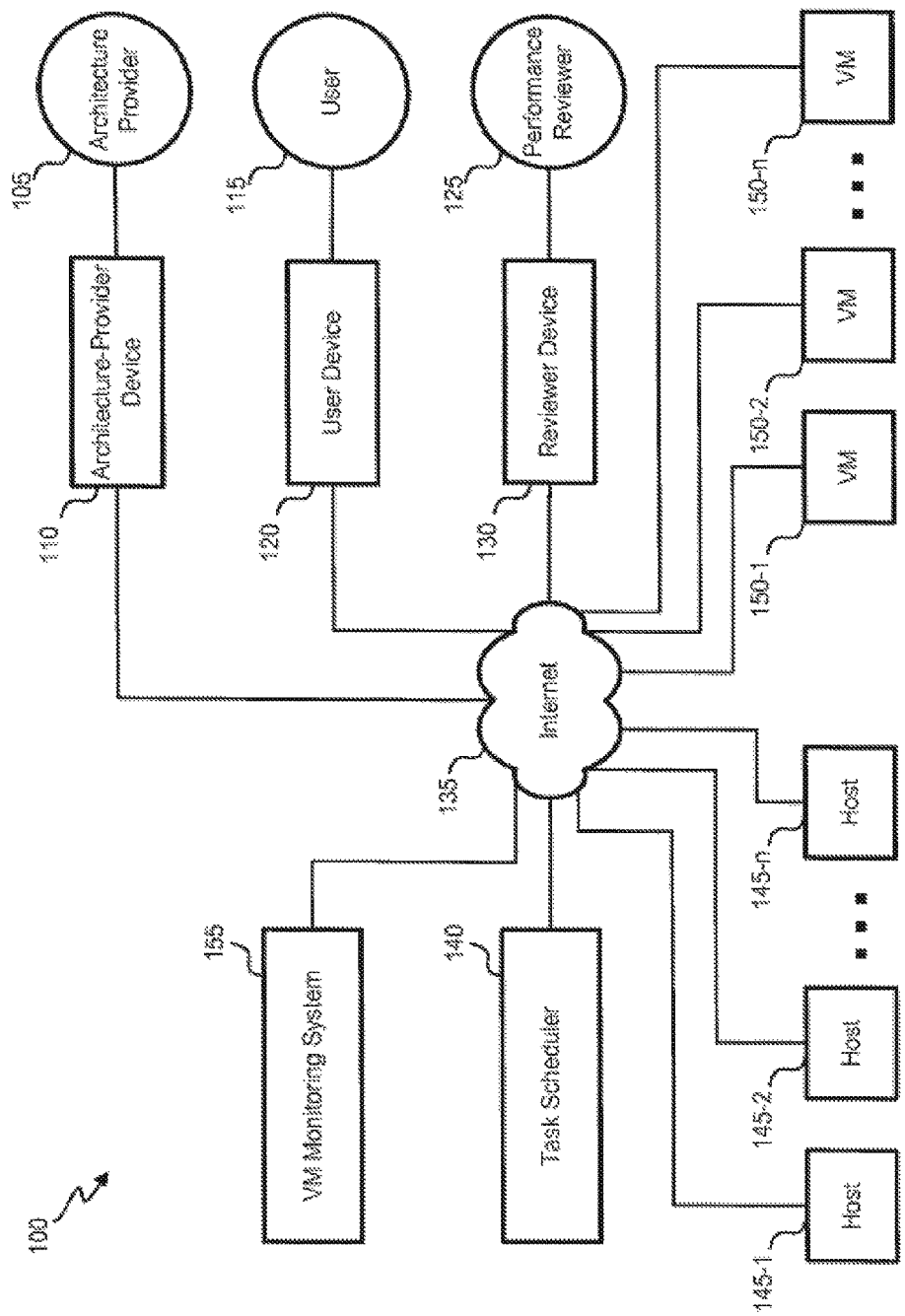
FIG. 1 shows a block diagram of an embodiment of a virtual-machine interaction system.

Referring first to FIG. 1, a block diagram of an embodiment of a virtual-machine interaction system 100 is shown. An architecture provider 105, user 115 and/or performance reviewer 125 can interact with a task scheduler 140 and/or virtual-machine (VM) monitoring system 155 via respective devices 110, 120 and/or 130 and a network 135, such as the Internet, a wide area network (WAN), local area network (LAN) or other backbone. In some embodiments, VM monitoring system 155 is made available to one or more of architecture provider 105, user 115 and/or performance reviewer 125 via an app (that can be downloaded to and executed on a respective portable electronic device) or a website. It will be understood that, although only one of each of an architecture provider 105, a user 115 and/or a performance reviewer 125 is shown, system 100 can include multiple architecture providers 105, users 115 and/or performance reviewers 125.

Architecture-provider device 110, user device 120 and/or reviewer device 130 can each be a single electronic device, such as a hand-held electronic device (e.g., a smartphone). It will be understood that architecture-provider device 110, user device 120 and/or reviewer device 130 can also include a system that includes multiple devices and/or components. The device(s) 110, 120 and/or 130 can comprise a computer, such as the desktop computer, a laptop computer or a tablet. In some instances, a provider 105, user 115 and/or performance reviewer 125 uses different devices at different times to interact with task scheduler 140 and/or VM monitoring system 155.

An architecture provider 105 can communicate with VM monitoring system 155 to provide input defining at least part of an architecture that sets forth a structure of a Hypervisor. The input can include identification of components of the Hypervisor, such as VMs, hosts or host clusters. The input can also include identification of relationships between system components, which can include parent-child relationships. For example, a host can be identified as being a parent of five specific VMs. In some instances, identifying the relationships includes defining a hierarchy.

Architecture provider 105 can identify characteristics of particular hypervisor components, such as a CPU count, CPU type, memory size, operating system, name, an address, an identifier, a physical location and/or available software. The architecture can also identify restrictions and/or rules applicable to VM-system components. For example, select resources may be reserved such that they can only be assigned high-priority tasks or tasks from particular users. As another example, architecture provider 105 can identify that particular resources are only to be assigned tasks of a particular type or that all tasks of a particular type are to be assigned to a particular resource.

The input can include text entered into a field, an uploaded file, arrangement and/or selection of visual icons, etc. Defining the architecture can include defining a new structure or modifying an existing structure.

Based on the architecture, a task scheduler 140 can utilize a set of hosts 145 and/or VMs 150 to complete computational tasks. In some instances, task scheduler 140 assigns tasks to a host 145 and/or VM 150 (e.g., the host providing computing resources that support the VM operation and the VM being an independent instance of an operating system ("OS") and software). The VM can then, e.g., store data, perform processing and/or generate data. As described in further detail herein, task assignments can include collecting data (e.g., log files, machine data, or unstructured data) from one or more sources, segmenting the data into discrete data events, time stamping the data events, storing data events into a time-series data store, retrieving particular data events (e.g., responsive to a query), and/or extracting values of fields from data events or otherwise processing events. Task scheduler 140 can monitor loads on various system components and adjust assignments accordingly. Further, the assignments can be identified to be in accordance with applicable rules and/or restrictions.

A VM monitoring system 155 can monitor applicable architecture, task assignments, task-performance characteristics and resource states. For example, VM monitoring system 155 can monitor: task completion time, a percentage of assigned tasks that were completed, a resource power state, a CPU usage, a memory usage and/or network usage. VM monitoring system 155 can use these monitored performance metrics to determine performance indicators (as described further below) to present to a reviewer 125. Reviewer 125 can interact with an interface provided by VM monitoring system 155 to control which performance indicators are presented. For example, reviewer 125 can specify a type of performance indicator (e.g., by defining a set of performance states) or can specify specific components, component types or levels for which the indicators are presented.

As used in this disclosure, a "performance metric" may refer to a category of some type of performance being measured or tracked for a component (e.g., a virtual center, cluster, host, or virtual machine) in an IT environment, and a "performance measurement" may refer to a particular measurement or determination of performance at a particular time for that performance metric.

Performance metrics may include a CPU performance metric, a memory performance metric, a summary performance metric, a performance metric based on a max CPU usage, a performance metric based on a max memory usage, a performance metric based on a ballooned memory, a performance metric based on a swapped memory, a performance metric based on an average memory usage percentage, a performance metric based on the total amount of memory that is reclaimed from all of the VMs on a host, a performance metric based on the total amount of memory that is being swapped from all of the VMs on a host, a performance metric that changes state based on the remaining disk space on a data store, a performance metric that changes state based on how much space is over-provisioned (i.e., negative numbers are a representation of an under-provisioned data store), a performance metric based on a VM's average CPU usage in percent, a performance metric based on a VM's average memory usage in percent, a performance metric based on a VM's state waiting for CPU time, a performance metric based on a VM's memory that is actively in use, a performance metric based on a VM's memory saved by memory sharing, a performance metric based on a VM's memory used to power the VM, a performance metric based on physical memory that is mapped to a VM (i.e., memory not including overhead memory), a performance metric based on an amount of physical memory that is being reclaimed by a host through a ballooning driver, a performance metric based on memory that is being read by a VM from a host's swap file, a performance metric based on an amount of memory a VM has had to write to a swap file, a performance metric based on an amount of memory from a VM that has been swapped by a host. This is a host swapping and is always a sign of the host being in stress, a performance metric based on an average read rate to virtual disks attached, a performance metric based on an average write rate to virtual disks attached, a performance metric based on an average input/output (I/O) rate to a virtual disk, a performance metric based on a number of times a VM wrote to its virtual disk, a performance metric based on a number of times a VM read from its virtual disk, a performance metric based on a time taken to process a SCSI command by a VM, a performance metric based on a number of commands that were aborted on a VM, a performance metric based on a number of SCSI-bus reset commands that were issued, a performance metric based on an average amount of bytes read across a VM's virtual network interface card (NIC), a performance metric based on an average amount of bytes broadcasted across a VM's virtual NIC, a performance metric based on a combined broadcast and received rates across all virtual NIC instances, a performance metric based on an average usage of a host's CPU in percent, a performance metric based on an amount of time a host waited for CPU cycles, a performance metric based on an average usage of a host's CPU in percent, a performance metric based on an average amount of all memory in active state by all VMs and Virtual Provisioning X Daemon services, a performance metric based on an average amount of memory being consumed by a host, which includes all VMs and an overhead of a VM kernel, a performance metric based on an average overhead of all VMs and an overhead of a vSphere, a performance metric based on an average memory granted to all VMs and vSphere, a performance metric based on a sum of all VM's memory control values for all powered-on VM, a performance metric based on a combined sum of all swap-in values for all powered-on VMs, a performance metric based on a combined sum of all swap-off values for all powered-on VMs, a performance metric based on an amount of memory from all VMs that has been swapped by a host, a performance metric based on an average amount of bytes read from each logical unit number (LUN) on a host, a performance metric based on an average amount of bytes written to each LUN on a host, a performance metric based on an average aggregated disk I/O for all VMs running on a host, a performance metric based on a total number of writes to a target LUN, a performance metric based on a total number of reads from a target LUN, a performance metric based on a sum of kernel requests to a device, a performance metric based on a sum of kernel requests spent in a queue state, a performance metric based on a number of commands that were aborted on a host, a performance metric based on a number of Small Computers System Interface (SCSI) bus reset commands that were issued, a performance metric based on an average amount of data received across a host's physical adapter, a performance metric based on an average amount of data broadcasted across a host's physical adapter, a performance metric based on a combined broadcast and received rates across all physical NIC instances, a performance metric based on an amount of CPU resources a VM would use if there were no CPU contention or CPU limit, a performance metric based on an aggregate amount of CPU resources all VMs would use if there were no CPU contention or CPU limit, a performance metric based on a CPU usage, which is an amount of actively used virtual CPUs, a performance metric based on a CPU usage, which is an aggregate of CPU usage across all VMs on a host, and/or a performance metric based on an average CPU usage percentage.

Included below is a non-exhaustive list of known performance metrics that may be monitored by default by VM monitoring system 155. PercentHighCPUVm, PercentHighMemVm, PercentHighSumRdyVm, VMInvCpuMaxUsg, VMInvMemMaxUsg, PercentHighBalloonHosts, PercentHighSwapHosts, PercentHighCPUHosts, BalloonedMemory_MB, swappedMemory_MB, RemainingCapacity_GB, Overprovisioned_GB, p_average_cpu_usage_percent, p_average_mem_usage_percent, p_summation_cpu_ready_millisecond, p_average_mem_active_kiloBytes, p_average_mem_consumed_kiloBytes, p_average_mem_overhead_kiloBytes, p_average_mem_granted_kiloBytes, p_average_mem_vmmemctl_kiloBytes, p_average_mem_swapin_kiloBytes, p_average_mem_swapout_kiloBytes, p_average_mem_swapped_kiloBytes, p_average_disk_read_kiloBytesPerSecond, p_average_disk_write_kiloBytesPerSecond, p_average_disk_usage_kiloBytesPerSecond, p_summation_disk_numberWrite_number, p_summation_disk_numberRead_number, p_latest_disk_maxTotalLatency_millisecond, p_summation_disk_commandsAborted_number, p_summation_disk_busResets_number, p_average_net_received_kiloBytesPerSecond, p_average_net_transmitted_kiloBytesPerSecond, p_average_net_usage_kiloBytesPerSecond, p_average_cpu_usage_percent, p_summation_cpu_ready_millisecond, p_average_mem_usage_percent, p_average_mem_active_kiloBytes, p_average_mem_consumed_kiloBytes, p_average_mem_overhead_kiloBytes, p_average_mem_granted_kiloBytes, p_average_mem_vmmemctl_kiloBytes, p_average_mem_swapin_kiloBytes, p_average_mem_swapout_kiloBytes, p_average_mem_IISwapUsed_kiloBytes, p_average_disk_numberReadAveraged_number, p_average_disk_numberWriteAveraged_number, p_average_disk_usage_kiloBytesPerSecond, p_summation_disk_numberWrite_number, p_summation_disk_numberRead_number, p_latest_disk_maxTotalLatency_millisecond, p_average_disk_queueLatency_millisecond, p_summation_disk_commandsAborted_number, p_summation_disk_busResets_number, p_average_net_received_kiloBytesPerSecond, p_average_net_transmitted_kiloBytesPerSecond, p_average_net_usage_kiloBytesPerSecond, p_average_cpu_demand_megaHertz, p_average_cpu_demand_megaHertz, p_average_cpu_usagemhz_megaHertz, p_average_cpu_usagemhz_megaHertz and/or AvgUsg_pctPercentHighCPUVm, PercentHighMemVm, PercentHighSumRdyVm, VMInvCpuMaxUsg, VMInvMemMaxUsg, PercentHighBalloonHosts, PercentHighSwapHosts, PercentHighCPUHosts, BalloonedMemory_MB, swappedMemory_MB, RemainingCapacity_GB, Overprovisioned_GB, p_average_cpu_usage_percent, p_average_mem_usage_percent, p_summation_cpu_ready_millisecond, p_average_mem_active_kiloBytes, p_average_mem_consumed_kiloBytes, p_average_mem_overhead_kiloBytes, p_average_mem_granted_kiloBytes, p_average_mem_vmmemctl_kiloBytes, p_average_mem_swapin_kiloBytes, p_average_mem_swapout_kiloBytes, p_average_mem_swapped_kiloBytes, p_average_disk_read_kiloBytesPerSecond, p_average_disk_write_kilo- BytesPerSecond, p_average_disk_usage_kiloBytesPerSecond, p_summation_disk_numberWrite_number, p_summation_disk_numberRead_number, p_latest_disk_maxTotalLatency_millisecond, p_summation_disk_commandsAborted_number, p_summation_disk_busResets_number, p_average_net_received_kiloBytesPerSecond, p_average_net_transmitted_kiloBytesPerSecond, p_average_net_usage_kiloBytesPerSecond, p_average_cpu_usage_percent, p_summation_cpu_ready_millisecond, p_average_mem_usage_percent, p_average_mem_active_kiloBytes, p_average_mem_consumed_kiloBytes, p_average_mem_overhead_kiloBytes, p_average_mem_granted_kiloBytes, p_average_mem_vmmemctl_kiloBytes, p_average_mem_swapin_kiloBytes, p_average_mem_swapout_kiloBytes, p_average_mem_llSwapUsed_kiloBytes, p_average_disk_numberReadAveraged_number, p_average_disk_numberWriteAveraged_number, p_average_disk_usage_kiloBytesPerSecond, p_summation_disk_numberWrite_number, p_summation_disk_numberRead_number, p_latest_disk_maxTotalLatency_millisecond, p_average_disk_queueLatency_millisecond, p_summation_disk_commandsAborted_number, p_summation_disk_busResets_number, p_average_net_received_kiloBytesPerSecond, p_average_net_transmitted_kiloBytesPerSecond, p_average_net_usage_kiloBytesPerSecond, p_average_cpu_demand_megaHertz, p_average_cpu_demand_megaHertz, p_average_cpu_usagemhz_megaHertz, p_average_cpu_usagemhz_megaHertz and/or AvgUsg_pct.

Of course any of the above listed performance metrics could also or alternatively be monitored and reported in any of: bytes, megaBytes, gigaBytes and/or any other byte or memory amount. Any performance metrics could also or alternatively be monitored and reported in any of: hertz, megaHertz, gigaHertz and/or any hertz amount. Moreover, any of the performance metrics disclosed herein may be monitored and reported in any of percentage, relative, and/or absolute values.

Other performance metrics that may be collected may include any type of cluster performance metrics, such as: latest_clusterServices_cpufairness_number, average_clusterServices_effectivecpu_megaHertz, average_clusterServices_effectivemem_megaBytes, latest_clusterServices_failover_number and/or latest_clusterServices_memfairness_number. Of course any performance metrics could also be monitored and reported in any of: bytes, megaBytes, gigaBytes and/or any byte amount. Any performance metrics could also be in hertz, megaHertz, gigaHertz and/or any hertz amount.

CPU performance metrics that may be collected may include any of: average_cpu_capacity.contention_percent, average_cpu_capacity.demand_megaHertz, average_cpu_capacity.entitlement_megaHertz, average_cpu_capacity.provisioned_megaHertz, average_cpu_capacity.usage_megaHertz, none_cpu_coreUtilization_percent, average_cpu_coreUtilization_percent, maximum_cpu_coreUtilization_percent, minimum_cpu_coreUtilization_percent, average_cpu_corecount.contention_percent, average_cpu_corecount.provisioned_number, average_cpu_corecount.usage_number, summation_cpu_costop_millisecond, latest_cpu_cpuentitlement_megaHertz, average_cpu_demand_megaHertz, latest_cpu_entitlement_megaHertz, summation_cpu_idle_millisecond, average_cpu_latency_percent, summation_cpu_maxlimited_millisecond, summation_cpu_overlap_millisecond, summation_cpu_ready_millisecond, average_cpu_reservedCapacity_megaHertz, summation_cpu_run_millisecond, summation_cpu_swapwait_millisecond, summation_cpu_system_millisecond, average_cpu_totalCapacity_megaHertz, average_cpu_totalmhz_megaHertz, none_cpu_usage_percent, average_cpu_usage_percent, minimum_cpu_usage_percent, maximum_cpu_usage_percent, none_cpu_usagemhz_megaHertz, average_cpu_usagemhz_megaHertz, minimum_cpu_usagemhz_megaHertz, maximum_cpu_usagemhz_megaHertz, summation_cpu_used_millisecond, none_cpu_utilization_percent, average_cpu_utilization_percent, maximum_cpu_utilization_percent, minimum_cpu_utilization_percent and/or summation_cpu_wait_millisecond Of course any performance metrics could also be monitored and reported in any of: hertz, megaHertz, gigaHertz and/or any hertz amount.

Database and data store performance metrics that may be collected may include any of: summation_datastore_busResets_number, summation_datastore_commandsAborted_number, average_datastore_datastoreIops_number, latest_datastore_datastoreMaxQueueDepth_number, latest_datastore_datastoreNormalReadLatency_number, latest_datastore_datastoreNormalWriteLatency_number, latest_datastore_datastoreReadBytes_number, latest_datastore_datastoreReadIops_number, latest_datastore_datastoreReadLoadMetric_number, latest_datastore_datastoreReadOIO_number, latest_datastore_datastoreVMObservedLatency_number, latest_datastore_datastoreWriteBytes_number, latest_datastore_datastoreWriteIops_number, latest_datastore_datastoreWriteLoadMetric_number, latest_datastore_datastoreWriteOIO_number, latest_datastore_maxTotalLatency_millisecond, average_datastore_numberReadAveraged_number, average_datastore_numberWriteAveraged_number, average_datastore_read_kiloBytesPerSecond, average_datastore_siocActiveTimePercentage_percent, average_datastore_sizeNormalizedDatastoreLatency_microsecond, average_datastore_throughput.contention_millisecond, average_datastore_throughput.usage_kiloBytesPerSecond, average_datastore_totalReadLatency_millisecond, average_datastore_totalWriteLatency_millisecond and/or average_datastore_write_kiloBytesPerSecond. Of course any performance metrics could also be monitored and reported in any of: bytes, megaBytes, gigaBytes and/or any byte amount.

Disk performance metrics that may be collected may include any of: summation_disk_busResets_number, latest_disk_capacity_kiloBytes, average_disk_capacity.contention_percent, average_disk_capacity.provisioned_kiloBytes, average_disk_capacity.usage_kiloBytes, summation_disk_commands_number, summation_disk_commandsAborted_number, average_disk_commandsAveraged_number, latest_disk_deltaused_kiloBytes, average_disk_deviceLatency_millisecond, average_disk_deviceReadLatency_millisecond, average_disk_deviceWriteLatency_millisecond, average_disk_kernelLatency_millisecond, average_disk_kernelReadLatency_millisecond, average_disk_kernelWriteLatency_millisecond, average_disk_maxQueueDepth_number, latest_disk_maxTotalLatency_millisecond, summation_disk_numberRead_number, average_disk_numberReadAveraged_number, summation_disk_numberWrite_number, average_disk_numberWriteAveraged_number, latest_disk_provisioned_kiloBytes, average_disk_queueLatency_millisecond, average_disk_queueReadLatency_millisecond, average_disk_queueWriteLatency_millisecond, average_disk_ read_kiloBytesPerSecond, average_disk_scsiReservationCnflctsPct_percent, summation_disk_scsiReservationConflicts_number, average_disk_throughput.contention_millisecond, average_disk_throughput.usage_kiloBytesPerSecond, average_disk_totalLatency_millisecond, average_disk_totalReadLatency_millisecond, average_disk_totalWriteLatency_millisecond, latest_disk_unshared_kiloBytes, none_disk_usage_kiloBytesPerSecond, average_disk_usage_kiloBytesPerSecond, minimum_disk_usage_kiloBytesPerSecond, maximum_disk_usage_kiloBytesPerSecond, latest_disk_used_kiloBytes and/or average_disk_write_kiloBytesPerSecond. Of course any performance metrics could also be monitored and reported in any of: bytes, megaBytes, gigaBytes and/or any byte amount.

Host-based replication ("hbr") performance metrics that may be collected may include any of: average_hbr_hbrNetRx_kiloBytesPerSecond, average_hbr_hbrNetTx_kiloBytesPerSecond and/or average_hbr_hbrNumVms_number. Of course any performance metrics could also be monitored and reported in any of: bytes, megaBytes, gigaBytes and/or any byte amount.

Management Agent performance metrics that may be collected may include any of: average_managementAgent_cpuUsage_megaHertz, average_managementAgent_memUsed_kiloBytes, average_managementAgent_swapin_kiloBytesPerSecond, average_managementAgent_swapOut_kiloBytesPerSecond and/or average_managementAgent_swapUsed_kiloBytes. Of course any performance metrics could also be monitored and reported in any of: bytes, megaBytes, gigaBytes and/or any byte amount.

Memory performance metrics that may be collected may include any of: none_mem_active_kiloBytes, average_mem_active_kiloBytes, minimum_mem_active_kiloBytes, maximum_mem_active_kiloBytes, average_mem_activewrite_kiloBytes, average_mem_capacity.contention_percent, average_mem_capacity.entitlement_kiloBytes, average_mem_capacity.provisioned_kiloBytes, average_mem_capacity.usable_kiloBytes, average_mem_capacity.usage_kiloBytes, average_mem_capacity.usage.userworld_kiloBytes, average_mem_capacity.usage.vm_kiloBytes, average_mem_capacity.usage.vmOvrhd_kiloBytes, average_mem_capacity.usage.vmkOvrhd_kiloBytes, average_mem_compressed_kiloBytes, average_mem_compressionRate_kiloBytesPerSecond, none_mem_consumed_kiloBytes, average_mem_consumed_kiloBytes, minimum_mem_consumed_kiloBytes, maximum_mem_consumed_kiloBytes, average_mem_consumed.userworlds_kiloBytes, average_mem_consumed.vms_kiloBytes, average_mem_decompressionRate_kiloBytesPerSecond, average_mem_entitlement_kiloBytes, none_mem_granted_kiloBytes, average_mem_granted_kiloBytes, minimum_mem_granted_kiloBytes, maximum_mem_granted_kiloBytes, none_mem_heap_kiloBytes, average_mem_heap_kiloBytes, minimum_mem_heap_kiloBytes, maximum_mem_heap_kiloBytes, none_mem_heapfree_kiloBytes, average_mem_heapfree_kiloBytes, minimum_mem_heapfree_kiloBytes, maximum_mem_heapfree_kiloBytes, average_mem_latency_percent, none_mem_llSwapIn_kiloBytes, average_mem_llSwapIn_kiloBytes, maximum_mem_llSwapIn_kiloBytes, minimum_mem_llSwapIn_kiloBytes, average_mem_llSwapInRate_kiloBytesPerSecond, none_mem_llSwapOut_kiloBytes, average_mem_llSwapOut_kiloBytes, maximum_mem_llSwapOut_kiloBytes, minimum_mem_llSwapOut_kiloBytes, average_mem_llSwapOutRate_kiloBytesPerSecond, none_mem_llSwapUsed_kiloBytes, average_mem_llSwapUsed_kiloBytes, maximum_mem_llSwapUsed_kiloBytes, minimum_mem_llSwapUsed_kiloBytes, average_mem_lowfreethreshold_kiloBytes, latest_mem_mementitlement_megaBytes, none_mem_overhead_kiloBytes, average_mem_overhead_kiloBytes, minimum_mem_overhead_kiloBytes, maximum_mem_overhead_kiloBytes, average_mem_overheadMax_kiloBytes, average_mem_overheadTouched_kiloBytes, average_mem_reservedCapacity_megaBytes, average_mem_reservedCapacity.userworld_kiloBytes, average_mem_reservedCapacity.vm_kiloBytes, average_mem_reservedCapacity.vmOvhd_kiloBytes, average_mem_reservedCapacity.vmkOvrhd_kiloBytes, average_mem_reservedCapacityPct_percent, none_mem_shared_kiloBytes, average_mem_shared_kiloBytes, minimum_mem_shared_kiloBytes, maximum_mem_shared_kiloBytes, none_mem_sharedcommon_kiloBytes, average_mem_sharedcommon_kiloBytes, minimum_mem_sharedcommon_kiloBytes, maximum_mem_sharedcommon_kiloBytes, latest_mem_state_number, none_mem_swapIn_kiloBytes, average_mem_swapIn_kiloBytes, minimum_mem_swapIn_kiloBytes, maximum_mem_swapIn_kiloBytes, none_mem_swapOut_kiloBytes, average_mem_swapOut_kiloBytes, minimum_mem_swapOut_kiloBytes, maximum_mem_swapOut_kiloBytes, none_mem_swapin_kiloBytes, average_mem_swapin_kiloBytes, maximum_mem_swapin_kiloBytes, minimum_mem_swapin_kiloBytes, average_mem_swapinRate_kiloBytesPerSecond, none_mem_swapout_kiloBytes, average_mem_swapout_kiloBytes, maximum_mem_swapout_kiloBytes, minimum_mem_swapout_kiloBytes, average_mem_swapoutRate_kiloBytesPerSecond, none_mem_swapped_kiloBytes, average_mem_swapped_kiloBytes, minimum_mem_swapped_kiloBytes, maximum_mem_swapped_kiloBytes, none_mem_swaptarget_kiloBytes, average_mem_swaptarget_kiloBytes, minimum_mem_swaptarget_kiloBytes, maximum_mem_swaptarget_kiloBytes, none_mem_swapunreserved_kiloBytes, average_mem_swapunreserved_kiloBytes, minimum_mem_swapunreserved_kiloBytes, maximum_mem_swapunreserved_kiloBytes, none_mem_swapused_kiloBytes, average_mem_swapused_kiloBytes, minimum_mem_swapused_kiloBytes, maximum_mem_swapused_kiloBytes, none_mem_sysUsage_kiloBytes, average_mem_sysUsage_kiloBytes, maximum_mem_sysUsage_kiloBytes, minimum_mem_sysUsage_kiloBytes, average_mem_totalCapacity_megaBytes, average_mem_totalmb_megaBytes, none_mem_unreserved_kiloBytes, average_mem_unreserved_kiloBytes, minimum_mem_unreserved_kiloBytes, maximum_mem_unreserved_kiloBytes, none_mem_usage_percent, average_mem_usage_percent, minimum_mem_usage_percent, maximum_mem_usage_percent, none_mem_vmmemctl_kiloBytes, average_mem_vmmemctl_kiloBytes, minimum_mem_vmmemctl_kiloBytes, maximum_mem_vmmemctl_kiloBytes, none_mem_vmmemctltarget_kiloBytes, average_mem_vmmemctltarget_kiloBytes, minimum_mem_vmmemctltarget_kiloBytes, maximum_mem_vmmemctltarget_kiloBytes, none_mem_zero_kiloBytes, average_mem_zero_kiloBytes, minimum_mem_zero_kiloBytes, maximum_mem_zero_kiloBytes, latest_mem_zipSaved_kiloBytes and/or latest_mem_zipped_kiloBytes. Of course any performance metrics could also be monitored and reported in any of: bytes, megaBytes, gigaBytes and/or any byte amount.

Network performance metrics that may be collected may include any of: summation_net_broadcastRx_number, summation_net_broadcastTx_number, average_net_bytesRx_kiloBytesPerSecond, average_net_bytesTx_kiloBytesPerSecond, summation_net_droppedRx_number, summation_net_droppedTx_number, summation_net_errorsRx_number, summation_net_errorsTx_number, summation_net_multicastRx_number, summation_net_multicastTx_number, summation_net_packetsRx_number, summation_net_packetsTx_number, average_net_received_kiloBytesPerSecond, summation_net_throughput.contention_number, average_net_throughput.packetsPerSec_number, average_net_throughput.provisioned_kiloBytesPerSecond, average_net_throughput.usable_kiloBytesPerSecond, average_net_throughput.usage_kiloBytesPerSecond, average_net_throughput.usage.ft_kiloBytesPerSecond, average_net_throughput.usage.hbr_kiloBytesPerSecond, average_net_throughput.usage.iscsi_kiloBytesPerSecond, average_net_throughput.usage.nfs_kiloBytesPerSecond, average_net_throughput.usage.vm_kiloBytesPerSecond, average_net_throughput.usage.vmotion_kiloBytesPerSecond, average_net_transmitted_kiloBytesPerSecond, summation_net_unknownProtos_number, none_net_usage_kiloBytesPerSecond, average_net_usage_kiloBytesPerSecond, minimum_net_usage_kiloBytesPerSecond and/or maximum_net_usage_kiloBytesPerSecond. Of course any performance metrics could also be monitored and reported in any of: bytes, megaBytes, gigaBytes and/or any byte amount.

Power performance metrics that may be collected may include any of: average_power_capacity.usable_watt, average_power_capacity.usage_watt, average_power_capacity.usagePct_percent, summation_power_energy_joule, average_power_power_watt and/or average_power_powerCap_watt.

Rescpu performance metrics that may be collected may include any of: latest_rescpu_actav1_percent, latest_rescpu_actav15_percent, latest_rescpu_actav5_percent, latest_rescpu_actpk1_percent, latest_rescpu_actpk15_percent, latest_rescpu_actpk5_percent, latest_rescpu_maxLimited1_percent, latest_rescpu_maxLimited15_percent, latest_rescpu_maxLimited5_percent, latest_rescpu_runav1_percent, latest_rescpu_runav15_percent, latest_rescpu_runav5_percent, latest_rescpu_runpk1_percent, latest_rescpu_runpk15_percent, latest_rescpu_runpk5_percent, latest_rescpu_sampleCount_number and/or latest_rescpu_samplePeriod_millisecond.

Storage Adapter performance metrics that may be collected may include any of: average_storageAdapter_OIOsPct_percent, average_storageAdapter_commandsAveraged_number, latest_storageAdapter_maxTotalLatency_millisecond, average_storageAdapter_numberReadAveraged_number, average_storageAdapter_numberWriteAveraged_number, average_storageAdapter_outstandingIOs_number, average_storageAdapter_queueDepth_number, average_storageAdapter_queueLatency_millisecond, average_storageAdapter_queued_number, average_storageAdapter_read_kiloBytesPerSecond, average_storageAdapter_throughput.cont_millisecond, average_storageAdapter_throughput.usag_kiloBytesPerSecond, average_storageAdapter_totalReadLatency_millisecond, average_storageAdapter_totalWriteLatency_millisecond and/or average_storageAdapter_write_kiloBytesPerSecond. Of course any performance metrics could also be monitored and reported in any of: bytes, megaBytes, gigaBytes and/or any byte amount.

Storage path performance metrics that may be collected may include any of: summation_storagePath_busResets_number, summation_storagePath_commandsAborted_number, average_storagePath_commandsAveraged_number, latest_storagePath_maxTotalLatency_millisecond, average_storagePath_numberReadAveraged_number, average_storagePath_numberWriteAveraged_number, average_storagePath_read_kiloBytesPerSecond, average_storagePath_throughput.cont_millisecond, average_storagePath_throughput.usage_kiloBytesPerSecond, average_storagePath_totalReadLatency_millisecond, average_storagePath_totalWriteLatency_millisecond and/or average_storagePath_write_kiloBytesPerSecond. Of course any performance metrics could also be monitored and reported in any of: bytes, megaBytes, gigaBytes and/or any byte amount.

System performance metrics that may be collected may include any of: latest_sys_diskUsage_percent, summation_sys_heartbeat_number, latest_sys_osUptime_second, latest_sys_resourceCpuAct1_percent, latest_sys_resourceCpuAct5_percent, latest_sys_resourceCpuAllocMax_megaHertz, latest_sys_resourceCpuAllocMin_megaHertz, latest_sys_resourceCpuAllocShares_number, latest_sys_resourceCpuMaxLimited1_percent, latest_sys_resourceCpuMaxLimited5_percent, latest_sys_resourceCpuRun1_percent, latest_sys_resourceCpuRun5_percent, none_sys_resourceCpuUsage_megaHertz, average_sys_resourceCpuUsage_megaHertz, maximum_sys_resourceCpuUsage_megaHertz, minimum_sys_resourceCpuUsage_megaHertz, latest_sys_resourceMemAllocMax_kiloBytes, latest_sys_resourceMemAllocMin_kiloBytes, latest_sys_resourceMemAllocShares_number, latest_sys_resourceMemConsumed_kiloBytes, latest_sys_resourceMemCow_kiloBytes, latest_sys_resourceMemMapped_kiloBytes, latest_sys_resourceMemOverhead_kiloBytes, latest_sys_resourceMemShared_kiloBytes, latest_sys_resourceMemSwapped_kiloBytes, latest_sys_resourceMemTouched_kiloBytes, latest_sys_resourceMemZero_kiloBytes and/or latest_sys_uptime_second. Of course any performance metrics could also be monitored and reported in any of: bytes, megaBytes, gigaBytes and/or any byte amount.

Debug performance metrics that may be collected may include any of: maximum_vcDebugInfo_activationlatencystats_millisecond, minimum_vcDebugInfo_activationlatencystats_millisecond, summation_vcDebugInfo_activationlatencystats_millisecond, maximum_vcDebugInfo_activationstats_number, minimum_vcDebugInfo_activationstats_number, summation_vcDebugInfo_activationstats_number, maximum_vcDebugInfo_hostsynclatencystats_millisecond, minimum_vcDebugInfo_hostsynclatencystats_millisecond, summation_vcDebugInfo_hostsynclatencystats_millisecond, maximum_vcDebugInfo_hostsyncstats_number, minimum_vcDebugInfo_hostsyncstats_number, summation_vcDebugInfo_hostsyncstats_number, maximum_vcDebugInfo_inventorystats_number, minimum_vcDebugInfo_inventorystats_number, summation_vcDebugInfo_inventorystats_number, maximum_vcDebugInfo_lockstats_number, minimum_vcDebugInfo_lockstats_number, summation_vcDebugInfo_lockstats_number, maximum_vcDebugInfo_Irostats_number, minimum_vcDebugInfo_Irostats_number, summation_vcDebugInfo_Irostats_number, maximum_vcDebugInfo_miscstats_number, minimum_vcDebugInfo_miscstats_number, summation_vcDebugInfo_miscstats_number, maximum_vcDebugInfo_morefregstats_number, minimum_vcDebugInfo_morefregstats_number, summation_vcDebugInfo_morefregstats_number, maximum_vcDebugInfo_scoreboard_number, minimum_vcDebugInfo_scoreboard_number, summation_vcDebugInfo_scoreboard_number, maximum_vcDebugInfo_sessionstats_number, minimum_vcDebugInfo_sessionstats_number, summation_vcDebugInfo_sessionstats_number, maximum_vcDebugInfo_systemstats_number, minimum_vcDebugInfo_systemstats_number, summation_vcDebugInfo_systemstats_number, maximum_vcDebugInfo_vcservicestats_number, minimum_vcDebugInfo_vcservicestats_number and/or summation_vcDebugInfo_vcservicestats_number.

Resource performance metrics that may be collected may include any of: average_vcResources_cpuqueuelength_number, average_vcResources_ctxswitchesrate_number, average_vcResources_diskqueuelength_number, average_vcResources_diskreadbytesrate_number, average_vcResources_diskreadsrate_number, average_vcResources_diskwritebytesrate_number, average_vcResources_diskwritesrate_number, average_vcResources_netqueuelength_number, average_vcResources_packetrate_number, average_vcResources_packetrecvrate_number, average_vcResources_packetsentrate_number, average_vcResources_pagefaultrate_number, average_vcResources_physicalmemusage_kiloBytes, average_vcResources_poolnonpagedbytes_kiloBytes, average_vcResources_poolpagedbytes_kiloBytes, average_vcResources_priviledgedcpuusage_percent, average_vcResources_processcpuusage_percent, average_vcResources_processhandles_number, average_vcResources_processthreads_number, average_vcResources_syscallsrate_number, average_vcResources_systemcpuusage_percent, average_vcResources_systemnetusage_percent, average_vcResources_systemthreads_number, average_vcResources_usercpuusage_percent and/or average_vcResources_virtualmemusage_kiloBytes. Of course any performance metrics could also be monitored and reported in any of: bytes, megaBytes, gigaBytes and/or any byte amount.

Virtual disk performance metrics that may be collected may include any of: summation_virtualDisk_busResets_number, summation_virtualDisk_commandsAborted_number, latest_virtualDisk_largeSeeks_number, latest_virtualDisk_mediumSeeks_number, average_virtualDisk_numberReadAveraged_number, average_virtualDisk_numberWriteAveraged_number, average_virtualDisk_read_kiloBytesPerSecond, latest_virtualDisk_readIOSize_number, latest_virtualDisk_readLatencyUS_microsecond, latest_virtualDisk_readLoadMetric_number, latest_virtualDisk_readOIO_number, latest_virtualDisk_smallSeeks_number, average_virtualDisk_throughput.cont_millisecond, average_virtualDisk_throughput.usage_kiloBytesPerSecond, average_virtualDisk_totalReadLatency_millisecond, average_virtualDisk_totalWriteLatency_millisecond, average_virtualDisk_write_kiloBytesPerSecond, latest_virtualDisk_writeIOSize_number, latest_virtualDisk_writeLatencyUS_microsecond, latest_virtualDisk_writeLoadMetric_number and/or latest_virtualDisk_writeOIO_number. Of course any performance metrics could also be monitored and reported in any of: bytes, megaBytes, gigaBytes and/or any byte amount.

VM operation performance metrics that may be collected may include any of: latest_vmop_numChangeDS_number, latest_vmop_numChangeHost_number, latest_vmop_numChangeHostDS_number, latest_vmop_numClone_number, latest_vmop_numCreate_number, latest_vmop_numDeploy_number, latest_vmop_numDestroy_number, latest_vmop_numPoweroff_number, latest_vmop_numPoweron_number, latest_vmop_numRebootGuest_number, latest_vmop_numReconfigure_number, latest_vmop_numRegister_number, latest_vmop_numReset_number, latest_vmop_numSVMotion_number, latest_vmop_numShutdownGuest_number, latest_vmop_numStandbyGuest_number, latest_vmop_numSuspend_number, latest_vmop_numUnregister_number and/or latest_vmop_numVMotion_number.

In an embodiment of the disclosure, the IT environment performance metrics for which performance measurements can be collected include any of the published performance metrics that is known to be collected for IT systems and virtual-machine environments in software made and produced by VMWare, Inc.; individual performance measurements at specific times for these performance metrics may be made available by the software producing the measurements (e.g. VMWare software) through application programming interfaces (APIs) in the software producing the measurements. In embodiments of the present disclosure, these performance measurements made by software in an IT or virtual-machine environment (e.g., VMWare software) may be constantly retrieved through the software's API and stored in persistent storage, either as events (in a manner as described later in this specification) or in some other format in which they can be persisted and retrieved through a time-correlated search (the correlation being the time at which the performance measurements were made or the time to which the performance measurements correspond). These performance measurements could alternatively be stored in any of the ways described herein by the software producing them without making them available through an API or retrieving them through an API. While VMWare software has been referenced as a potential source of performance measurements in an IT or virtual-machine environment, it should be recognized that such performance measurements could be produced or collected by software produced by any company that is capable of providing such environments or measuring performance in such environments.

Figure 2:
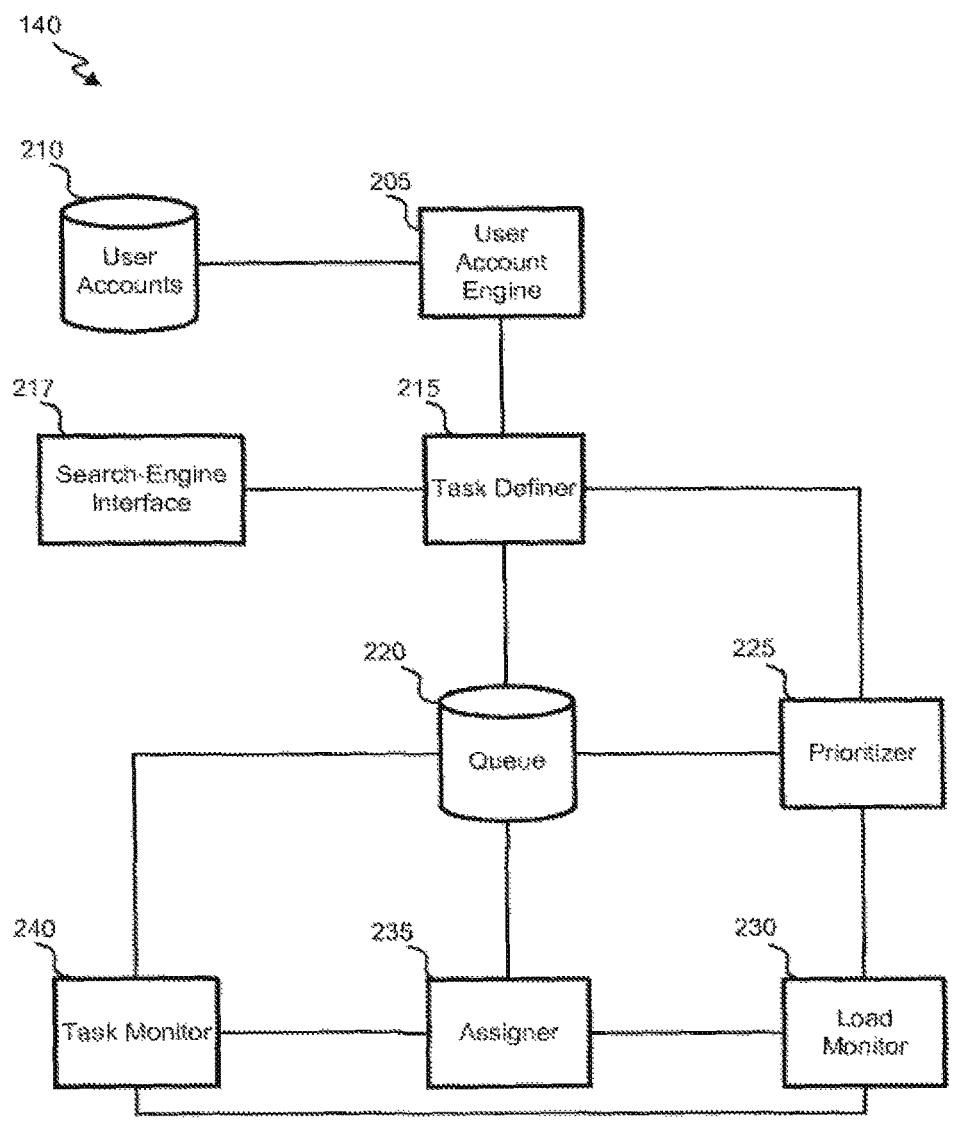
FIG. 2 shows a block diagram of an embodiment of task assigner.

Referring next to FIG. 2, a block diagram of an embodiment of task scheduler 140 is shown. Task scheduler 140 can be, in part or in its entirety, in a cloud. Task scheduler 140 includes a user account engine 205 that authenticates a user 115 attempting to access a Hypervisor. User account engine 205 can collect information about user 115 and store the information in an account in a user-account data store 210. The account can identify, e.g., a user's name, position, employer, subscription level, phone number, email, access level to the Hypervisor and/or login information (e.g., a username and password). Information can be automatically detected, provided by user 115, provided by an architecture provider 105 (e.g., to specify which users can have access to a system defined by a provided architecture) and/or provided by a reviewer 125 (e.g., who may be identifying employees within a company or organization who are to be allowed to access the Hypervisor).

In some instances, user account engine 205 determines whether a user 105 is authorized to access the system by requesting login information (e.g., a username and password) from user 115 and attempting to match entered login information to that of an account stored in user-account data store 210. In some instances, user account engine 205 determines whether user 115 is authorized by comparing automatically detected properties (e.g., an IP address and/or a characteristic of user device 120) to comparable properties stored in an account. User account engine 205 can further, in some instances, determine which Hypervisors and/or which hypervisor components user 115 is authorized to use (e.g., based on a user-provided code or stored information identifying access permissions).

Authorized users can then be granted access to a task definer 215, which receives a task definition from user 115. User 115 can define a task by, e.g., uploading a program code, entering a program code, defining task properties (e.g., a processing to be done, a location of data to be processed, and/or a destination for processed data), or defining task restrictions or preferences (e.g., requirements of resources to be used or task-completion deadlines). In some instances, defining a task includes uploading data to be processed. In some instances, a task is defined by executing a code provided by user 115 and defining portions of the codes (e.g., during specific iterations) as distinct tasks. Task definer 215 can verify that the task definition is acceptable (e.g., being of an appropriate format, having restrictions that can be met and being estimated to occupy an acceptable amount of resources). This verification can include fixed assessments and/or assessments that are specific to user 115 or a user group.

Defined tasks, in some instances, relate to data collection processes. Task definer 215 can identify data to be collected based on user input (e.g., identifying a source, a type of data to be collected and/or a time period during which data is to be collected) or through other means. Task definer 215 can then define data-collection tasks. Each task can pertain to a portion of the overall data-collection process. For example, when data is to be continuously collected from multiple sources, task definer 215 can define individual tasks, each relating to a subset of the sources and each involving a defined time period. These tasks can be assigned to machines identified as forwarders.

Tasks can further or alternatively include parsing collected data into individual data events, identifying a time stamp for each data event (e.g., by extracting a time stamp from the data) and/or storing time stamped data events in a time-series data store. These efforts are described in further detail below.

In some instances, task definer 215 defines tasks related to a query. The query can be received from a search engine via a search-engine interface 217. The query can identify events of interest. The query can be for one or more types of events, such as data events or performance events (e.g., searching for performance events with below-threshold performance values of a performance metric). The query may, e.g., specify a time period, a keyword (present anywhere in the event) and/or a value of a field constraint (e.g., that a value for a "method" field be "POST"). Task definer 215 can define one or more retrieval, field-extraction and/or processing tasks based on the query. For example, multiple retrieval tasks can be defined, each involving a different portion of the time period. Task definer 215 can also define a task to apply a schema so as to extract particular value of fields or a task to search for a keyword. Values extracted can be for fields identified in the query and/or for other fields (e.g., each field defined in the schema). Those retrieved events with query-matching values of fields or keywords can then be selected (e.g., for further processing or for a query response).

Task definer 215 can further define a task to process retrieved events. For example, a task can include counting a number of events meeting a criteria (e.g., set forth in the query or otherwise based on the query); identifying unique values of a field identified in a query; identifying a statistical summary (e.g., average, standard deviation, median, etc.) of a value of a field identified in a query.

It will be appreciated that, while the retrieval, field extraction of a value, and/or processing tasks are referred to separately, any two or more of these tasks can be combined into a single task. Further, in instances where different components act on different portions of data retrieved for a given query, a task may include combining results of the task actions.

Upon determining that the task definition is acceptable, task definer 215 generates a queue entry. The queue entry can include an identifier of the task, a characteristic of the task (e.g., required resource capabilities, estimated processing time, and/or estimated memory use), an identification of user 115, a characteristic of user 115 (e.g., an employer, a position, a level-of-service, or resources which can be used) and/or when the task was received. In some instances, the queue entry includes the task definition, while in other instances, the queue entry references a location (e.g., of and/or in another data store) of the task definition.

A prioritizer 225 can prioritize the task based on, e.g., a characteristic of the task, a characteristic of user 115 and/or when the task was received (e.g., where either new or old tasks are prioritized, depending on the embodiment). Prioritizer 225 can also or alternatively prioritize the task based on global, company-specific or user-specific usage of part or all of Hypervisor. For example, if many queue items require that a processing VM be running Operating System (OS) #1 (and/or if few resources run the OS), prioritizer 225 may prioritize queue items permissive of or requiring a different OS being run. Similarly, prioritizations can depend on a current load on part or all of a Hypervisor. For example, tasks that can be assigned to a VM currently having a small CPU usage can be assigned high priority. Thus, a load monitor 230 can communicate with prioritizer 225 to identify a load (e.g., a processing and/or memory load) on specific resources and/or specific types of resources.

In some instances, a task is prioritized based on data involved in the task. Collection, storage, retrieval and/or processing of valuable data can be prioritized over other tasks or over other corresponding tasks. Prioritization can also be performed based on a source identification or data. Prioritization can also be performed based on task types. For example, data-collection and event-storage tasks (e.g., intake tasks) may be prioritized over event-retrieval and event-processing tasks (e.g., query-response tasks).

Prioritizing a task can include assigning a score (e.g., a numeric or categorical score) to the task, which may include identifying some tasks that are "high" priority. Prioritizing a task can include ranking the task relative to tasks. The prioritization of a task can be performed once or it can be repeatedly performed (e.g., at regular intervals or upon having received a specific number of new tasks). The prioritization can be performed before, while or after a queue item identifying the task is added to the queue. The queue item can then be generated or modified to reflect the prioritization.

An assigner 235 can select a queue entry (defining a task) from queue 220 and assign it to one or more resources (e.g., a host cluster, a host and/or a VM). The selection can be based on a prioritization of queue entries in queue 220 (e.g., such that a highest priority task is selected). The selection can also or alternatively depend on real-time system loads. For example, load monitor 230 can identify to assigner 235 that a particular VM recently completed a task or had low CPU usage. Assigner 235 can then select a queue entry identifying a task that can be performed by the particular VM. The assignment can include a pseudo-random element, depend on task requirements or preferences and/or depend on loads of various system components. For example, assigner 235 can determine that five VMs have a CPU usage below a threshold, can determine that three of the five have capabilities aligned with a given task, and can then assign the task to one of the three VMs based on a pseudo-random selection between the three. The assignment can further and/or alternatively reflect which Hypervisors and/or system components a user from whom a task originated is allowed to access. Assigner 235 can update queue 220 to reflect the fact that a task is/was assigned to identify the assigned resource(s).

A task monitor 240 can then monitor performance of the tasks and operation states (e.g., processing usage, CPU usage, etc.) of assigned resources. Task monitor 240 can update queue 220 reflect performance and/or resource-operation states. In some instances, if a performance state and/or resource-operation state is unsatisfactory (e.g., is not sufficiently progressing), assigner 235 can reassign the task.

Figure 3:
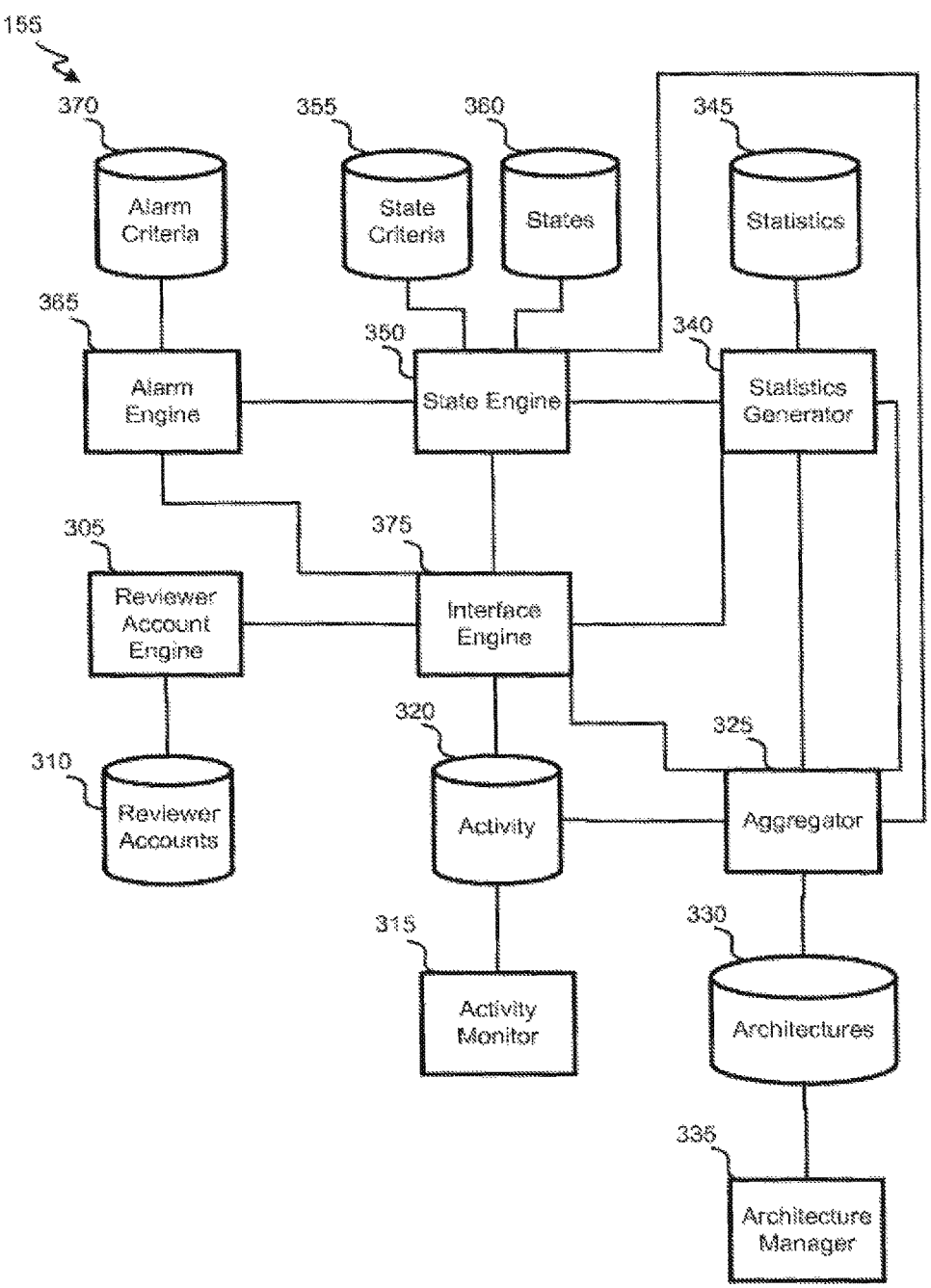
FIG. 3 shows a block diagram of an embodiment of a VM monitoring system.

Referring next to FIG. 3, a block diagram of an embodiment of VM monitoring system 155 is shown. VM monitoring system 155 can be, in part or in its entirety, in a cloud. VM monitoring system 155 includes a reviewer account engine 305, which authenticates a reviewer attempting to access information characterizing performance of a Hypervisor. Reviewer account engine 305 can operate similarly to user account engine 205. For example, reviewer account engine 305 can generate reviewer accounts stored in a reviewer-account data store 310 where the account includes information such as the reviewer's name, employer, level-of-service, which Hypervisors/components can be reviewed, a level of permissible detail for reviews, and/or login information. Reviewer account engine 305 can then determine whether detected or reviewer-entered information (e.g., login information) matches corresponding information in an account.

VM monitoring system 155 also includes an activity monitor 315, which monitors activity of hypervisor components. The activity can include, for example, when tasks were assigned, whether tasks were completed, when tasks were completed, what tasks were assigned (e.g., required processing), users that requested the task performance, whether the task was a new task or transferred from another component (in which case a source component and/or transfer time can be included in the activity), CPU usage, memory usage, characteristics of any memory swapping or ballooning (e.g., whether it occurred, when it occurred, an amount of memory, and the other component(s) involved), and/or any errors.

Activity monitor 315 can store the monitored activity (e.g., as or in an activity record) in an activity data store 320. In one instance, one, more or each VM component is associated with a record. Performance metrics of the component (e.g., CPU usage and/or memory usage) can be detected at routine intervals. The record can then include an entry with a time stamp and performance metrics. Task assignments (including, e.g., a time of assignment, a source user, whether the task was transferred from another component, a type of task, requirements of the task, whether the task was completed, and/or a time of completion) can also be added to the record. In some instances, performance metrics are detected (and a corresponding record entry is generated and stored) upon detecting a task action (e.g., assignment, transfer, or completion) pertaining to the VM component. Thus, activity data store 320 can maintain an indexed or organized set of metrics characterizing historical and/or current performance of hypervisor components.

An aggregator 325 can collect performance metrics from select activity records. The performance metrics can include, e.g., CPU usage, memory usage, tasks assignments, task completions and/or any of the above mentioned performance metrics. The desired values of performance metrics can also include values generated from entries with time stamps within a particular time period. In some instances, performance metrics are collected from one or more entries having a most recent time stamp (e.g., a most recent entry or all entries within a most-recent 24-hour period).

The activity records can be selected based on an architecture stored in an architecture data store 330, the architecture defining a structure (e.g., components and component relationships) of a Hypervisor. Architectures can also specify which specific users or types of users can use some or all of the Hypervisor and/or which specific reviewer or types of reviewers can access (some or all available) performance indicators.

The architecture can be one provided by an architecture provider 105. For example, architecture provider 105 can interact with an architecture manager 335 to define resources in a Hypervisor and relationships between components of the system. These definitions can be provided, e.g., by entering text, manipulating graphics or uploading a file. It will be appreciated that, while not shown, VM monitoring system 155 can further include an architecture-provider account engine and architecture-provider account data store that can be used to authenticate an architecture provider. Architecture-provider accounts can include information similar to that in user accounts and/or reviewer accounts, and the architecture-provider account engine can authenticate an architecture provider in a manner similar to a user or reviewer authentication technique as described herein.

Figure 4:
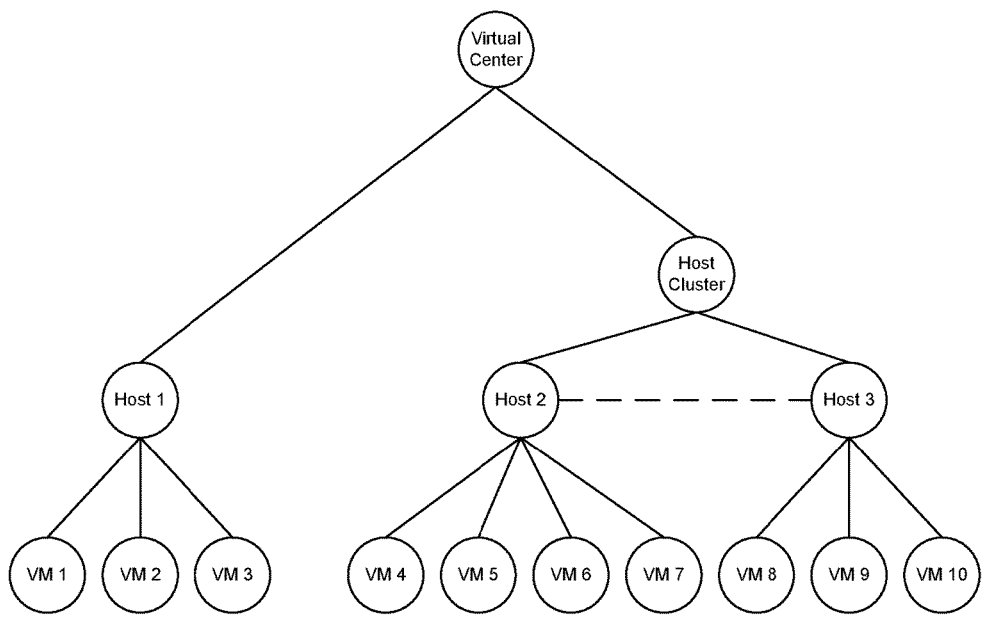
FIG. 4 illustrates an example of a representation of an architecture for a Hypervisor.

FIG. 4 illustrates an example of a representation of an architecture for a Hypervisor. The depicted architecture is hierarchical and includes a plurality of nodes arranged in a plurality of levels. Each node corresponds to a component in the Hypervisor. The hierarchy defines a plurality of familial relationships. For example, VM 6 is a child of Host 2 and a grandchild of the Host Cluster. The top level is the virtual center where tasks are assigned. The second level is a host-cluster level, which indicates which underlying hosts have task-transferring arrangements with each other (the same-level interaction being represented by the dashed line). The third level is a host level that provides computing resources that support VM operation. The fourth level is a VM level. Thus, based on the depicted architecture, an assignment to VM 7 would also entail an assignment to Host 2 and to the Host Cluster; an assignment to VM 3 would also entail an assignment to Host 1.

Returning to FIG. 3, aggregator 325 can aggregate performance metrics from records pertaining to a particular component in the architecture. As will be described in further detail below, performance indicators (determined based on performance metrics) associated with components at different levels can be sequentially presented to a reviewer (e.g., in a top-down manner and responsive to reviewer selection of components). Thus, VM monitoring system 155 can, in some instances, also sequentially determine performance indicators (determining lower level indicators following a presentation of higher-level indicators and/or to reviewer selection of a component). VM monitoring system 155 can first determine performance indicators for higher-level components and subsequently for each of a subset or all of lower-level components. Thus, aggregator 325 can first aggregate performance metrics in activity records for each of one or more higher-level components and later aggregate performance metrics in activity records for each of one or more lower-level components. It will be appreciated that other sequences can be utilized (e.g., repeatedly cycling through components in a sequence).

A statistics generator 340 can access the collection of performance metrics and generate one or more performance statistics based on the values of one or more performance metrics. A performance statistic can pertain to any of the various types of performance metrics, such as a CPU usage, a memory usage, assigned tasks, a task-completion duration, etc. The statistic can include, e.g., an average, a median, a mode, a variance, a distribution characteristic (e.g., skew), a probability (which may be a percentage), a conditional probability (e.g., conditioned on recent assignment of a task), a skew, and/or an outlier presence. The statistic can include one or more numbers (e.g., an error and a standard deviation). In some instances, the statistic includes a series of numbers, such as histogram values. Statistics generator 340 can store the statistic (in association with an identifier of a respective component and time period) in a statistics data store 345. Statistics generator 340 can identify which component and/or time period are to be associated with the statistic based on what aggregation was performed.

A state engine 350 can access one or more state criteria from state-criteria data store 355 and use the state criteria and the generated statistic to assign a state (e.g., to a component and/or time period). The state can then be stored (e.g., in association with a respective component and/or time period) in a state data store 360. State engine 350 can identify which component and/or time period are to be associated with the state based on what aggregation was performed.

The state criteria can include one or more thresholds, a function and/or an if-statement. In one instance, two thresholds are set to define three states: if a statistic is below the first threshold, then a first state (e.g., a "normal" state) is assigned; if a statistic is between the thresholds, then a second state (e.g., a "warning" state) is assigned; if a statistic is above the second threshold, then a third state (e.g., a "critical state") is assigned. The state criteria can pertain to multiple statistics (e.g., having a function where a warning state is assigned if any of three statistics are below a respective threshold or if a score generated based on multiple statistics is below a threshold).

A state of a node corresponding to a component in an IT environment may be based on performance measurements (corresponding to a performance metric) made directly for that component, or it may depend on the states of child nodes (corresponding to child components) of the node (e.g., a warning state if any of the child nodes are in a warning state, or a warning state if at least 50% of the child nodes are in a warning state). A component in an IT environment may include a virtual center, a cluster (of hosts), a host, or virtual machines running in a host, where a cluster is a child component of a virtual center, a host is a child component of a cluster, and a virtual machine is a child component of a host.

The state criteria can include a time-sensitive criteria, such as a threshold based on a past statistic (e.g., indicating that a warning state should be assigned if the statistic has increased by 10-20% since a previous comparable statistic and a warning state should be assigned if it has increased by 20+%), a derivative (calculated based on a current and one or more past statistics) and/or an extrapolation (calculated based on a current and one or more past statistics).

In some instances, multiple states are defined. For example, an overall state can be assigned to the component, and other specific states pertaining to more specific performance qualities (e.g., memory usage, processor usage and/or processing speed) can also be assigned.

The state criteria can be fixed or definable (e.g., by an architecture provider 105 or reviewer 125). The state criteria can be the same across all components and/or time periods or they can vary. For example, criteria applicable to VM components can differ from criteria applicable to higher level components.

In some instances, the state criteria are determined based on a results-oriented empirical analysis. That is, a state engine 350 can use an analysis or model to determine which values of performance metrics (e.g., a range of values) are indicative of poor or unsatisfactory performance of the Hypervisor. Thus, a result could be a performance metric for a higher level component or a population user satisfaction rating.

An alarm engine 365 can access one or more alarm criteria from alarm-criteria data store 370 and use the alarm criteria and an assigned state to determine whether an alarm is to be presented. In one instance, an alarm criterion indicates that an alarm is to be presented if one or more states are assigned. In one instance, an alarm criterion includes a time-sensitive assessment, such as a criterion that is satisfied when the state has changed to (or below) a specific state and/or has changed by a particular number of states since a last time point.

Alarm engine 365 can present the alarm by, e.g., presenting a warning on an interface (e.g., a webpage or app page), transmitting an email, sending a message (e.g., a text message), making a call or sending a page. A content of the alarm (e.g., email, message, etc.) can identify a current state and/or statistic, a previous state and/or statistic, a trend in the state and/or statistic, an applicable component, an applicable time period, and/or an applicable Hypervisor.

VM monitoring system 155 can include an interface engine 375 that enables a reviewer 115 to request a performance report and/or receive a performance report. The report can include one or more statistics, states, and/or alarm statuses. The report can identify which component and/or time period are associated with the statistic, state and/or alarm status. Interface engine 375 can present most-recent or substantially real-time values (e.g., numerical statistics or states) and/or historical values. In some instances, interface engine accesses a set of values for a given component, and generates and presents a table, list, or graph to illustrate a change in a performance. The report can also include activity pertaining to a component and/or time period (e.g., tasks assigned, task statuses, etc.).

Interface engine 375 can receive input from reviewer 115, which can cause different information to be presented to the user. In some instances, interface engine 375 merely accesses different data (e.g., states, statistics, alarm statuses and/or activities) from data store 320, 345, and/or 360. Interface engine 375 can then present the accessed data itself or generate and present a representation of the data (e.g., generate and present a graph). In some instances, the input causes interface engine 375 to request that aggregator 325 aggregate different performance metrics, that statistics generator 340 generate different statistics, that state engine 350 generate different states and/or that alarm engine 365 re-assess alarm criteria. The new data can then be presented to reviewer 115. Thus, the report can be dynamic.

In some instances, the input can include selection of a component. The selection can lead to a presentation (and potentially a generation of) more detailed data pertaining to the component and/or to a presentation of data pertaining to components that are children of the selected component. This former strategy can encourage a user to follow branches down an architecture tree to find, e.g., a source of a high-level problem or to understand best-performing branches.

While activity data store 320, statistics data store 345 and states data store 360 are shown separately, it will be appreciated that two or more of the data stores can be combined in a single data store. Each of one, more or all of the data stores can include a time-series data store. In one instance, a performance event can be generated to identify one or more of each of a value or values of a performance metric, statistic or state. For example, a performance event can include a task-completion rate for a single VM over the past hour. A single event can be generated to include performance values for an individual hypervisor component, performance values for each of multiple hypervisor components, or performance values for each hypervisor component in a Hypervisor.

The performance event can identify one or more multiple components. For example, when a performance event includes performance values for multiple components, the performance event can identify the component and/or other multiple components with particular familial relationships (e.g., parent, grandparent, child) to the component in a Hypervisor environment.

Each performance event can be time stamped or can otherwise be associated with a time. The time stamp or time can indicate a time or time period for which performance data identified in the event applies. Performance events (e.g., time stamped performance events) can be stored in one or more time-series data stores. Thus, select performance events corresponding to a time period of interest (of a reviewer) can be retrieved and analyzed As described, statistics generator 340 can generate statistics and/or state engine 350 can generate states based on collected values of one or more performance metrics. In one instance, the statistic and/or state generation is performed in real-time subsequent to collection of values (i.e., performance measurements) of one or more performance metrics. Alternatively or additionally, statistics and/or states can be determined retrospectively. For example, time stamped performance events can include raw values for performance metrics. Periodically, or in response to receiving a query, performance events within a time period be retrieved and one or more statistics and/or one or more states can be generated based on the retrieved events. This retrospective analysis can allow for dynamic definitions of states and/or statistics. For example, a reviewer can define a statistic to facilitate a particular outlier detection or a reviewer can adjust a stringency of a "warning" state.

Figure 5A:
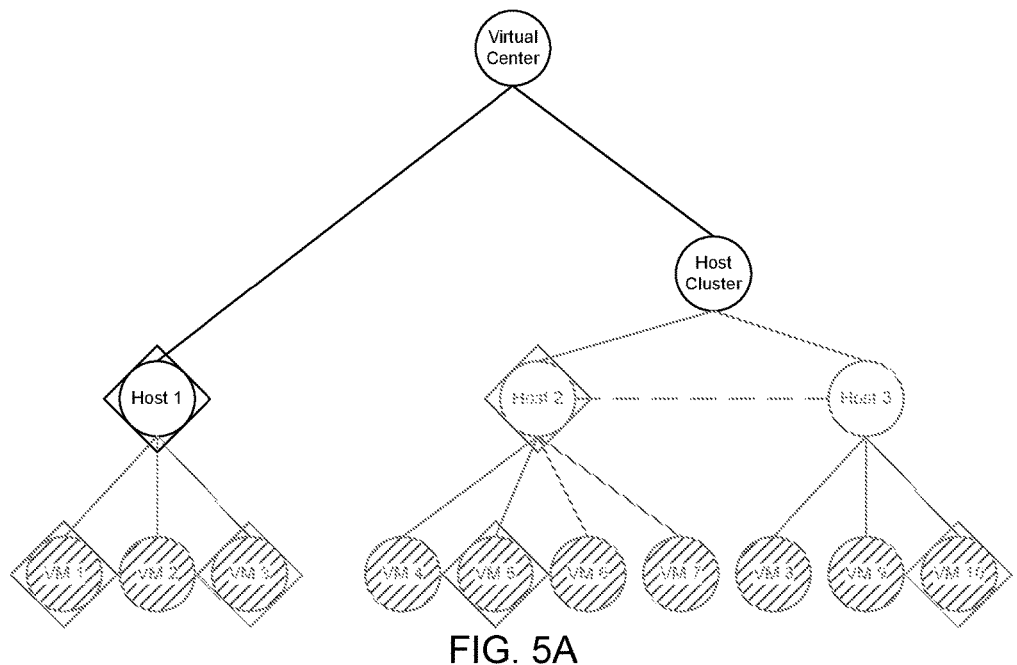
FIGS. 5A-5B illustrate an example of sequential presentations conveying an architecture and system performance that can be presented to a reviewer.
Figure 5B:
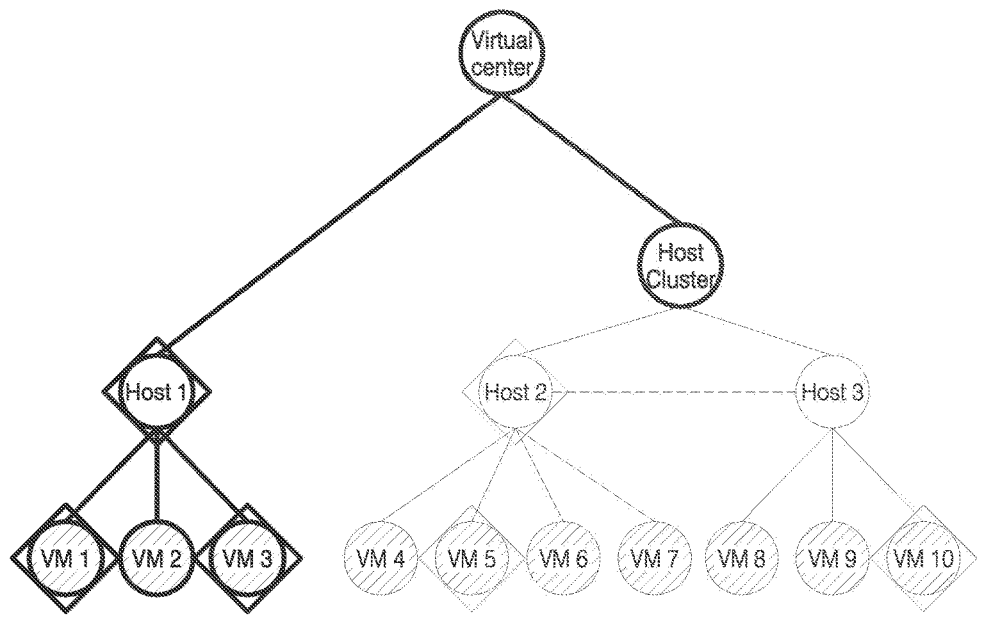

FIGS. 5A-5B illustrate an example of sequential presentations conveying an architecture and system performance that can be presented to a reviewer 125. In FIG. 5A, three relatively high-level nodes are presented. Specifically a highest-level node is presented along with its children. In this instance, the children are at different levels in order to ensure that each presented node has multiple children. It will be appreciated that in other embodiments, the depicted children nodes are in the same level (e.g., such that another "Host Cluster" would be a parent of "Host 1" and have no other children).

As shown, this architecture includes 12 nodes that are hidden in the representation in FIG. 5A. The node hiding can help a user focus on a most likely lower-level cause of an overall sub-par performance.

An overall state of the represented components is indicated based on whether the node is surrounded by a diamond. In this case, nodes in a warning state are surrounded by a diamond. It will be appreciated that other state indicators (e.g., colors, text, icon presence or a number) can be used instead of or in addition to the surrounding indicator.

In this example, a reviewer 125 can select a node by clicking on it. FIG. 5B shows a representation of the architecture and system performance after reviewer 125 selected the Host 1 node (having a warning-state indicator). At this point, the children of Host 1 appear. Two of the child VM nodes also have a warning-state indicator.

FIG. 5B also illustrates how presentations can indicate which nodes are parent nodes. In this case, "fills" or patterns of the node convey this characteristic, with pattern nodes indicating that the nodes are not parents.

The structure-based and concise presentations shown in FIGS. 5A and 5B allow a reviewer to drill down into sub-optimal system performance, to easily understand which system components are properly operating and to easily understand architecture underlying a Hypervisor. However, more detailed performance information can also be presented to a reviewer. For example, detailed information can appear as a transient pop-up when a reviewer 125 hovers a cursor over a component and/or can appear as a report when a reviewer 125 double clicks on a node.

In some instances, an architecture provider 105 and reviewer 125 are a same party. The reviewer 125 can then review a representation, such as one shown in FIGS. 5A-5B and access performance indicators of specific system components. In the same-party instances, reviewer 125 can use the same representation to modify an architecture. For example, reviewer 125 can add, move or delete connections, move child components, add and/or remove components. Reviewer 125 can also select a particular component (e.g., by double clicking a node) and change its properties.

Figure 6A:
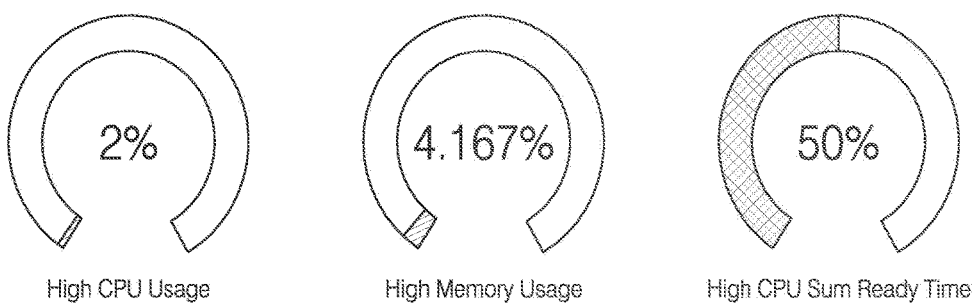
FIGS. 6A-6C illustrate example detailed information that can be presented to characterize performance of a hypervisor system, a host and a VM, respectively.
Figure 6B:
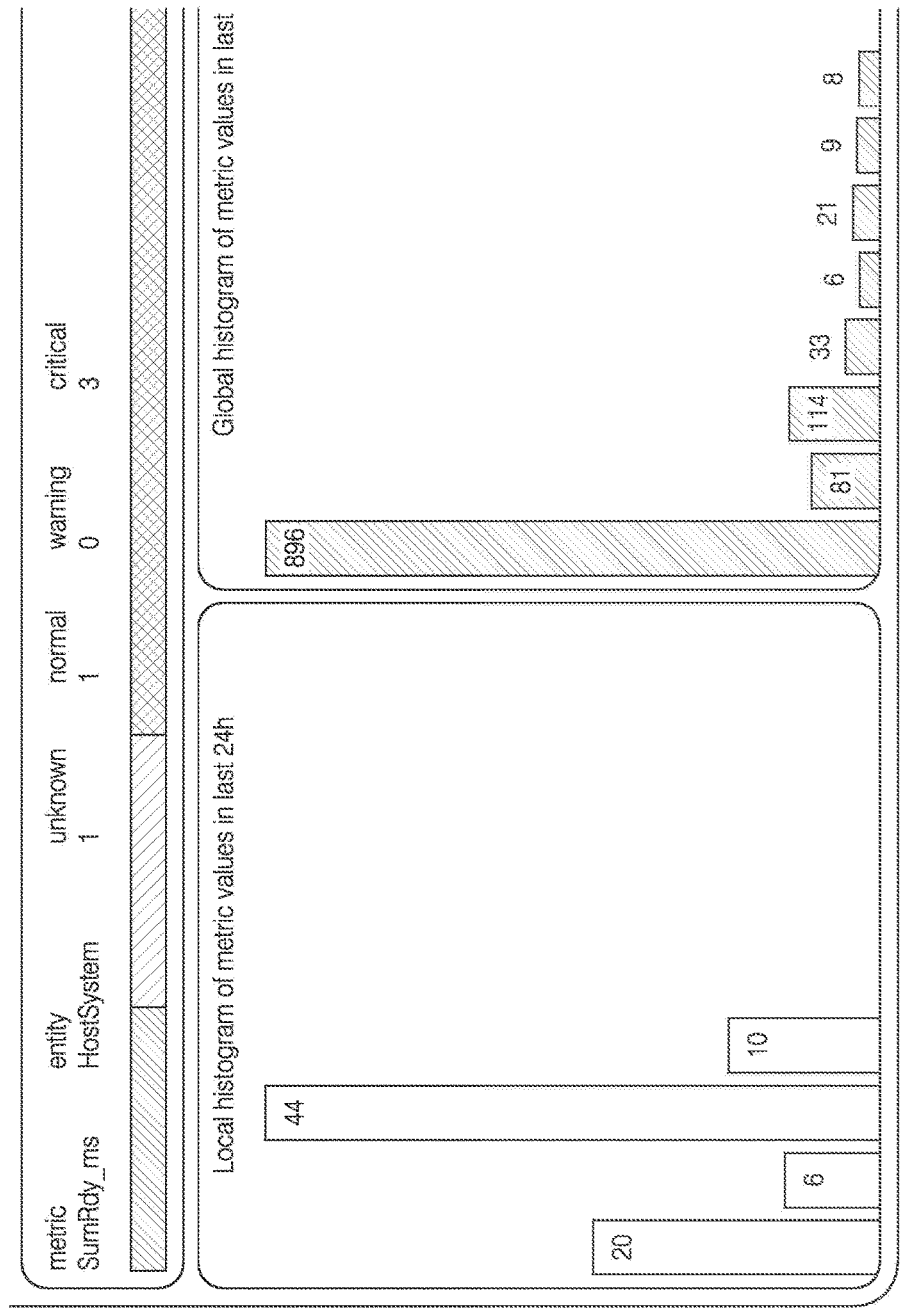
Figure 6C:
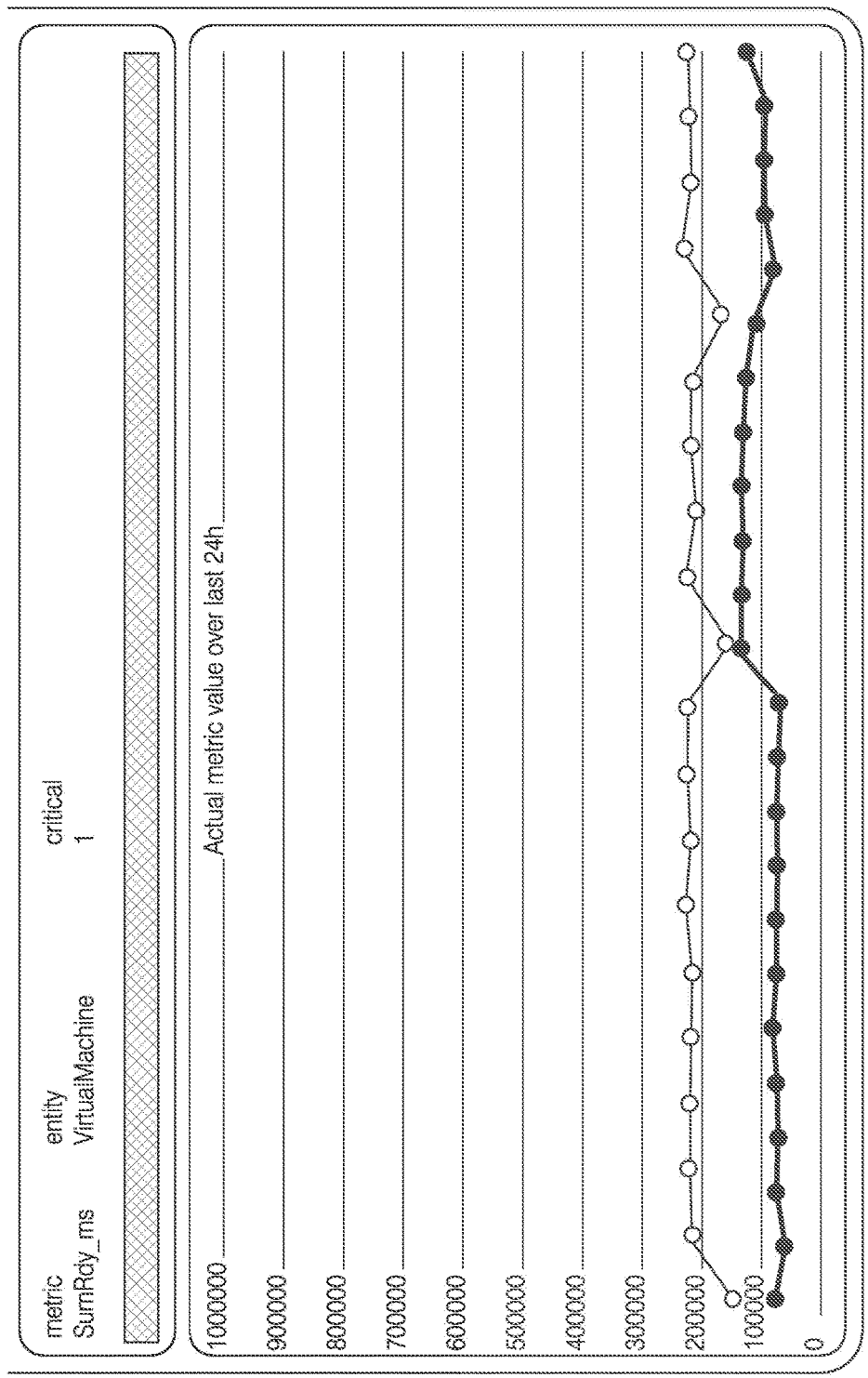

FIGS. 6A-6C illustrate example detailed information that can be presented to characterize performance of a Hypervisor, a host and a VM, respectively. These graphics can be presented in response to a reviewer 125 hovering over a specific hypervisor component. FIG. 6A shows gauges presenting information pertaining to an overall Hypervisor. The gauges identify a percentage of VMs in a Hypervisor having undesirable states. The left gauge shows a percentage of VMs with a state for CPU usage in a "high" category. The middle gauge shows a percentage of VMs with a state for memory usage in a "high" category. The right gauge shows a percentage of VMs within a state for an amount of time a VM is waiting to use a processor that is in a "high" category. Thus, 33% of VMs are seemingly affected in their processing capabilities based on overloading of 2% of VMs. Thus, it would be useful to identify which VMs are within the 2% and/or 4.2% and a source of the problem for those VMs.

It will be appreciated that other high-level performance indicators can be presented (e.g., ones related to memory. For example, other gauges could identify memory performance indicators. For example, a gauge could identify a percentage of hosts with a "high" amount of memory being used, having a "high" amount of memory ballooning (during which a host is requesting memory be returned from a VM to the host), or having a "high" amount of memory swapping (during which a host is forcefully taking back memory from a VM). Host processing characteristics (e.g., a percentage of hosts with "high" CPU usage) can also be presented for hosts.

These same gauges could be associated with a node representation of an IT system component (e.g., a node representing a virtual center, cluster (of hosts), a host, or a virtual machine) to indicate a performance measurement (relative to a maximum for the corresponding metric) for the component or to indicate the percentage of child components of the component that are in various states. In such an embodiment, the gauge could partially surround the representation of the node, sitting (e.g.) just above the representation of the node. Where the gauge shows states of child component, each color of the gauge takes up a percentage of the gauge corresponding to the percentage of child components having a state corresponding to the color.

FIG. 6B shows information pertaining to a particular host in a Hypervisor. The presented data compares performance characteristics of the host's children to more global comparable characteristics. The left bar graph shows a histogram across VMs assigned to the host identifying a sum-ready performance metric (identifying a time that the VM must wait before using a processor). The right bar graph is comparable but characterizes all VMs within a Hypervisor. In this instance, the right histogram is highly skewed to the left, while the left histogram does not exhibit a similar skew. The histogram thus suggests that the sub-network of the host and its children is not operating as well as is possible.

FIG. 6C shows a time-graph of the same waiting-time metrics for a VM across period of times (in the lighter line). Specifically, each point in the graph represents the performance value of waiting-time metrics for a period of time. A comparable average for the performance values of the waiting-time metrics across all VMs is simultaneously presented (in the darker line). The higher values underscore sub-optimal performance, as the processor is experiencing higher than average wait times. This presentation allows a reviewer 125 to understand whether a VM's performance is particularly poor relative to other VMs' performances, to identify whether and when any substantial changes in the performance occurred, and to identify and when poor performance is becoming a consistent problem. Further, the historical plot may allow a reviewer 125 to notice a positive or negative trend in the values of one or more performance metrics, such that a problem can be remedied before it becomes serious.

The historical presentation in FIG. 6C thus offers valuable insight as to a component's performance, when a change in performance occurred, and whether the performance warrants a change in the VM architecture. The historical presentation, however, requires that historical performance characteristics be stored and indexed (e.g., by time and/or component). This is complicated by the fact that this can be a very large amount of data. Storing all raw values of performance metrics involves not only storing a very large amount of data, but also repeatedly re-aggregating the values of the performance metrics and repeatedly recalculating the historical performance statistics and/or states. This can result in a delay of a presentation to a reviewer 125, which can be particularly noticeable if the presentation is supposed to be presented transiently and quickly as the reviewer hovers his cursor over a particular depiction. Meanwhile, storing only statistics and/or states and not the values of the performance metrics limits the ability to customize which statistics and/or states are presented (e.g., by fixing time periods instead of allowing statistics to be calculated on a flexible basis depending on a reviewer's interest and reviewing time) and can itself even lead to a large amount of data to store, due to many types of performance variables being calculated at many levels (meaning that a single value of a performance metric may, in combination with other values of performance metrics, give rise to several values of performance statistics and/or states).

Figure 7B:
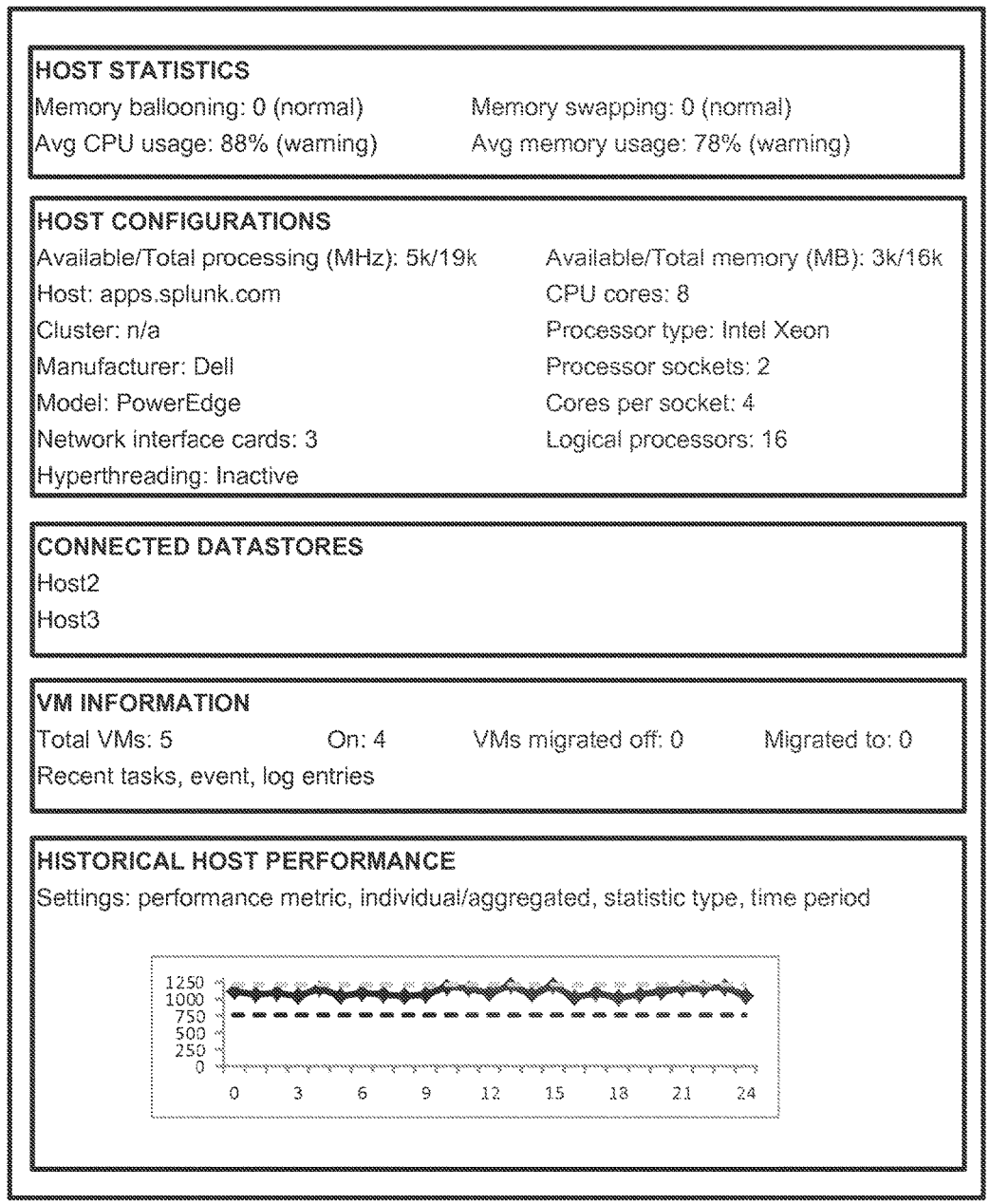
Figure 7C:
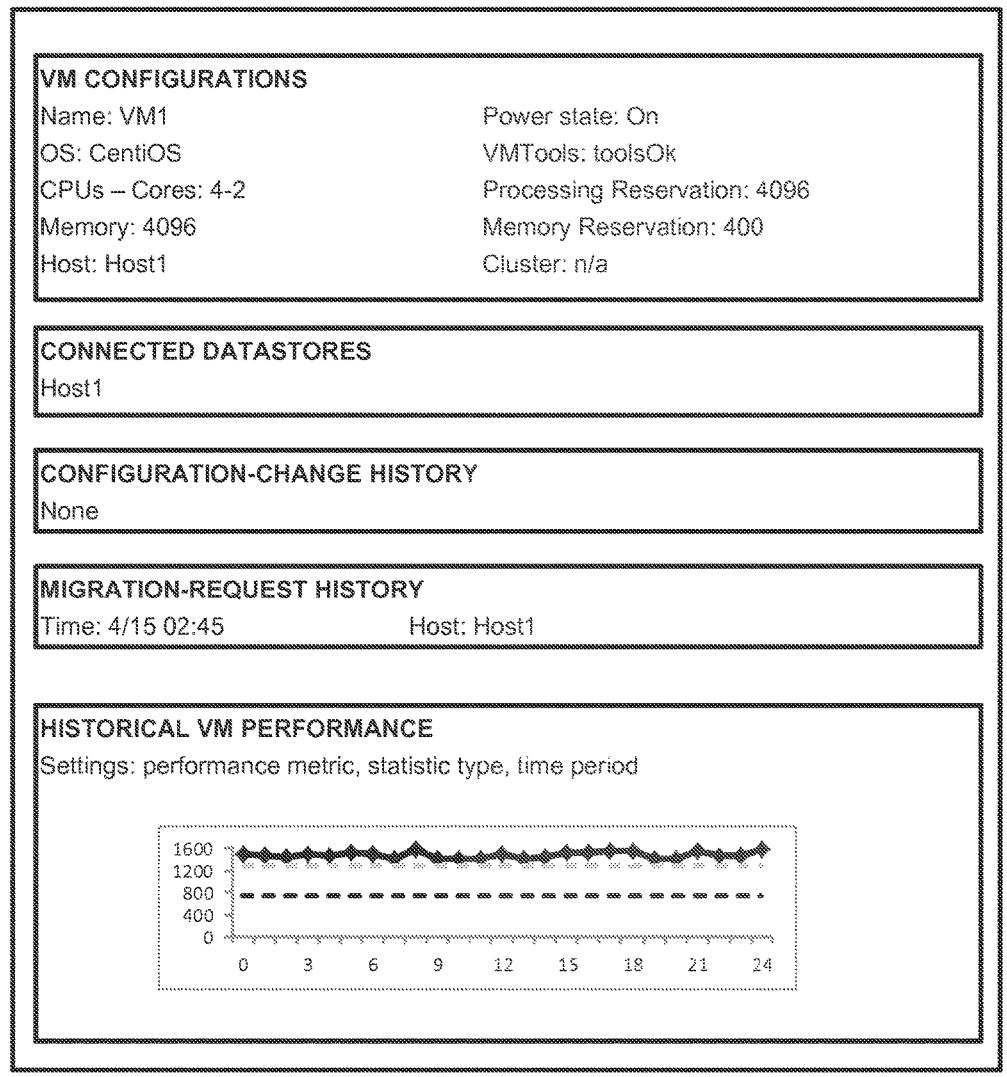

FIGS. 7A-7C further illustrate example detailed information that can be presented to characterize the performance of a Hypervisor, a host and a VM, respectively. These reports can be presented in response to a reviewer 125 selecting (e.g., by double clicking) a specific VM-system component. FIG. 7A illustrates a report for a Hypervisor. The report can include information about hosts in the system and VMs in the system. The report can identify system properties, such as a number and type of components within the system. In the illustrated example, the system includes 4 hosts and 74 VMs. The report can also characterize provider-initiated or automatic architecture changes, such as a number of times a VM automatically migrated to another host (e.g., based on a host-clustering architecture defined by an architecture provider). It will be appreciated that more and/or more detailed information can be presented regarding architecture changes, such as identifying whether the change was automatic, identifying a time of the change, and/or identifying involved components.

In this example, a host-status section identifies hosts by name and storage capacity. A current status of each host is also indicated by showing an amount of the host's capacity that is committed to serve VMs and an amount by which the host is overprovisioned. High commitment and overprovisioning numbers can be indicative of poor performance. It will be appreciated that the host information could be expanded to include, e.g., an overall or host-specific memory-ballooning or memory-swapping statistic, host-clustering arrangements, and/or an overall or host-specific CPU usage.

The report can also identify past alarms in an alarm-history section. For each alarm, an applicable component can be identified, a time of the alarm can be identified and a substance or meaning of an alarm can be identified. These alarms can identify state changes for particular components.

FIG. 7B illustrates a report for a host. Overall performance statistics and corresponding states are presented in a host-statistics section. These statistics can be recent or real-time statistics and can be equivalent to instantaneous values of one or more performance metrics or can be calculated using values of one or more performance metrics from a recent time period. A host-configurations section identifies the equipment and capabilities of the host. A connected-datastores section identifies which other hosts in the Hypervisor the instant host is connected to (e.g., via a clustering arrangement). In some instances, the section is expanded to identify a type of connection or a length of time that the connection has existed.

A VM-information section identifies VMs assigned to the host. In the illustrated example, the report identified a number of VMs that are assigned and a number of those in a power-on state. The report also identifies the number of VMs that migrated to or from the host (e.g., via a host-clustering arrangements). The report can list recent VM tasks, events and/or log entries, and can identify an applicable time, VM and description. For example, tasks can include changing a resource configuration for a VM, adding a VM to a host, and establishing a remote connection. Events can include presented alarms, VM migrations (from host to host), task migrations (from VM to VM), and warnings potential architecture problems (e.g., based on actual or predicted insufficiency of resources to support assigned child components or tasks). Log entries can include identifications of unrecognized URI versions and software warnings.

A historical-host-performance section shows how a performance statistic has been changing over time. In the depicted instance, the historical statistics (which can include a final real-time statistic) are shown graphically, along with a "normal" threshold (shown as the bottom, dark dashed line) and a "critical" threshold (shown as the top, gray dashed line). Reviewer 125 is able to set settings to control the statistical presentation. For example, reviewer 125 can identify a performance metric of interest (e.g., CPU usage, memory usage, etc.), whether data is to be aggregated across VMs to derive the statistic, a statistic type (e.g., average, median, maximum, minimum, mode, variance, etc.), and a time period (e.g., 24 hours). Other settings may further be presented, such as time discretization during the time period and graph-formatting options (e.g., marker presence, marker size, line style, axis-tick settings, etc.).

FIG. 7C illustrates a report for a VM. A VM-configurations section identifies the resources allocated to the VM and other VM and/or relationship characteristics (e.g., a name, assigned host and/or assigned cluster). A connected-data-stores section identifies which hosts are, per an existing architecture, responsible for providing resources to the VM. A configuration-change-history section identifies a time and type of a past change to the configuration of the VM and a party initiating the change.

A migration-request-history identifies any attempts and/or successes for migrating the VM from one host to the next. Thus, in this case, it appears as though the VM was attempting to migrate off of the host but failed. This report also includes a historical-performance section, which can have similar presentation and setting-changing abilities as the similar section from the host report. It will be appreciated that, e.g., thresholds can differ between the two. For example, a warning threshold can be stricter for a host, since more VMs contribute to the statistic and diminish the probability of observing extreme values.

It will also be appreciated that reports can include links to other reports. For example, in the report in FIG. 7C, a reviewer 125 can click on "Host1" to move to the report shown in FIG. 7B for that component. Thus, reviewer 125 can navigate via the reports to access performance and configuration details for related hypervisor components.

Thus, the presentations shown from FIGS. 5A-7C show a variety of ways by which a reviewer 125 can understand how a Hypervisor is structured and performing. By tying together structural and performance information, a reviewer 125 can begin to understand what architecture elements may be giving rise to performance problems and can appropriately improve the architecture. Further, the presentations show how a given performance measure compares to other performance measures. One such comparison is an inter-system-component comparison, which can enable a reviewer 125 to identify a reasonableness of a performance metric and determine a level at which a problem could best be addressed. Another such comparison is a historical comparison, which can allow reviewer 125 to identify concerning trends and/or to pinpoint times at which substantial performance changes occurred. Reviewer 125 can then review configuration-change or task histories to determine whether any events likely gave rise to the performance change.

It will be appreciated that alternative detailed information can be presented to characterize performance of a hypervisor component. The detailed information can identify information about particular tasks or types of tasks assigned to the component. The information can include events related to the tasks. For example, a reviewer 125 can click on a component assigned to index data (or a component above the indexing component in a hierarchy), and information about the events (e.g., a number of events, unique field values, etc.) and/or the events themselves can be presented. In one instance, clicking on a component can include a list of recently performed tasks. A reviewer 125 can select an event-defining and storing task, and a number of the stored events can be presented. Upon a further selection or automatically (e.g., subsequently or simultaneously), details (e.g., field values and/or time stamps) of the events can be presented, and/or the full events can be presented.

As noted herein, initial indexing tasks can create events derived from raw data, unstructured data, semi-structured data, and/or machine data (or slightly transformed versions thereof) to be stored in data stores. This storage technique can allow a reviewer to deeply investigate potential causes for poor performance. For example, a reviewer may be able to hypothesize that a component's poor performance is likely due to a type of task performed (e.g., extracting fields from events with inconsistent patterns or needing to index events without a time stamp included therein).

Figure 8:
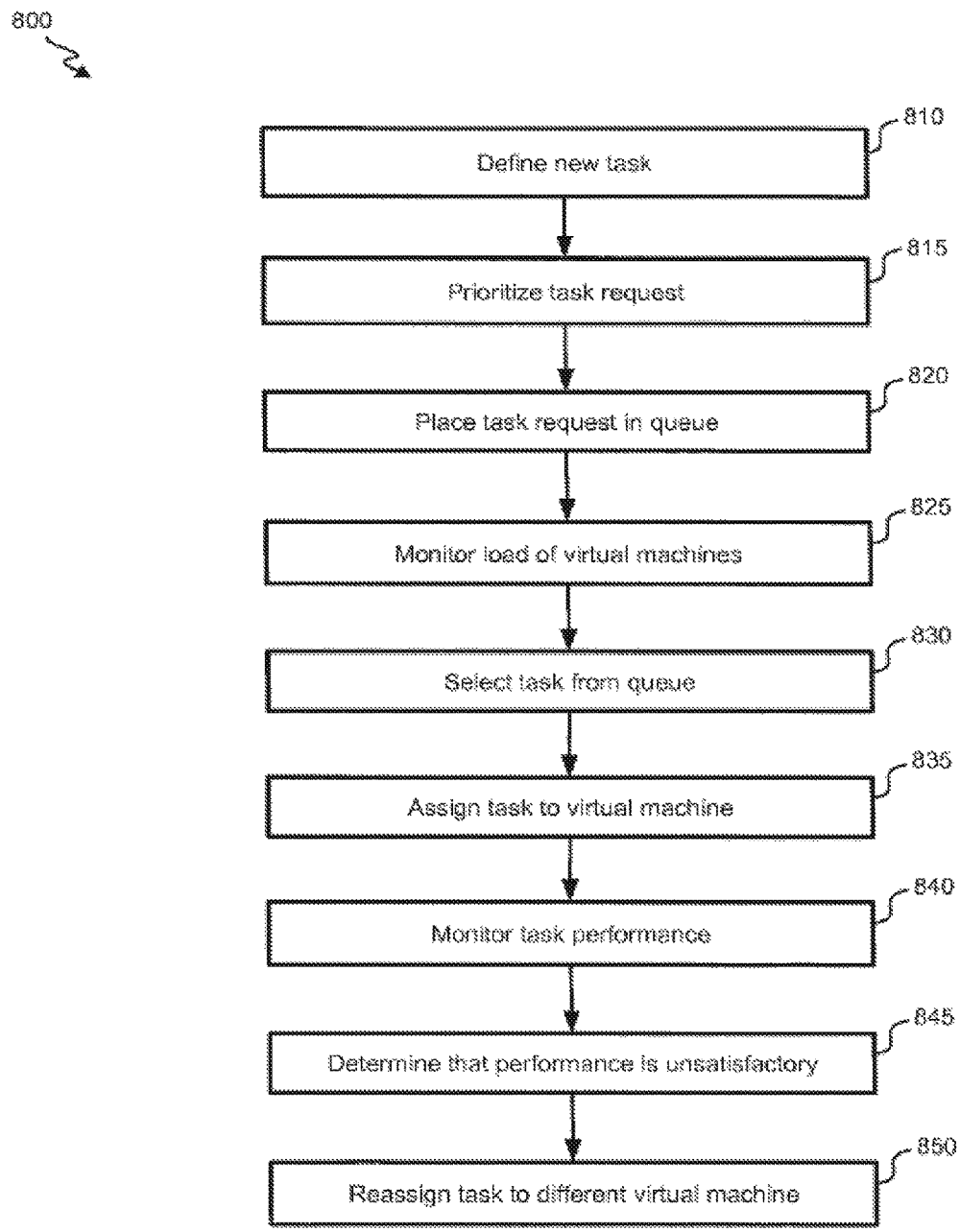
FIG. 8 illustrates a flowchart of an embodiment of a process for using a VM machine to complete user tasks.

FIG. 8 illustrates a flowchart of an embodiment of a process 800 for using a VM machine to complete user tasks. Process 800 begins at block 810, where task definer 215 defines a task. The task can be defined based on user input, a data-collection effort and/or a query. In one instance, input is received (e.g., from a user) that is indicative of a request to collect data (e.g., once or repeatedly). Task definer 215 can then define one or more tasks to collect the data. When more than one task is defined, they may be simultaneously defined or defined at different times (e.g., the times relating to collection periods identified in the request). For any given collection effort, in some instances, task definer 215 can parse the collection into sub-collections (e.g., each associated with a different portion of a collection time period), and a different task can be defined for each sub-collection.

In one instance, task definer 215 defines data-segment and storage tasks, which may be defined as data is collected or otherwise received. In one instance, task definer 215 defines one or more retrieval and/or processing tasks in response to receiving a query or determining that a query-response time is approaching. For example, a query may request a response at routine intervals, and tasks can be defined and performed in preparation for each interval's end. The query can be one defined by an authenticated user.

Prioritizer 225 prioritizes the task request (e.g., based on characteristics of user 110, characteristics of the task, system load and/or when the request was received) at block 815. The prioritization can include generating a score, assigning a priority class or assigning a ranking. Task definer 215 places a queue item identifying the task in queue 220 at block 820. The priority of the task can be reflected within the queue item itself, fby the queue item's placement within a ranking or by a priority indicator associated with the queue item. Load monitor 230 monitors loads of virtual machines (e.g., and/or hosts) at block 825. The monitoring can include detecting characteristics of tasks being processed (e.g., resource requirements, a current total processing time, and/or which user who submitted the task). Assigner 235 selects the task from queue 220 at block 830. The selection can occur, e.g., once the task is at sufficiently high priority to be selected over other tasks and can further occur once appropriate resources are available to process the task. Assigner 235 assigns the task to a VM at block 835. The VM to which the task is assigned can be a VM with sufficient available resources to process the task. Assignment to a VM can further include assigning the task to a host and/or host cluster.

Task monitor 240 monitors performance of the task at the assigned VM at block 840. For example, task monitor 240 can detect whether a VM appears to be stalled in that it has not completed the task for over a threshold duration of time. As another example, task monitor 240 can monitor how much of the VM's processing power and/or memory appears to be being consumed by the task performance. As another example, task monitor 240 can determine whether any errors are occurring during the task performance. In some instances, task monitor 240 determines that the performance is unsatisfactory at block 845 (e.g., based on too much consumption of the VM resources, too long of a processing time and/or too many errors), and assigner subsequently reassigns the task to a different VM at block 850. The different VM can be one with more resources than the initial VM, one in a larger host-clustering network, and/or one currently processing fewer or less intensive tasks as compared to those otherwise being processed by the initial VM.

In some instances, process 800 can further include generation and storage of individual task events. A task event can identify information defining a task, an identification of when a task was assigned (or reassigned) an identification of a VM to which the task was assigned and/or a performance characteristic for the task (e.g., a start and/or stop processing time, a processing-time duration and/or whether any errors occurred). The task event can be time stamped (e.g., with a time that the event was created, a time that task processing began or completed or an error time) and stored in a time-series data store.

Figure 9A:
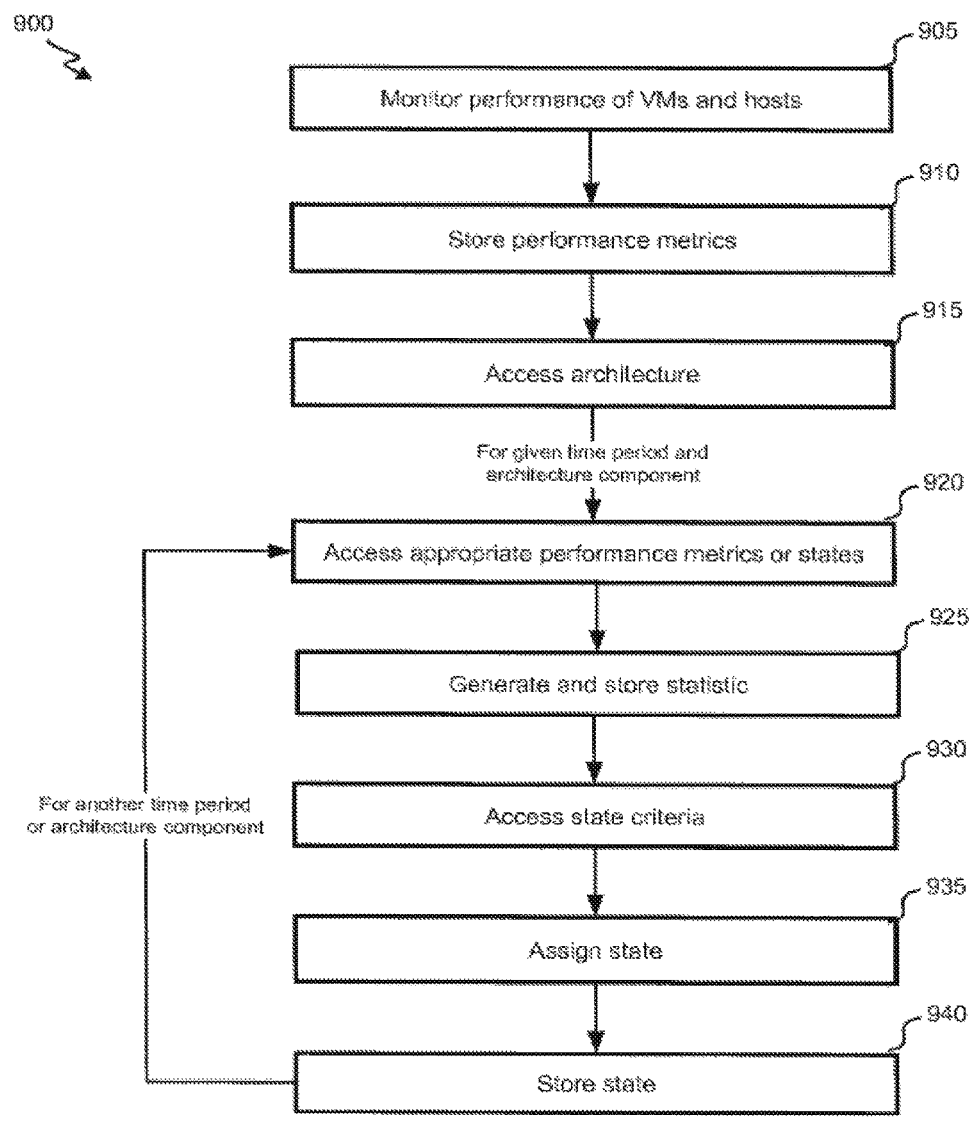
FIG. 9A illustrates a flowchart of an embodiment of a process for characterizing VM-system components' performance.

FIG. 9A illustrates a flowchart of an embodiment of a process 900 for characterizing hypervisor components' performance. Process 900 begins at block 905, where activity monitor 315 monitors performance of VMs and hosts. Through this monitoring, activity monitor 315 can detect values of performance metrics, such as CPU usage, memory usage, task assignment counts, task assignment types, task completion counts, and/or migrations to/from the VM or to/from the host. Activity monitor 315 stores the detected values of performance metrics in activity data store 320 at block 910.

Aggregator 325 accesses an applicable architecture from architecture data store 330 at block 915. The applicable architecture can be one associated with a reviewer, one randomly selected, or one defining a Hypervisor of interest. The architecture can identify some or all of the VMs and/or hosts monitored at block 905. The architecture can identify relationships from the VM to other hypervisor components.

Aggregator 325 identifies one of the components from the architecture and a time period. The time period can include a current time/time period (i.e., real-time or most recent time in activity data store 320 for the component) or a previous time period. In some instances, process 900 first characterizes performance of low-level components (e.g., VMs) before characterizing performance of high-level components.

Aggregator 325 accesses appropriate values of one or more performance metrics or states at block 920. In some instances, for low-level components, values of one or more performance metrics can be accessed from activity data store 320. In some instances, for high-level components, states of children of the components can be accessed from state data store 360. In some instances, values of one or more performance metrics are accessed from activity data store 320 for all components.

Statistics generator 340 generates a statistic based on the accessed metrics or states and stores the statistic in statistic data store 345 at block 925. The statistic can include, e.g., an average or extreme metric across the time period or a percentage of children components having been assigned to one or more specific states (e.g., any of states red, orange, or yellow).

State engine 350 accesses one or more state criteria from state-criteria data store 355 at block 930. Which state criteria are accessed can depend on which component is being assessed. In one instance, different levels in an architecture have different criteria.

State engine 350 assesses the criteria in view of the statistic to determine which state the component is in during the time period. State engine 350 then assigns the component to that state (as a present state or a past state associated with the time period) at block 935.

State engine 350 stores the state in association with the component and time period in state data store 360 at block 940. Process 900 can then return to block 920 and repeat blocks 920-940 for a different component and/or a different time period. For example, process can repeat in this manner to continue to identify and store current statistics and/or states.

It will be appreciated that values of one or more performance metrics, one or more statistics and/or one or more states can be stored in a time-series data store. In one instance, one or more events are created and stored. Each event can include one or more performance-data variables (e.g., values of performance metric, statistic and/or state) and an identifier of a hypervisor component corresponding to the performance-data variable(s). A single event can correspond to a single hypervisor component or multiple hypervisor components.

Each event can include or can otherwise be associated with a time stamp. In one instance, the time stamp corresponds to the performance-data variable(s) (e.g., indicating when performance was monitored). Each event can then be stored in a bucket in a data store that corresponds to (e.g., includes) the time stamp. This storage technique can facilitate subsequent time-based searching.

Figure 9B:
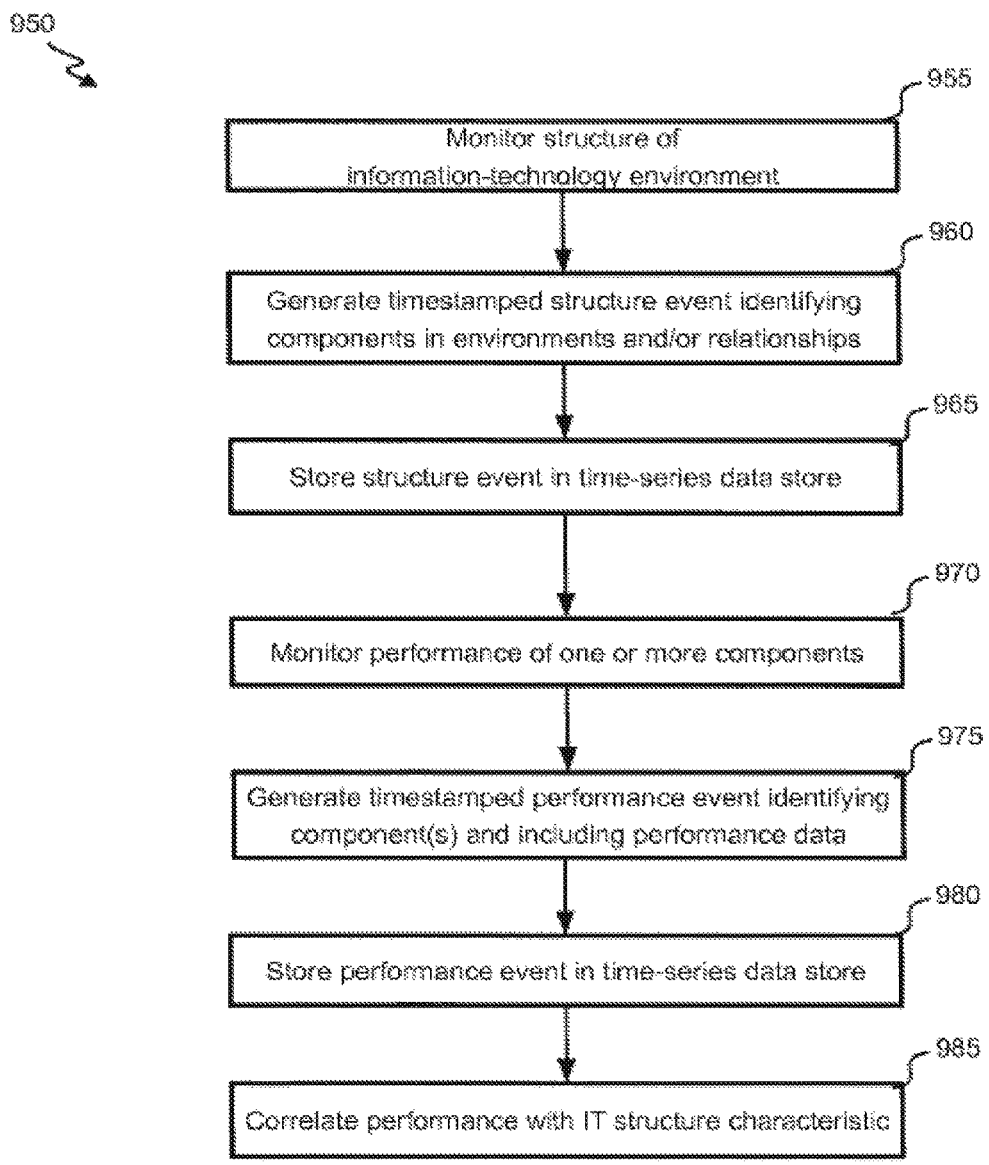
FIG. 9B illustrates a flowchart of an embodiment of a process for generating and using time stamped events to establish structure characteristics associated with a performance level.

FIG. 9B illustrates a flowchart of an embodiment of a process 950 for generating and using time stamped events to establish structure characteristics associated with strong performance. Process 950 begins at block 955, where a structure or architecture of an information-technology environment (e.g., a Hypervisor environment) is monitored. The monitoring can include determining a number of components within the environment, a number of a particular type of component (e.g., VMs, hosts or clusters in the environment), and/or relationships between components in the environment (e.g., identifying which VMs are assigned to which hosts or identifying other parent-child relationships). This monitoring can, in some instances, be accomplished by detecting each change (e.g., initiated based on input from an architecture provider) made to the structure.

At block 960, a time stamped event identifying a characteristic of the structure can be identified. The event can identify, e.g., one or more parent-child relationships and/or a number of total components (and/or components of a given type) in the environment. In one instance, the event identifies a portion or all of a hierarchy of the environment. The time stamp can be set to a time at which the characteristic was present (e.g., a time at which the structure was monitored at block 905). In one instance, multiple events include information characterizing an environment operating at a given timepoint (e.g., each even pertaining to a different component operating in the environment and identifying any parent and/or child component in a hierarchy). One or more generated structure events can be stored in a time-series data store at block 965 (e.g., by storing the event in a bucket including the time stamp of the event).

At block 970, performance of each of one, more or all components in the environment can be monitored. For example, values of one or more performance metrics can be monitored for VMs and/or hosts. In some instances, a performance statistic and/or state are generated based on the monitored metrics.

A time stamped performance event can be generated at block 975. The event can identify performance data (e.g., one or more values of metrics, statistics and/or states) for one or more components in the environment (e.g., and identifiers of the one or more components). The time stamp for the event can identify a time for which the performance data was accurate (e.g., a time of monitoring giving rise to the performance data). One or more performance events can be stored in a time-series data store at block 980. The time-series data store at which the performance events are stored can be the same as or different from the performance events at which the structure events are stored (e.g., by storing the event in a bucket including the time stamp of the event).

At block 985, performance characteristics can be correlated with characteristics of the information-technology (IT) environment. In one instance, a set of performance events and a set of structure events, each set corresponding to a time period, are retrieved from the time-series data store(s). Each of one or more performance events can be associated with structure characteristics of an information technology environment operating at that time. For example, a structure event with a time stamp most recently preceding a time stamp of a performance event can identify the structure.

After the events are retrieved, information from the events can be extracted from the events (e.g., using a late-binding schema). The information that is extracted can include performance data, component identifiers and/or structure information (e.g., parent-child relationships and/or components present in an environment).

A high-level statistic can be determined based on performance data for a set of components. For example, the high-level statistic can include an extrema (e.g., indicative of a worst or best performance), a mean, a median, a mode, a standard deviation or a range. The high-level statistic can be defined based on a fixed definition and/or input (e.g., such that a reviewer can define a high-level statistic of interest). A structure characteristic (which can be numeric) can also be determined based on extracted structure information. The structure characteristic can include, e.g., a number of total components (e.g., hosts and VMs) in an environment (e.g., Hypervisor environment); a number of a given type of components (e.g., a number of hosts or clusters) in the environment; and/or an average, median, minimum or maximum number of children of a particular type of parent (e.g., a maximum number of VMs supported by a single host or an average number of hosts assigned to a given cluster). In some instances, structure events identify changes in structure (e.g., addition of VM). In these instances, determining a structure characteristic can include modifying a previous characteristic (e.g., to identify a previous VM count and add one to the count).

Thus, a set of high-level statistics, each associated with a time, can be determined. For each statistic, a corresponding structure characteristic can be identified (e.g., by identifying a structure characteristic associated with a time most recent to a time associated with the high-level statistic; or by identifying a structure characteristic associated with a time matching a time associated with the high-level statistic). Thus, a matching set of structure characteristics can be identified. The set of high-level statistics and the set of structure characteristics can be analyzed (e.g., using a correlation analysis or model) to estimate influence of structure characteristics on performance For example, using a set of structure events, a set of VMs supported by a particular host can be identified for multiple timepoints. Corresponding performance events can then be used to establish a relationship between a number of VMs assigned to the host and a "worst" performance statistic from amongst the set of VMs. As another example, a determination can be made as to whether assigning two hosts to a single cluster improved an average performance of the two hosts as compared to independent operation of the hosts. This determination can be performed by using performance and structure events to identify, for each timepoint in a set of timepoints, a performance metric for the hosts and whether the hosts were assigned to a cluster.

One or more performance events, structure events, performance data (or high-level performance statistics), structure characteristics, and/or correlation results can be presented to a reviewer. For example, structure characteristics identified as being correlated to poor or strong performance can be identified to a user, or a relationship between a characteristic and performance can be identified.

It will be appreciated that the performance influence of structure characteristics can be investigated using alternative techniques. For example, changes (e.g., improvements or degradations) in high-level performance statistics can be detected and structure changes preceding the changes can be identified. As another example, changes in structure characteristics can be detected, and subsequent high-level performance statistics can be identified. Averages, weighted on a type or magnitude of performance or structure change can be used to evaluate influence.

Figure 10:
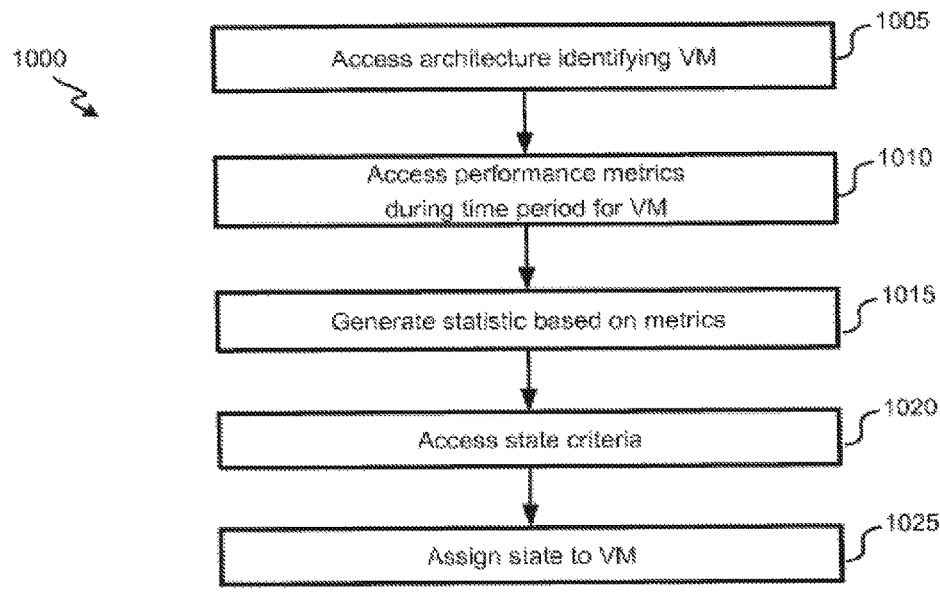
FIG. 10 illustrates a flowchart of an embodiment of a process for assigning a performance state to a low-level component in a Hypervisor.
Figure 11:
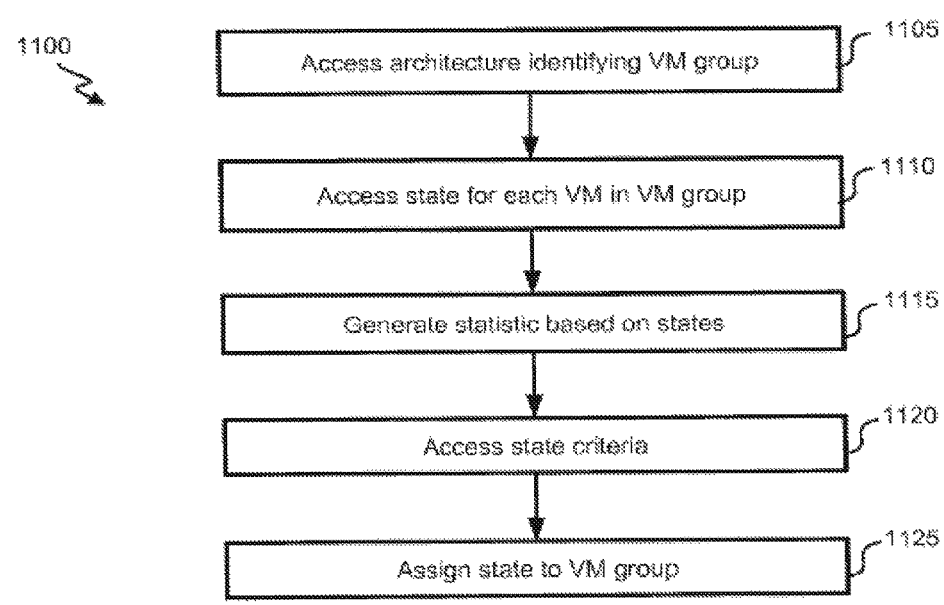
FIG. 11 illustrates a flowchart of an embodiment of a process for assigning a performance state to a high-level component in a Hypervisor.

State determinations for higher-level components can depend on direct performance measurements for a performance metric for the higher-level component, or it may depend on performances of underlying children low-level components. One technique for arriving at the higher-level state would then be to aggregate performance metrics from all children components, generate a statistic based on the aggregated metrics, and identify a state based on the statistic. However, this approach could lead to a positive state assignment even in the case where a small number of children components were performing very poorly. The aggregate analysis could over-look this problem due to the mitigation of the poor data by other positive data from properly performing children components. Thus, another approach is to first identify a state for each child component, and then to determine a state for a parent component based on the states (not the direct metrics) of the child components. The state criteria can then set forth, e.g., a threshold number of child state assignments to a negative state that would cause the parent component also to be assigned to a negative state. FIGS. 10-11 illustrate example processes for state assignments determined using this approach.

FIG. 10 illustrates a flowchart of an embodiment of a process 1000 for assigning a performance state to a low-level component in a Hypervisor. Process 1000 begins at block 1005, where aggregator 325 accesses an applicable architecture from architecture data store 330. The architecture identifies a particular VM, and aggregator 325 accesses values of one or more performance metrics characterizing the VM's performance during a time period from activity data store 320 at block 1010. Based on the values of one or more performance metrics, statistic generator 340 generates a performance statistic (e.g., an average of the metrics) at block 1015.

State engine 350 accesses one or more state criteria from state-criteria data store 355 at block 1020. In some instances, state-criteria data store 355 includes multiple criteria, which may apply to different component types (e.g., having different configurations or capabilities), different architecture levels, different architectures, and/or different reviewers. Thus, at block 1020, state engine 350 can select the criteria that are applicable to the VM and/or to a reviewing reviewer. State engine 350 evaluates the statistic in view of the accessed criteria, and, as a result of the evaluation, assigns a state to the VM at block 1020.

FIG. 11 illustrates a flowchart of an embodiment of a process 1100 for assigning a performance state to a high-level component in a Hypervisor. Process 1100 begins at block 1105, where aggregator 325 accesses an applicable architecture from architecture data store 330. This architecture can be the same architecture as accessed at block 1005 in process 1000. The architecture can include a component that is a parent of the VM from process 1000. Thus, the architecture can include a VM-group component (e.g., a host).

Aggregator 325 accesses a state, from state data store 360, for each VM in the VM group at block 1110. Statistics generator 340 generates a performance statistic based on the accessed states at block 1115. The statistic can include, e.g., an average, a percentage of VMs being assigned to a particular state, a percentage of VMs being assigned to a particular state or a worse state, etc. State engine 350 accesses state criteria from state-criteria data store 355 at block 1120. As in process 1000, this access can include selecting the criteria that are applicable to the VM group and/or reviewing reviewer. It will be appreciated that the state criteria accessed at block 1120 can differ from the state criteria accessed at block 1020. State engine 350 evaluates the statistic in view of the accessed criteria, and, as a result of the evaluation, assigns state to VM group at block 1120.

Despite the potential difference in the criteria used in processes 1000 and 1100, the types of potential states that can be assigned can be similar or the same. This can enable a reviewer 125 to easily understand how well the component is performing without having to understand the different criteria used in the assessment.

Figure 12:
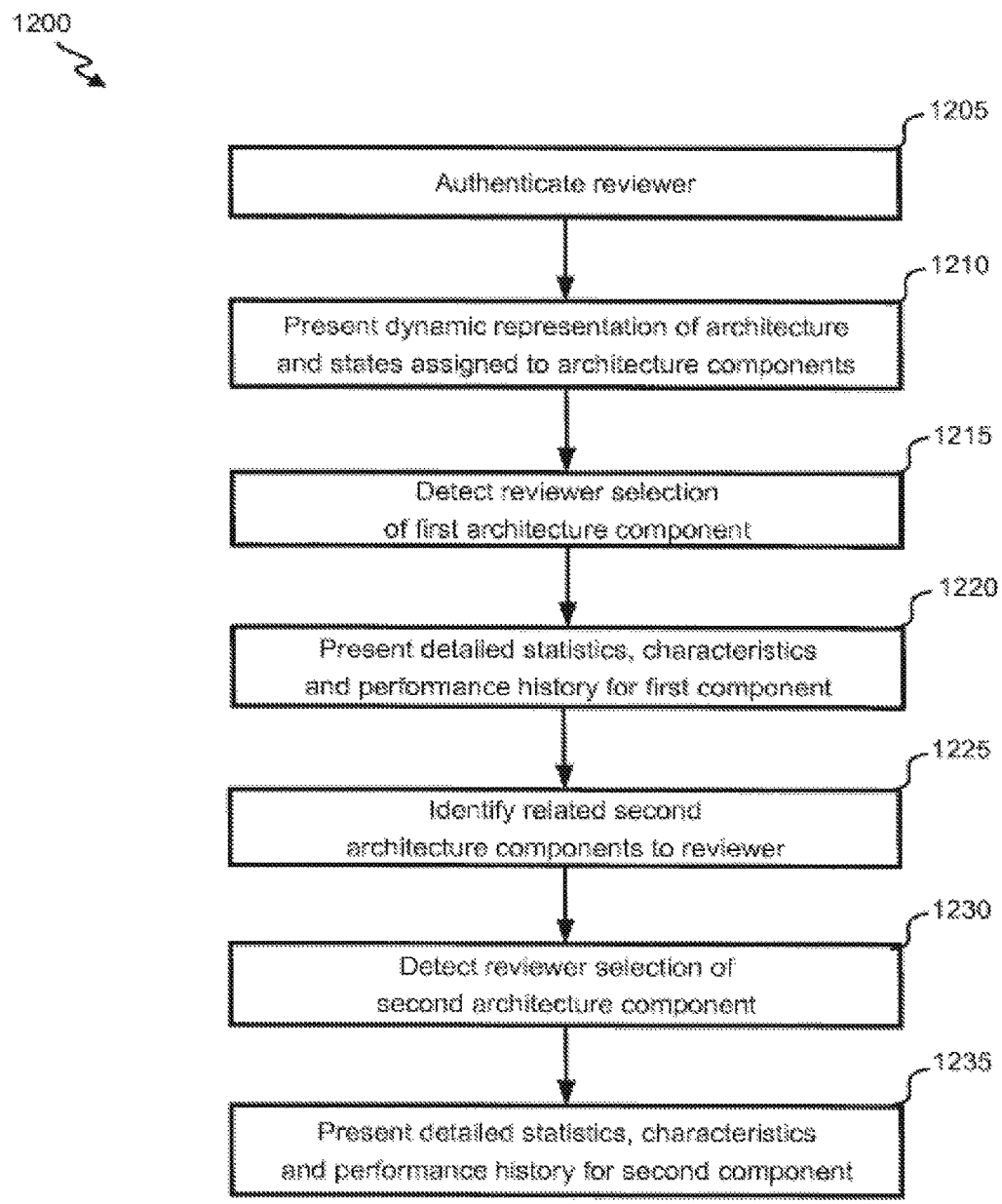
FIG. 12 illustrates a flowchart of an embodiment of a process for using a VM machine to complete user tasks.

FIG. 12 illustrates a flowchart of an embodiment of a process 1200 for using a VM machine to complete user tasks. Process 1200 begins at block 1205, where reviewer account engine 305 authenticates a reviewer 125.

At block 1210, interface engine 375 presents, to reviewer 125, a dynamic representation of at least part of an architecture of a Hypervisor and, for each of a set of components represented in the architecture, a performance state assigned to the component. In some instances, the architecture and performance states are simultaneously represented to reviewer 125.

The architecture can be presented by displaying a series of nodes—each node representing a hypervisor component. The nodes can be connected to show relationships. Relationships can include, e.g., resource-providing relationships (e.g., between a host and VM), migration-enabling relationships (e.g., between two hosts in a cluster, which can be denoted via a direct connection or an indirect connection via an upper level host-cluster component). The nodes can be presented in a hierarchical manner, and relationships can include familial (e.g., parent-child) relationships. It will be appreciated that the architecture can be presented in a variety of other manners. For example, a series of lists can identify, for each of a set of components, respective "children" components. As another example, rows and columns in a matrix can identify columns, and cells in the matrix can identify relationship presence and/or a type of relationship.

The presentation of the architecture can include identifying all components and relationships in the architecture or a subset of the components and relationships. The subset can include, e.g., components in a highest level in the architecture or in the highest n levels (e.g., n being 2, 3, 4, etc.) and not components in the lower levels. Such a representation can encourage a reviewer 125 to assess a Hypervisor's performance in a top-down manner, rather than requiring that a reviewer 125 already know a lower-level source of sub-optimal performance.

A performance state can be represented by a color, word, pattern, icon, or line width. For example, nodes in a representation of an architecture can have an appearance characteristic (e.g., a line color, a line thickness, or a shading) that depends on the state of the represented component.

The performance state can include an overall performance state. The overall performance state can be determined based on a plurality of factors, such as CPU usage, memory usage, task-processing times, task-processing intake numbers, and/or received or transmitted task migrations. In some instances, a value for each factor is identified and weighted, and a sum of the weighted values is used to determine the overall performance state. In some instances, an overall performance state depends on whether any of one or more factors fail respective satisfaction criteria or fall into a particular state (e.g., a warning state).

In some instances, the performance state is not an overall performance state but instead relates to a particular performance factors. States pertaining to different performance factors can be simultaneously presented (e.g., via matrices or lists or via repeated presentation of a family tree with state distinguishers). In one instance, a single family tree is shown to represent the architecture, and each node can have a graphical element (e.g., a line width, line color, shading, icon presence, etc.) that represents a state for one performance factor. Thus, e.g., by looking at line width, a reviewer 125 could evaluate CPU-usage performances, and, by looking at line color, reviewer 125 could evaluate memory-usage performances.

In some instances, a reviewer 125 can select a performance factor of interest. For example, a user can select "CPU usage" from a performance-factor menu, and nodes in a family tree can then be differentially represented based on their CPU-usage performance.

Interface engine 375 detects a selection from reviewer 125 of a first architecture component at block 1215. The selection can include, e.g., clicking on or hovering over a component representation (e.g., a node, column heading, or row heading).

Interface engine 375 presents a detailed performance statistic, component characteristic and/or performance history for selected first component at block 1220. The statistic, characteristic and/or history can pertain to the first component or to a child or children of the first components. A performance statistic can include a recent or real-time performance statistic (e.g., average CPU usage). A component characteristic can include, e.g., resources assigned to the component or equipment of the component. A performance history can include a past performance statistic. In some instances, a statistic and/or performance history is presented with a threshold value or a comparison (e.g., population) value. The presentation can include a numerical, text and/or graphical presentation. For example, performance history can be shown in a line graph. In some instances, different statistics, characteristics and/or performance history is presented based on a selection characteristic. For example, hovering over a component node can cause an overall performance statistic for the component to be shown, while more detailed statistics and/or structure characteristics can be presented responsive to a clicking on the component node.

Also responsive to the reviewer's selection, interface engine 375 presents identifications of one or more second architecture components related to the first architecture component at block 1225. This identification can include expanding a representation of the architecture to include representations of the second components (which may have been previously hidden). In some instances, part of the architecture that was initially presented is also hidden at block 1225. This can include, e.g., nodes of components along a non-selected branch in a family-tree architecture. The second components can include components that are children of the first architecture component. States assigned to the second architecture components can also be (e.g., simultaneously) presented.

Interface engine 375 detects a reviewer's selection of one of the identified second architecture components at block 1230. The selection can include a same or similar type of selection as that detected at block 1215.

Interface engine 375 presents a detailed performance statistic, component characteristic and/or performance history for the selected second component at block 1235. The presentation at block 1235 can mirror that at block 1220 or can be different. In some instances, the presentation at block 1220 relates to performances and/or characteristics of child components of the first component, and the presentation at block 1235 relates to a performance and/or characteristic of the second component (e.g., as the second component may not have child components).

Figure 13:
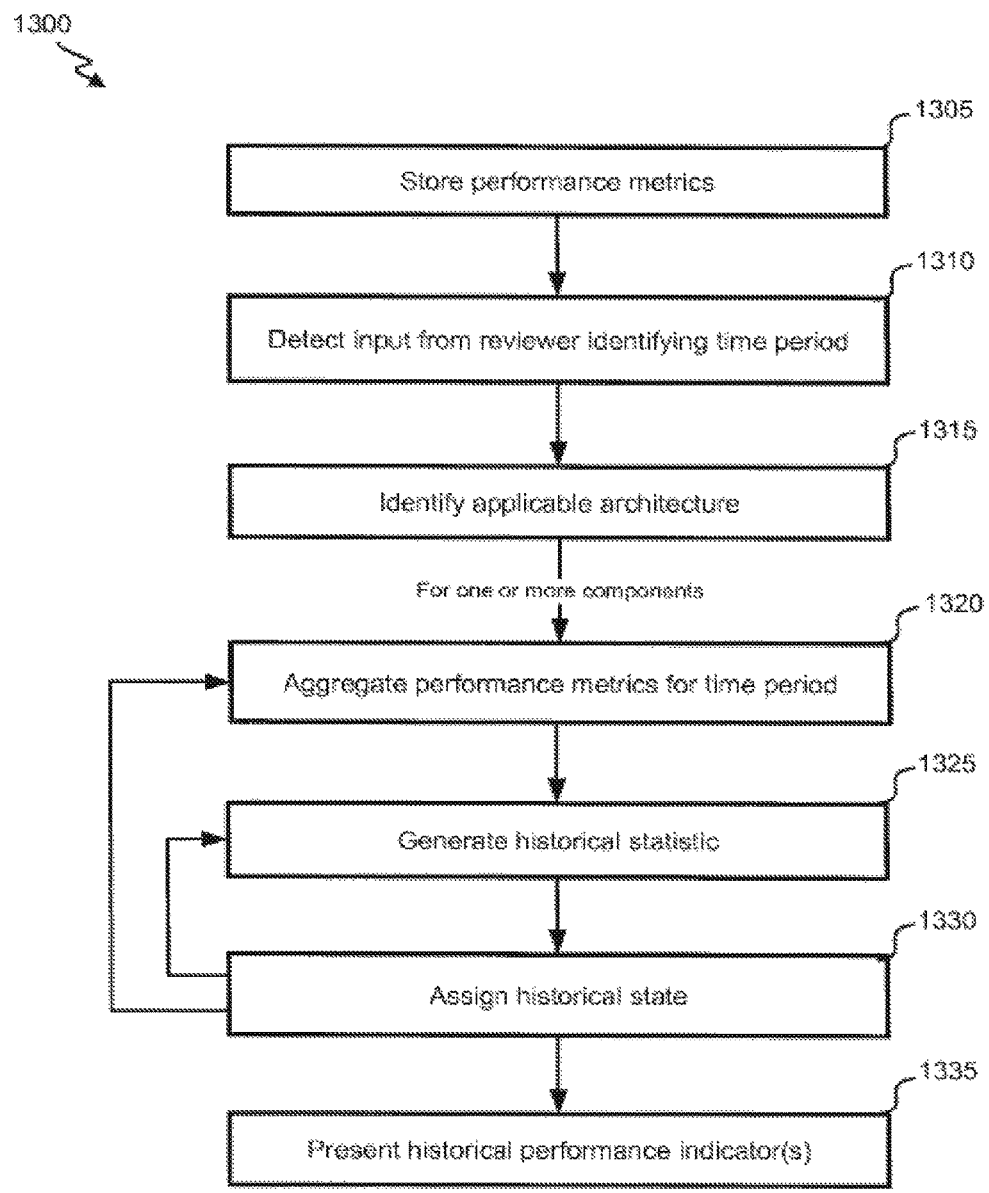
FIG. 13 illustrates a flowchart of an embodiment of a process for analyzing the performance of a Hypervisor using historical data.

FIG. 13 illustrates a flowchart of an embodiment of a process 1300 for analyzing the performance of a Hypervisor using historical data. Process 1300 begins at block 1305, where activity monitor 315 stores the detected performance metrics in activity data store 320. Block 1305 can parallel block 910 from process 900. Interface engine 375 detects input from a reviewer 125 at block 1310. The input can identify a time period. Identification of the time period can include identifying a duration of the time period and/or identifying one or both endpoints of the time period. Identification of an endpoint can include identifying an absolute date and/or time (e.g., Apr. 1, 2013, 1 pm) or a relative date and/or time (14 days ago). The input can include a discretization that can be used to define discrete time intervals within the time period. The input can include entry of a number and/or text and/or selection of an option (e.g. using a scroll-down menu, a sliding cursor bar, list menu options, etc.).

In some instances, a beginning and/or end endpoint of the time period can be at least 1, 2, 3, 7, 14, or 21 days or 1, 2, 3, 6, or 12 months prior to the detection of the input. The time period can have a duration that is at least, that is, or that is less than, 1, 4, 8 12 or 24 hours; 1, 2, or 4 weeks or 1, 2 or 3 months. Time periods for intra-time-period time intervals can be equal to or less than 1, 5, 15 or 30 seconds; 1, 5, 15 or 30 minutes; or 1, 2, 4 or 6 hours. The time period could be any time period going back as far as when performance measurements started to be collected.

Architecture manager 335 identifies an applicable architecture at block 1315. The architecture can be one that characterized a structure of the Hypervisor during the identified time period. In some instances, the architecture differs from a current architecture. The architecture can be explicitly or implicitly identified. As an example of implicit identification, activity data store 320 can index performance metrics according to direct and indirect components. Thus, a VM CPU usage can be associated with both an identifier of the respective VM and an identifier of a host connected to the VM at the time that the metric was obtained.

Process 1300 continues then to perform blocks 1320-1330 or 1325-1330 for each of one, more or all components in the architecture. In instances in which the time period is to be analyzed in a discretized manner, blocks 1320-1330 or 1325-1330 can also be repeated for each discrete time interval in the time period. In these latter cases, it will be appreciated that multiple applicable architectures can be identified to account for any architecture changes during the time period.

Statistics generator 340 generates a historical statistic at block 1320. The historical statistic can be of a type similar or the same as a performance statistic described herein and can be determined in a similar manner as described herein. It will thus be appreciated that, e.g., depending on a component type, a historical statistic can be determined directly based on the performance metrics (e.g., to determine an average CPU usage) or can be determined based on lower-level component states (e.g., to determine a percentage of VMs with warning-level CPU usages).

State engine 350 accesses an appropriate state criterion and evaluates the generated statistic in view of the criterion. Based on the evaluation, state engine 350 assigns a historical state to the component at block 1330. Interface engine 375 presents historical performance indicator(s). The historical indicators can include historical statistics and/or historical states. As before, the performance indicators can be simultaneously presented along with a representation of the applicable architecture (e.g., by distinguishing appearances of nodes in an architecture family tree based on their states).

Thus, granular low-level performance data can be dynamically accessed and analyzed based on performance characteristics and time periods of interest to a reviewer 125. By scanning through time periods, reviewer 125 may be able to identify time points at which performance changed. Reviewer 125 can then drill down into the component details to understand potential reasons for the change or note any time-locked architecture. Simultaneous presentation of performance indicators and architecture representations aid in the ability to detect temporal coincidence of architecture changes and performance changes.

As noted above, tasks assigned to components can include defining, storing, retrieving and/or processing events. Techniques described herein can then be used to gain an understanding about whether tasks can be defined and/or assigned in a different manner which would improve such operation (e.g., improve an overall efficiency or improve an efficiency pertaining to a particular type of event). Techniques can further be used to identify types of events that generally result in poor performance or that result in poor performance when assigned to particular components (or component types) in an information technology environment. Events involved in the tasks can include a variety of types of events, including those generated and used in SPLUNK® ENTERPRISE. Further details of underlying architecture of SPLUNK® ENTERPRISE are now provided.

Figure 14:
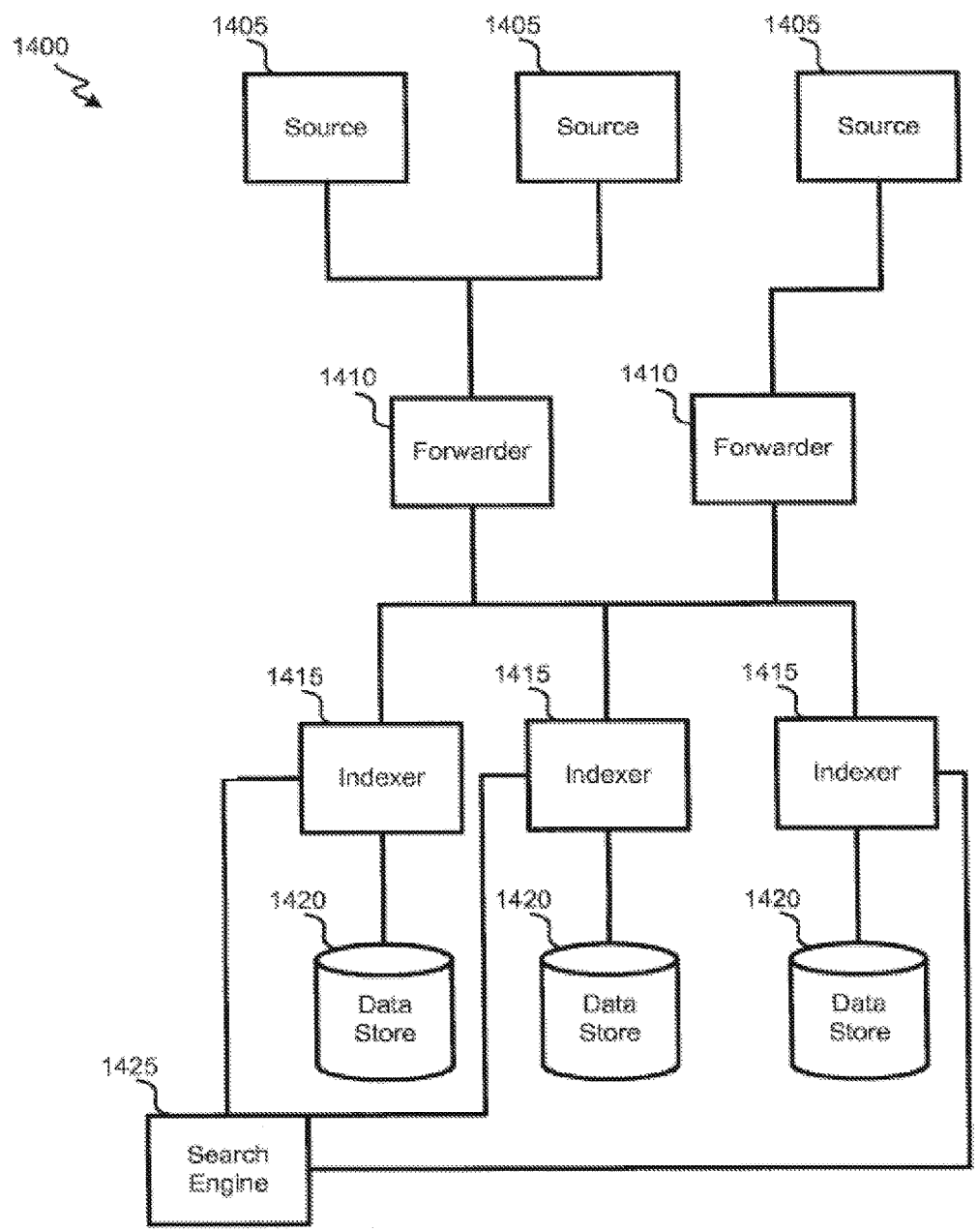
FIG. 14 shows a block diagram of an embodiment of a data intake and query system.

FIG. 14 shows a block diagram of SPLUNK® ENTERPRISE's data intake and query system 1400. Data intake and query system 1400 can include Hypervisor components (e.g., a forwarder 1410 or indexer 1415), which are assigned tasks and monitored, as described in greater detail herein. For example, forwarders 1410 can be assigned data-collection tasks; indexers 1415 can be assigned tasks for segmenting collected data into time stamped data events, storing the data events in a time-series event data store, retrieving select events (e.g., data events, performance events, task events and/or structure events) and/or processing retrieved events. It will therefore be appreciated that the components identified in system 1400 are given a functional name. In some exemplary instances, distinct components are defined as forwarders and others as indexers. Nevertheless, in some instances, components are not rigidly functionally defined, such that a single component may be assigned two or more of data-collecting, indexing or retrieval tasks.

Generally, system 1400 includes one or more forwarders 1410 that collect data from a variety of different data sources 1405, which can include one or more hosts, host clusters, and/or VMs discussed above, and forwards the data to one or more indexers 1415. The data typically includes streams of time-series data. Time-series data refers to any data that can be segmented such that each segment can be associated with a time stamp. The data can be structured, unstructured, or semi-structured and can come from files and directories. Unstructured data is data that is not organized to facilitate the extraction of values for fields from the data, as is often the case with machine data and web logs, two popular data sources for SPLUNK® ENTERPRISE.

Tasks defined to a given forwarder can therefore identify a data source, a source type and/or a collection time. In some instances, tasks can further instruct a forwarder to tag collected data with metadata (e.g., identifying a source and/or source-type, such as the one or more hosts 145 and VMs 150 discussed above) and/or to compress the data.

Figure 15:
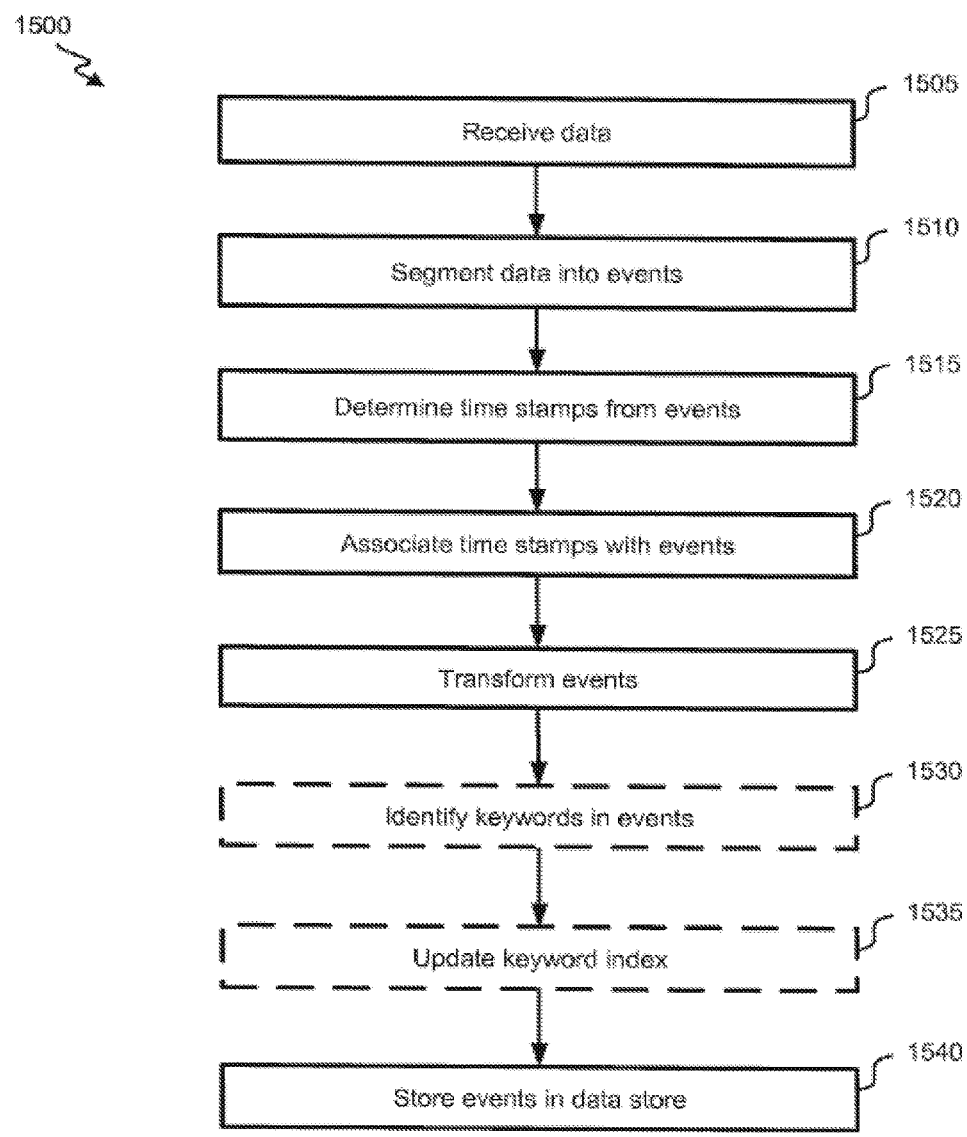
FIG. 15 illustrates a flowchart of an embodiment of a process for storing collected data.

Tasks can also relate to indexing of accessible (e.g., collected or received) data, which can be performed by one or more indexers 1415. FIG. 15 is a flowchart of a process that indexers 1415 may use to process, index, and store data received from the forwarders 1410. At block 1505, an indexer 1415 receives data (e.g., from a forwarder 1410). At block 1510, the data is segmented into data events. The data events can be broken at event boundaries, which can include character combinations and/or line breaks. In some instances, event boundaries are discovered automatically by the software, and in other instances, they may be configured by the user.

A time stamp is determined for each data event at block 1515. The time stamp can be determined by extracting the time from data in the data event or by interpolating the time based on time stamps from other data events. In alternative embodiments, a time stamp may be determined from the time the data was received or generated. The time stamp is associated with each data event at block 1520. For example, the time stamp may be stored as metadata for the data event.

At block 1525, the data included in a given data event may be transformed. Such a transformation can include such things as removing part of a data event (e.g., a portion used to define event boundaries) or removing redundant portions of an event. A client may specify a portion to remove using a regular expression or any similar method.

Optionally, a key word index can be built to facilitate fast keyword searching of data events. To build such an index, in block 1530, a set of keywords contained in the data events is identified. At block 1535, each identified keyword is included in an index, which associates with each stored keyword pointers to each data event containing that keyword (or locations within data events where that keyword is found). When a keyword-based query is received by an indexer, the indexer may then consult this index to quickly find those data events containing the keyword without having to examine again each individual event, thereby greatly accelerating keyword searches.

Data events are stored in an event data store at block 1540. The event data store can be the same as or different than a task data store, performance data store and/or structure data store. The data can be stored in working, short-term and/or long-term memory in a manner retrievable by query. The time stamp may be stored along with each event to help optimize searching the events by time range.

In some instances, the event data store includes a plurality of individual storage buckets, each corresponding to a time range. A data event can then be stored in a bucket associated with a time range inclusive of the event's time stamp. This not only optimizes time based searches, but it can allow events with recent time stamps that may have a higher likelihood of being accessed to be stored at preferable memory locations that lend to quicker subsequent retrieval (such as flash memory instead of hard-drive memory).

Figure 16:
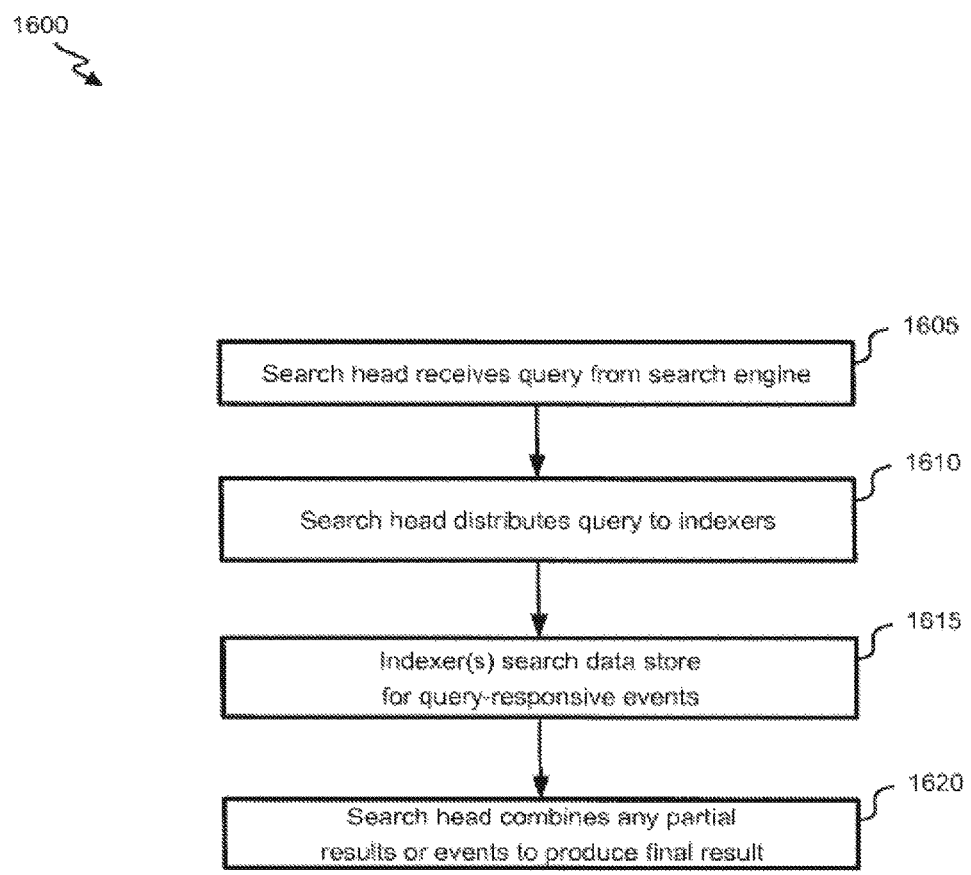
FIG. 16 illustrates a flowchart of an embodiment of a process for generating a query result.

As shown in FIG. 14, event data stores 1420 may be distributed across multiple indexers, each responsible for storing and searching a subset of the events generated by the system. By distributing the time-based buckets among them, they can find events responsive to a query in parallel using map-reduce techniques, each returning their partial responses to the query to a search head that combines the results together to answer the query. It will be appreciated that task events, performance events and/or structure events can also be stored in the same or different time-series data stores that are accessible to each of multiple indexers. Thus, queries pertaining to a variety of types of events (or combinations thereof) can be efficiently performed. This query handling is illustrated in FIG. 16.

At block 1605, a search head receives a query from a search engine. The query can include an automatic query (e.g., periodically executed to evaluate performance) or a query triggered based on input. The query can include an identification of a time period, a constraint (e.g., constraining which events are to be processed for the query, where the constraint can include a field value), and/or a variable of interest (e.g., a field and/or a statistic type). The query can pertain to a single type of event or multiple types of events. For example, a query may request a list of structure characteristics of an environment (e.g., number of VMs in a Hypervisor) during time periods of strong high-level performance (e.g., a minimum VM performance statistic above a threshold). As another example, a query can request data events indexed by a component during an hour of poorest performance over the last 24 hours. Processing this request can then include retrieving and analyzing performance events (to identify the poor-performance hour), task events (to identify tasks performed by the component in the hour), and the data events indexed according to the identified tasks. As another example, an automatic query that routinely evaluates performance correlations can request that structure events be evaluated to detect structure changes and that performance events be analyzed to determine any effect that the changes had on performance.

At block 1610, the search head distributes the query to one or more distributed indexers. These indexers can include those with access to event data stores, performance data stores and/or structure data stores having events responsive to the query. For example, the indexers can include those with access to events with time stamps within part or all of a time period identified in the query.

At block 1615, one or more indexers to which the query was distributed searches its data store for events responsive to the query. To determine events responsive to the query, a searching indexer finds events specified by the criteria in the query. Initially, a searching indexer can identify time buckets corresponding to a time period for the query. The searching indexer can then search for events within the buckets for those that, e.g., have particular keywords or contain a specified value or values for a specified field or fields (because this employs a late-binding schema, extraction of values from events to determine those that meet the specified criteria occurs at the time this query is processed). For example, the searching indexer can search for performance events with performance data corresponding to a particular host (e.g., by searching for an identifier of the host) or search for weblog events with an identifier of a particular user device.

It should be appreciated that, to achieve high availability and to provide for disaster recovery, events may be replicated in multiple event data stores, in which case indexers with access to the redundant events would not respond to the query by processing the redundant events. The indexers may either stream the relevant events back to the search head or use the events to calculate a partial result responsive to the query and send the partial result back to the search head.

At block 1620, the search head combines all the partial results or events received from the parallel processing together to determine a final result responsive to the query. In some instances, processing is performed, which can include extracting values of one or more particular fields corresponding to the query, analyzing the values (e.g., to determine a statistic for a field or to determine a relationship between fields).

A query result can be displayed to a reviewer. The query result can include extracted values from retrieved events, full retrieved events, a summary variable based on extracted values from retrieved events (e.g., a statistic, correlation result or model parameter) and/or a graphic (e.g., depicting a change in extracted field values over time or correspondences between values of one field and values of another field. In some instances, the display is interactive, such that more detailed information is iteratively presented in response to inputs. For example, a first performance indicator for a component can be presented. A selection input can cause information identifying a number of indexing events performed by the component during a time period. A further input can cause extracted values from indexed events to be presented. A further input can cause the events themselves to be presented.

One or more of the blocks in process 1500 and/or process 1600 can include an action defined in a task. The task can include appropriate information. For example, a task can indicate how events are to be transformed or whether keywords are to be identified or a keyword index is to be updated. As another example, a task can include a time period (e.g., such that a data-indexing or event-retrieving effort can be divided amongst indexers).

Data intake and query system 1400 and the processes described with respect to FIGS. 14-16 are further discussed and elaborated upon in Carasso, David. Exploring Splunk Search Processing Language (SPL) Primer and Cookbook. New York: CITO Research, 2012 and in Ledion Bitincka, Archana Ganapathi, Stephen Sorkin, and Steve Zhang. Optimizing data analysis with a semi-structured time series data store. In SLAML, 2010. Each of these references is hereby incorporated by reference in its entirety for all purposes.

Disclosures herein can therefore enable reviewers to directly review current or historical performance data, to view performance data concurrently with other data (e.g., characteristics of a structure of a corresponding environment or characteristics of data indexed at a time corresponding to the performance data) and/or to identify relationships between types of information (e.g., determining which tasks, task assignments or structure characteristics are associated with strong performance). Based on a user-entered time range, it may also be possible to correlate performance measurements in the time range for a performance metric with log data from that same time range (where the log data and/or the performance measurements may both be stored in the form of time-stamped events).

SPLUNK® ENTERPRISE can accelerate queries building on overlapping data, by generating intermediate summaries of select events that can then be used in place of again retrieving and processing the events when the same query is repeatedly run but later repeats include newer events as well as the older events. This can be particularly useful when performance data is routinely evaluated (e.g., alone or in combination with other data types). For example, a query can be generated for repeated execution. To perform this acceleration, a summary of data responsive to a query can be periodically generated. The summaries can correspond to defined, non-overlapping time periods covered by the report. The summaries may (or may not) pertain to a particular query. For example, where the query is meant to identify events meeting specified criteria, a summary for a given time period may include (or may identify or may identify time-points for) only those events meeting the criteria. Likewise, if the query is for a statistic calculated from events, such as the number of events meeting certain criteria, then a summary for a given time period may be the number of events in that period meeting the criteria.

New execution of a query identifying a query time period (e.g., last 24 hours) can then build on summaries associated with summary time periods fully or partly within the query time period. This processing can save the work of having to re-run the query on a time period for which a summary was generated, so only the newer data needs to be accounted for. Summaries of historical time periods may also be accumulated to save the work of re-running the query on each historical time period whenever the report is updated. Such summaries can be created for all queries or a subset of queries (e.g., those that are scheduled for multiple execution). A determination can be automatically made from a query as to whether generation of updated reports can be accelerated by creating intermediate summaries for past time periods. If it can, then at a given execution of a query, appropriate events can be retrieved and field values can be extracted. One or more intermediate summaries (associated with a time period not overlapping with another corresponding summary) can be created and stored.

At each subsequent execution of the query (or execution of another query building on the same data), a determination can be made as to whether intermediate summaries have been generated covering parts of the time period covered by the current query execution. If such summaries exist, then a query response is based on the information from the summaries; optionally, if additional data has been received that has not yet been summarized but that is required to generate a complete result, then the query is run on this data and, together with the data from the intermediate summaries, the updated current report is generated. This process repeats each time a query using overlapping event data summarized in a summary is performed. This report acceleration method is used by SPLUNK® ENTERPRISE. It is also described in U.S. patent application Ser. No. 13/037,279, which is hereby incorporated by reference in its entirety for all purposes.

Figure 17:
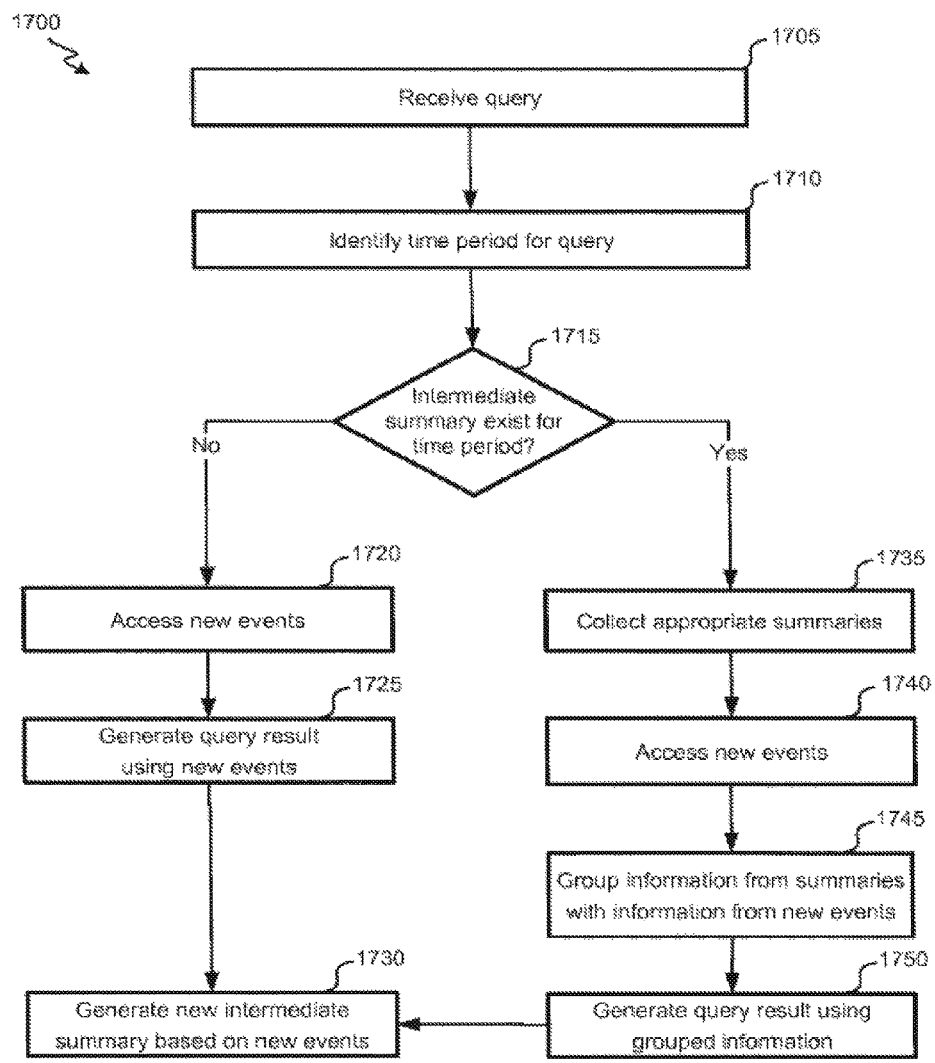
FIG. 17 illustrates a flowchart of an embodiment of a process for using intermediate information summaries to accelerate generation a query result.

FIG. 17 is a flow chart showing how to accelerate automatically query processing using intermediate summaries. At block 1705, a query is received. The query can include one generated based on reviewer input or automatically performed. For example, a query can be repeatedly performed to evaluate recent performance of a Hypervisor. The query may include a specification of an absolute time period (e.g., Jan. 5, 2013-Jan. 12, 2013) or relative time period (e.g., last week). The query can include, e.g., specification of a component of interest (e.g., VM #5), a component type of interest (e.g., host), a relationship of interest (e.g., number of child VMs supported by a single host) and/or a performance variable of interest (e.g., component-specific task-completion latency, average memory usage).

A time period for the query can be identified at block 1710. This time period can include an absolute time period, with a start and end time and date of the query. A determination can be made at block 1715 as to whether an intermediate summary applicable to the query exists for the query time period. Stored intermediate summaries can be scanned to identify those that are associated with summary time periods partly (or fully) within the query time period. Further, selection can be restricted to match data types pertinent to the query. For example, when a query relates purely to performance data, intermediate summaries relating only to structure data can be avoided.

When it is determined that there is not a pertinent intermediate summary associated with a summary time range that includes a portion (e.g., any portion or a new portion) of the query time range, process 1700 continues to block 1720 where new events pertaining to the query are retrieved from one or more data stores. At block 1725, a query result is generated using the events. In some situations, one or more intermediate summaries of retrieved events are generated at block 1730. Each summary can be associated with a summary time period (e.g., defined based on time stamps of the events), event type (e.g., performance, structure, data or task) and/or variable type (e.g., a type of performance variable).

When it is determined that one or more intermediate summaries exist that summarize query-pertinent data and that are associated with a summary time range that includes a summary time range that includes a portion (e.g., any portion or new portion) of the query time range, process 1700 continues to block 1735, where those identified summaries are collected. At block 1740, any new events not summarized in a collected summary yet pertinent to the query are retrieved. Information from the collected one or more summaries can be combined with information from the new events at block 1745. For example, values can be extracted from the new events and combined with values identified in the intermediate summary. A query result (e.g., including a population statistic, relationship or graph) can be generated using the grouped information at block 1750. Process 1700 can then continue to block 1730 to generate one or more intermediate summaries based on the new events.

It will be appreciated that process 1700 may be modified to omit blocks 1740, 1745 and 1730. This modification may be appropriate when existing summaries are sufficient for generating a complete and responsive query result.

An acceleration technique that can be used in addition to or instead of intermediate summaries is use of a lexicon. For each of one or more fields, a lexicon can identify the field, can identify one or more values for the field, and can identify (and/or point to) one or more events having each of the identified values for the field. Thus, for example, a first query execution can result in retrieval of a first set of events. Values for one or more fields (e.g., a performance metric) can be extracted from the events (e.g., using a learned or defined late-binding schema). A lexicon can be generated, accessed and/or modified that includes a set of values inclusive of the field values. The values in the lexicon can be a single number, a list of numbers or a range of numbers.

For each retrieved event, a representation of the event can be added to the lexicon. The representation can include an identifier, a pointer to the event, or an anonymous count increment. The lexicon can be associated with a time period that includes time stamps of events contributing to the lexicon. A lexicon may also or alternatively contain a set of keywords (or tokens) and pointers to events that contain those keywords. This enables fast keyword searching.

As described with reference to intermediate summaries, intermediate lexicons can be generated for non-overlapping time periods. Subsequent queries can then use and/or build on lexicons with relevant data to generate a result. For example, a number of events associated with a given lexicon value can be counted, an average field value can be determined or estimated (e.g., based on counts across multiple lexicon values), or correlations between multiple fields can be determined (e.g., since entries for multiple lexicon values can identify a single event). In one instance, correlations can also be determined based on data in multiple lexicons. For example, each point in a set of points analyzed for a correlation or model analysis can correspond to a lexicon and can represent frequencies of values of multiple fields in the lexicon (e.g., a first lexicon having an average value of X1 for field F1 and an average value of Y1 for field F2, and a second lexicon having an average value of X2 for field F1 and an average value of Y2 for field F2). U.S. application Ser. No. 13/475,798, filed on May 18, 2012 provides additional detail relating to lexicon, and the application is hereby incorporated by reference for all purposes.

Another acceleration technique that can be used in addition to or instead of intermediate summaries and/or a lexicon is a high performance analytics store, which may take the form of data model acceleration (i.e., automatically adding any fields in a data model into the high performance analytics store). Data model acceleration thus allows for the acceleration of all of the fields defined in a data model. When a data model is accelerated, any pivot or report generated by that data model may be completed much quicker than it would without the acceleration, even if the data model represents a significantly large dataset.

Two exemplary types of data model acceleration may include: ad hoc and persistent data model acceleration. Ad hoc acceleration may be applied to a single object, run over all time, and exist for the duration of a given session. By contrast, persistent acceleration may be turned on by an administrator, operate in the background, and scoped to shorter time ranges, such as a week or a month. Persistent acceleration may be used any time a search is run against an object in an acceleration-enabled data model.

Data model acceleration makes use of SPLUNK® ENTERPRISE's high performance analytics store (HPAS) technology, which builds summaries alongside the buckets in indexes. Also, like report acceleration discussed above, persistent data model acceleration is easy to enable by selecting a data model to accelerate and selecting a summary time range. A summary is then built that spans the indicated time range. When the summary is complete, any pivot, report, or dashboard panel that uses an accelerated data model object will run against the summary rather than the full array of raw data whenever possible. Thus, the result return time may be improved significantly.

Data model acceleration summaries take the form of a time-series index. Each data model acceleration summary contains records of the indexed fields in the selected dataset and all of the index locations of those fields. These data model acceleration summaries make up the high performance analytics store. Collectively, these summaries are optimized to accelerate a range of analytical searches involving a specific set of fields—the set of fields defined as attributes in the accelerated data model.

Figure 18:
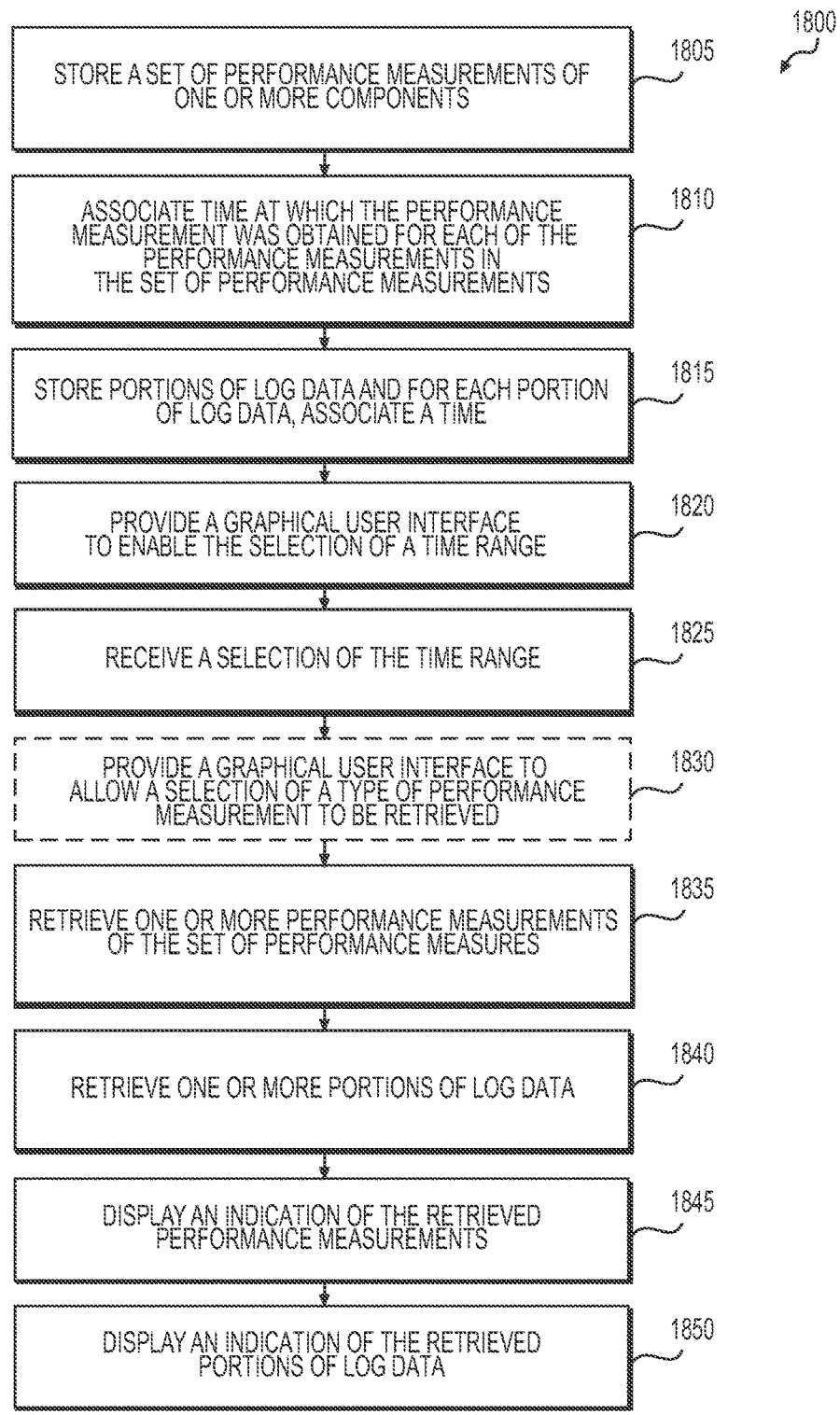
FIG. 18 illustrates a flowchart of an embodiment of a process for displaying performance measurements and log data over a selected time range.

FIG. 18 is a flow chart showing an exemplary process 1800 for correlating performance measurements/values of one or more of the performance metrics mentioned above of one or more hosts, host clusters, and/or VMs with machine data from the one or more hosts, host clusters, and/or VMs. Process 1800 begins at block 1805 where a set of performance measurements (i.e., values of one or more of the above-mentioned performance metrics) of one or more components of the IT environment are stored, as discussed above, for example, in regards to FIGS. 9A and 9B. The one or more components of the IT environment may include one or more of each of a host, a cluster, and/or a virtual machine ("VM"). The performance measurements may be obtained through an application programming interface (API) before being stored. The performance measurements may be determined by directly observing the performance of a component, or the performance measurements may be determined through any of the above-mentioned methods of monitoring performance measurements. Further, it is possible for the performance measurements to be determined without any reference (direct or indirect) to log data.

At block 1810, for each of the performance measurements in the set of performance measurements, a time at which the performance measurement was obtained (or a time to which the performance measurement relates) is associated with the performance measurement. Each performance measurement may be stored in any searchable manner, including as a searchable performance event associated with a time stamp. The time stamp for the performance event may be the associated time at which the performance measurement was obtained.

Process 1800 continues on to block 1815, in which portions of log data produced by the IT environment are stored. For each portion of log data, a time is associated with that portion. This block is similar to the process as discussed above in regards to FIG. 15. Each of the portions of log data may be stored as a searchable event associated with a time stamp. The time stamp for the event that includes the portion of log data may be the associated time for that portion of log data.

At block 1820, a graphical user interface is provided to enable the selection of a time range. (See FIGS. 19A-19F below). Then, at block 1825, through the graphical user interface, a selection of the time range is received. Optionally, the graphical user interface may allow a selection of a type of performance measurement to be retrieved at block 1830. If a selection of a type of performance measurement is received, only the one or more performance measurements of the selected type are retrieved.

The process 1800 then proceeds to block 1835 where one or more performance measurements of the set of performance measures stored at block 1805 are retrieved. Each of the performance measurements that are retrieved has an associated time that is within the selected time range received at block 1825. Also, if optional block 1830 is performed, each of the one or more performance measurements includes the performance measurement of the selected type. At block 1840, one or more portions of log data stored at block 1810 are retrieved. Each of these retrieved portions of log data has an associated time that is within the selected time range received at block 1825.

The retrieved one or more performance measurements and the retrieved one or more portions of log data may relate to the same host. The retrieved one or more performance measurements may relate to a cluster and the one or more portions of log data may relate to a host in the cluster. Further, the retrieved one or more performance measurements may relate to a virtual machine and the one or more portions of log data may relate to a host on which that virtual machine has run. A graphical user interface may be provided to allow a selection of a component. If a component is selected, the retrieved one or more performance measurements and the retrieved one or more portions of log data may relate to the same selected component.

Once the one or more performance measurements and one or more portions of log data are retrieved, the process proceeds to block 1845 where an indication is displayed for the retrieved performance measurements that have associated times within the selected time range. At block 1850, an indication of the retrieved portions of log data that have associated times within the selected time range is displayed. The displayed indication of the retrieved performance measurements may be displayed concurrently with the displaying of the indication of the retrieved portions of log data. Alternatively, the displayed indication of the retrieved performance measurements may be displayed at a different time than the displaying of the indication of the retrieved portions of log data. Further, it is possible to display the indication of the retrieved performance measurements in a same window as the indication of the retrieved portions of log data. (See FIGS. 20A and 20B below). It is also possible to display the indication of the retrieved performance measurements in a different window than the indication of the retrieved portions of log data.

Figure 19A:
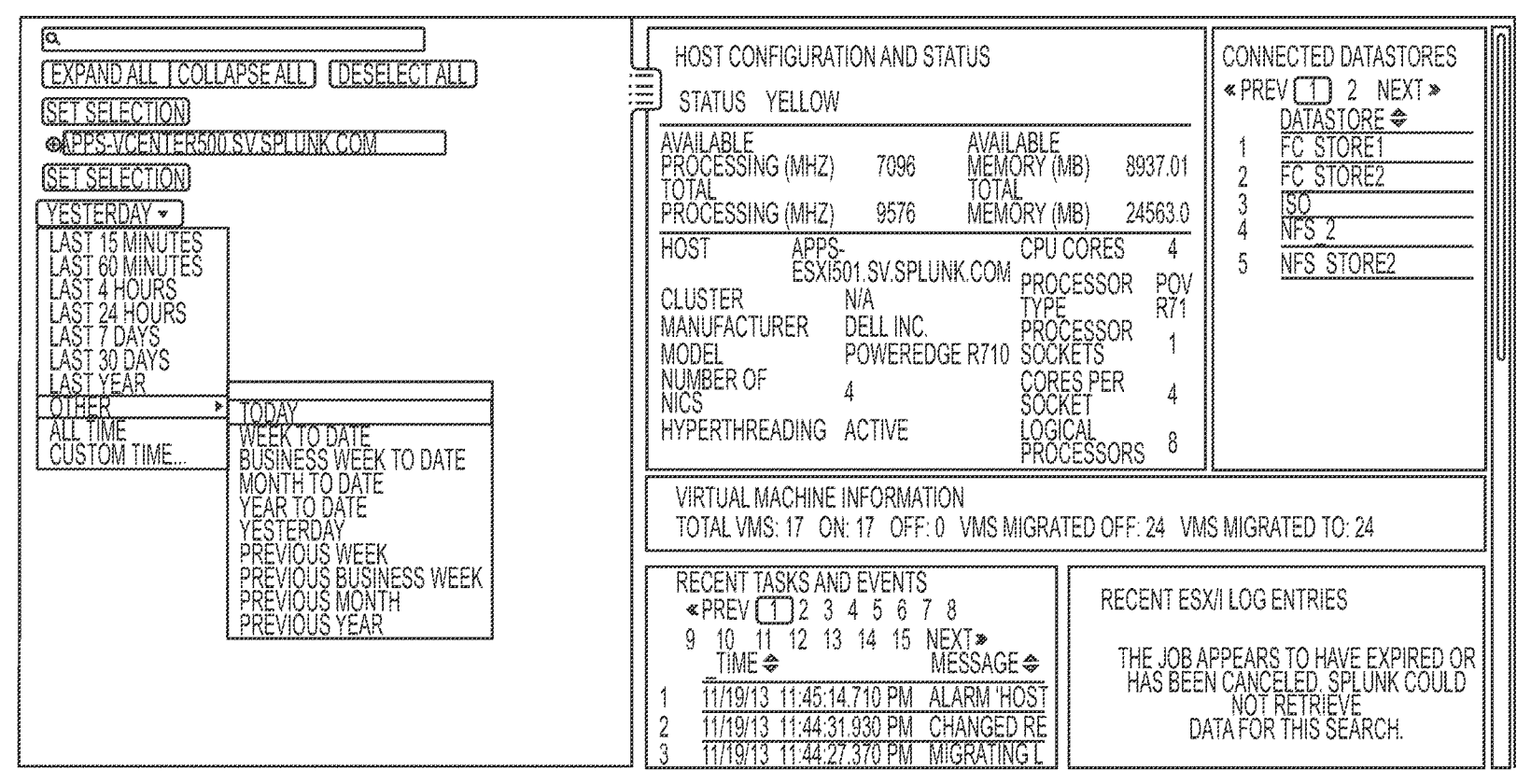

FIGS. 19A-19F illustrates examples of a graphical user interface that enables the selection of a time range as discussed above with respect to block 1820 of FIG. 18. FIG. 19A illustrates the selection of a preset time period. As shown in FIG. 19A, preset time periods that can be selected include: the last 15 minutes, the last 30 minutes, the last 60 minutes, the last 4 hours, the last 24 hours, the last 7 days, the last 30 days, last year, today, week to date, business week to date, month to date, year to date, yesterday, previous week, previous business week, previous month, previous year, and all time (since when performance measurements were first obtained and stored). Also shown in FIG. 19A is the corresponding display of an indication of the retrieved performance measurements that have associated times within the selected time range of block 1845, and indication of the retrieved portions of log data that have associated times within the selected time range of block 1850.

Figure 19B:
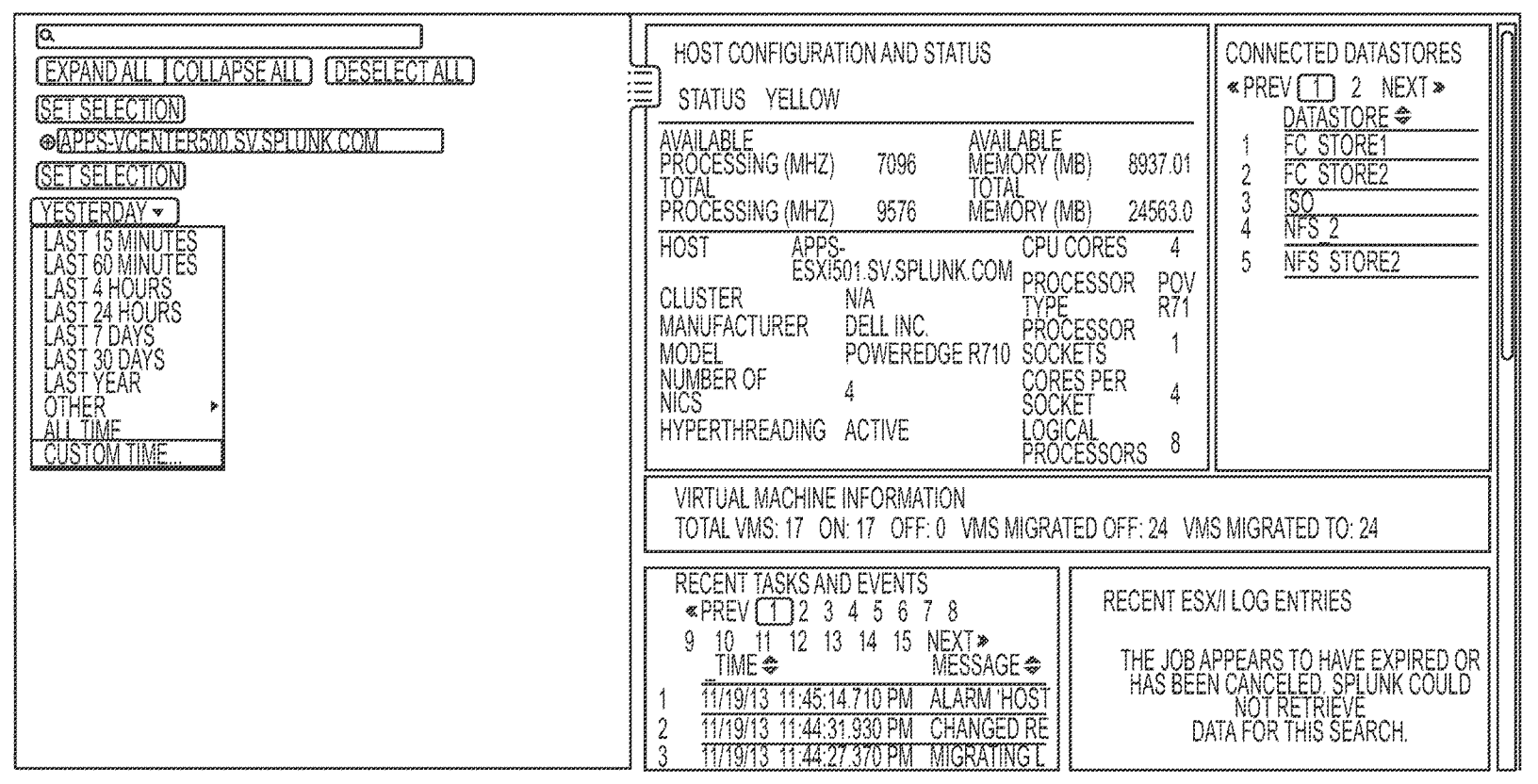

As shown in FIG. 19B, a reviewer, such as reviewer 125, can select a custom time range. When a custom time setting is selected, a custom time range visualization may be presented, as shown in FIGS. 19C-19F. The custom time range visualization allows a reviewer to enter an earliest date for data of a report and a latest date for the data of the report through a variety of methods. A reviewer may enter actual dates to be used to generate the report, a relative time period to be used to generate the report, a time window for which the report is to provide real-time data, and may enter a custom time range by using a search language.

FIG. 19C illustrates one embodiment that allows the reviewer to generate a report by entering a time period by using a search language, such as Splunk Search Processing Language (SPL), as discussed above. The reviewer may enter an earliest time period of the report and a latest time period of the report in the search language, and the custom time range visualization may present the reviewer with the actual dates for the earliest date and latest date. The report will be generated from the entered search language.

As shown in FIG. 19D, a reviewer may request a real-time report that is generated based on the time window entered by the reviewer. The time window entered could be any number of seconds, minutes, hours, days, weeks, months, and/or years. Once the time window is entered, the custom time range visualization may present the reviewer with a search language equivalent of the time window requested. The report will be generated from the time window entered by the reviewer.

A reviewer may also enter a relative time range to generate a report as shown in FIG. 19E. In this embodiment, the reviewer would enter the earliest time desired for the report. The earliest time entered could be any number of seconds, minutes, hours, days, weeks, months, and/or years ago, and the latest time period would be the present. Once the time window is entered, the custom time range visualization may present the reviewer with a search language equivalent of the time range requested. The report will be generated from the relative time range entered by the reviewer.

FIG. 19F illustrates a custom time range visualization that allows a reviewer to enter an earliest time for a time range of the report and a latest time of a time range of the report directly. The reviewer may enter a specific earliest time for the report or request the earliest time to be the earliest date of the data available. The reviewer may also enter the specific latest time for the report or request to use the present. Once entered, the report will be generated based on the times entered.

Figure 20A:
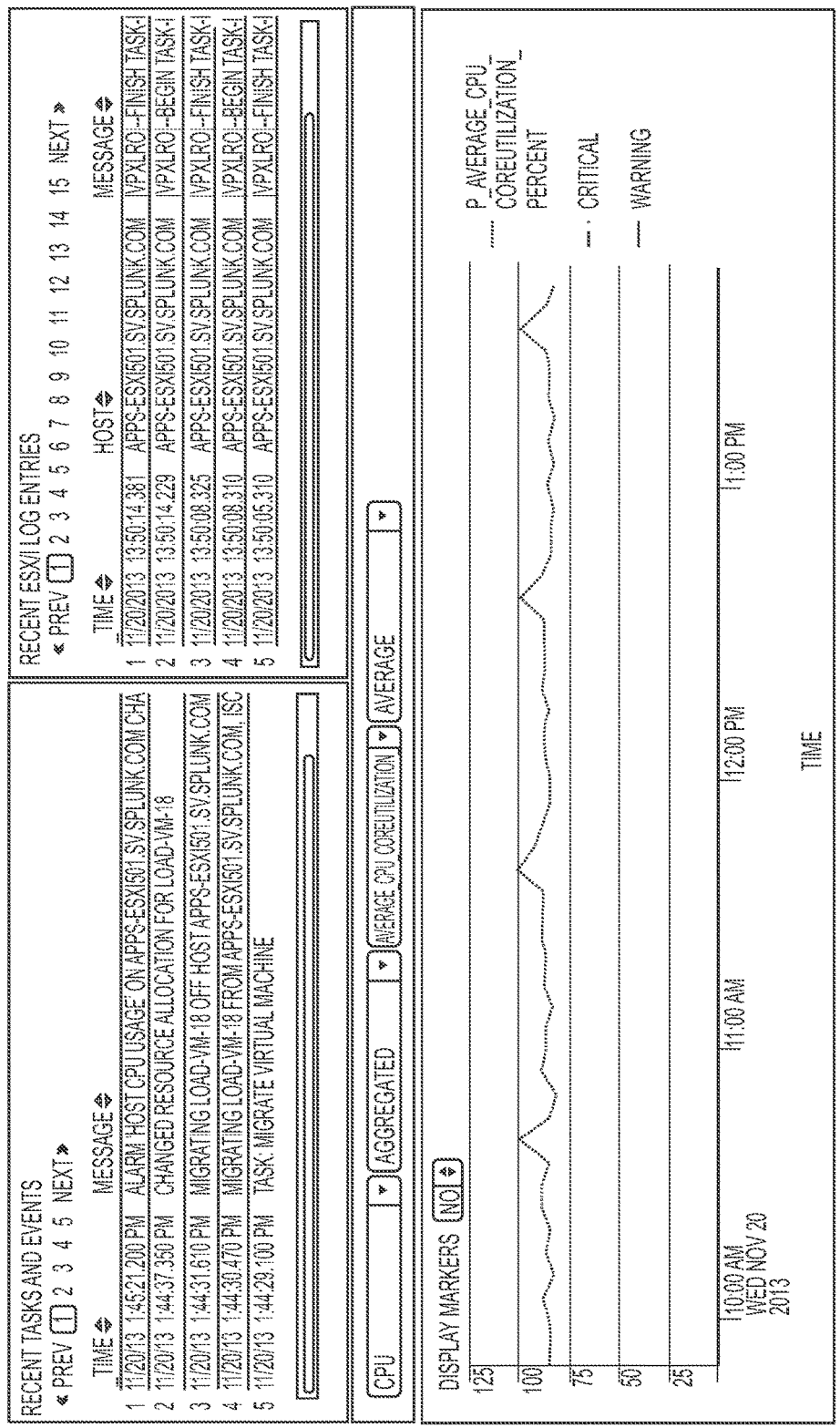
FIGS. 20A-20B illustrate examples of detailed performance measurements and log data that can be presented.
Figure 20B:
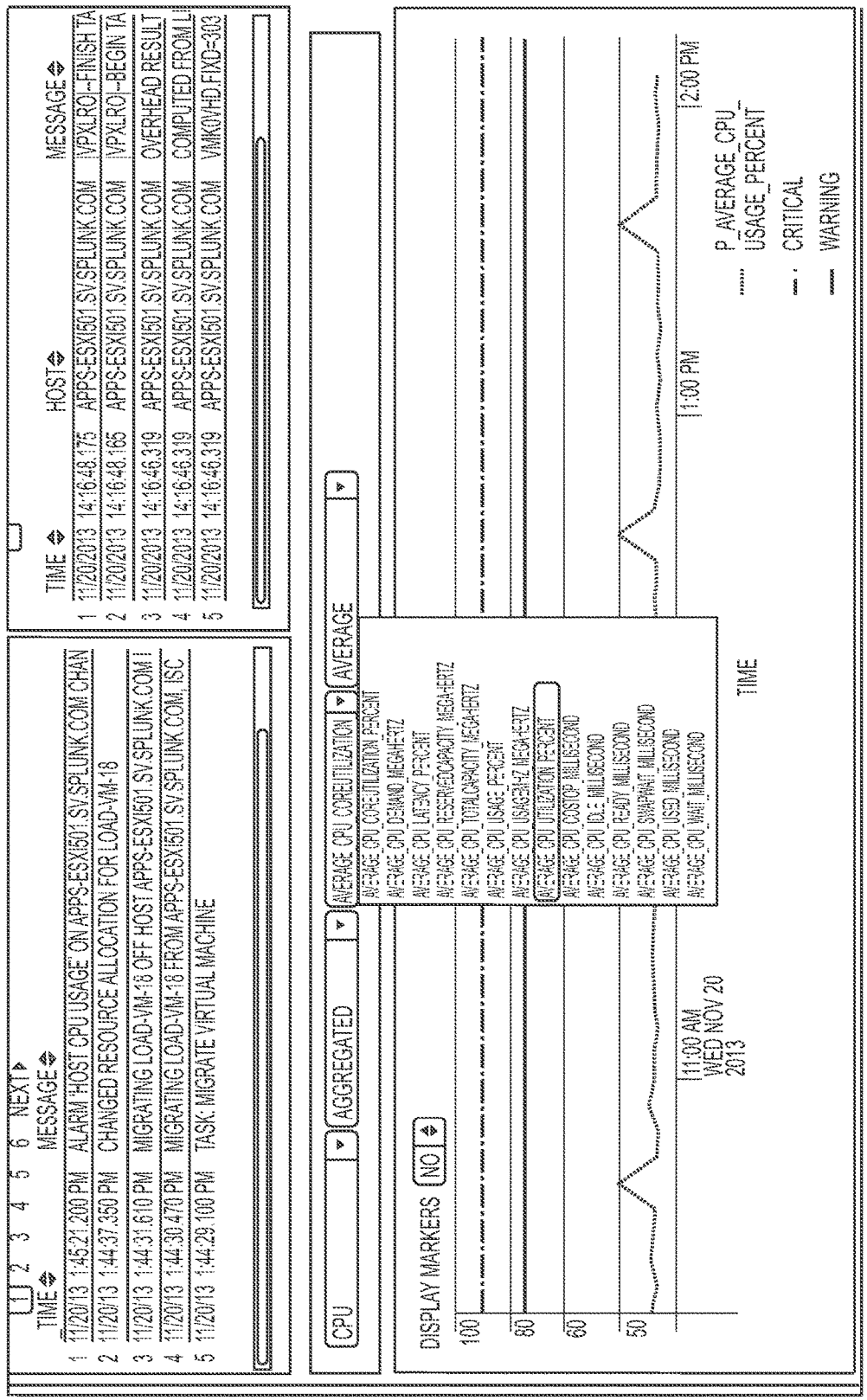

FIGS. 20A and 20B illustrate a display of an indication of a retrieved performance measurements in a same window as an indication of the retrieved portions of log data. In alternative embodiments, the information about the performance measurements and the information about the log data could be displayed in separate windows or could be displayed sequentially rather than concurrently. FIG. 20A illustrates an example where the performance measurements of the set of performance measurements is an average CPU core utilization percent metric. Each of the performance measurements that are retrieved has an associated time that is within the selected time range received. Of course, the performance measurement may be any of the above-mentioned performance metrics. FIG. 20B illustrates an example where the graphical user interface may allow a selection of a type of performance measurement to be retrieved at block 1830 of FIG. 18. If a selection of a type of performance measurement is received, only the one or more performance measurements of the selected type are retrieved.

Figure 21:
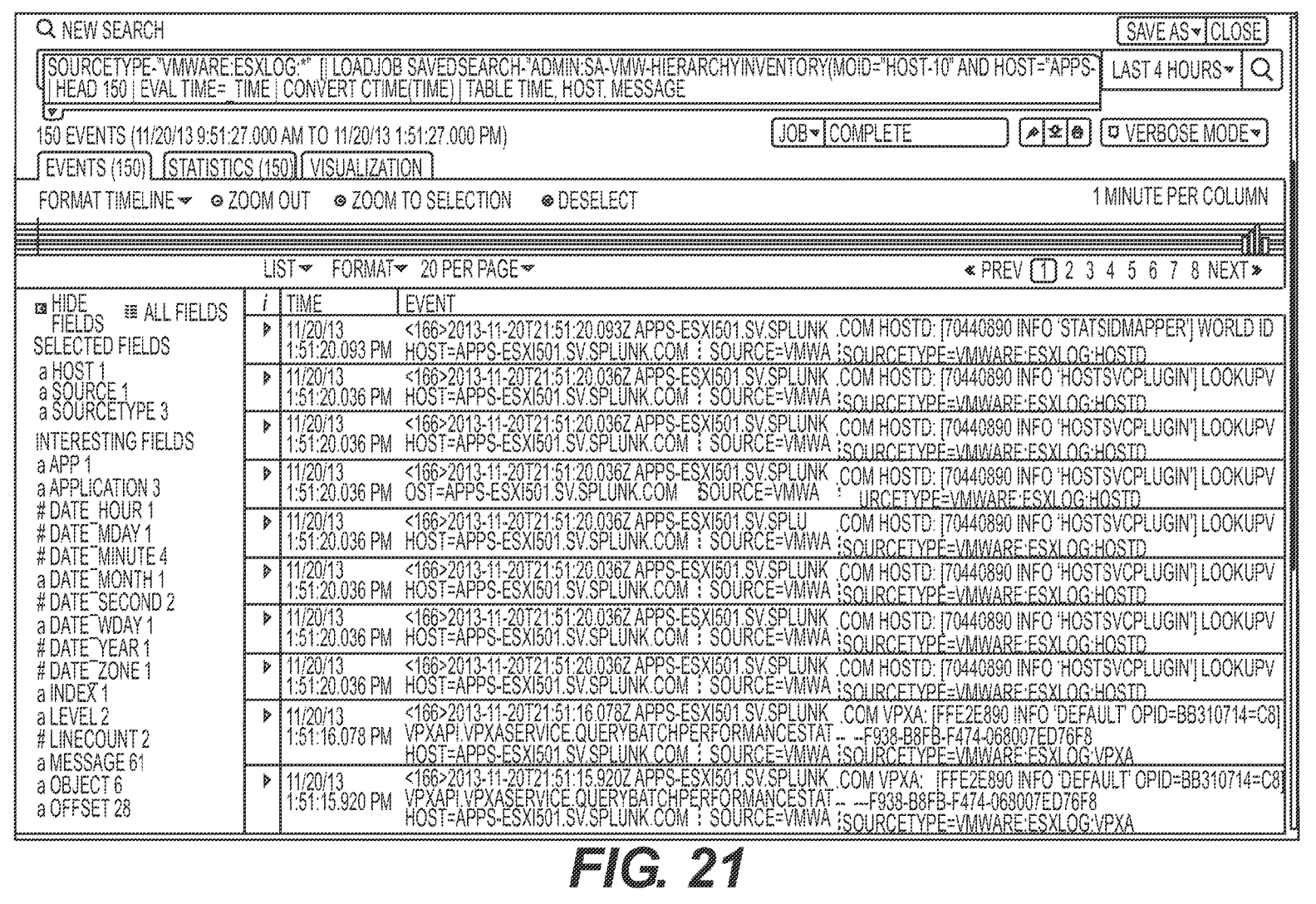

From the display of an indication of a retrieved performance measurements with an indication of the retrieved portions of log data, a reviewer may interact with the display to retrieve the raw log data associated with the portions of log data and performance measurements, as shown in FIG. 21. This allows a reviewer to easily access and view events directly.

hence, as disclosed above, methods and computer-program products are provided for storing a set of performance measurements relating to performance of a component in an IT environment, and associating with the performance measurement a time at which the performance measurement was obtained for each performance measurement in the set of performance measurements. The methods and computer-program products include storing portions of log data produced by the IT environment, wherein each portion of log data has an associated time; providing a graphical user interface enabling selection of a time range; and receiving through the graphical user interface a selection of a time range. The methods and computer-program products further comprise retrieving one or more performance measurements, wherein each of the retrieved performance measurements has an associated time in the selected time range; retrieving one or more portions of log data, wherein each of the retrieved portions of log data has an associated time in the selected time range; displaying an indication of the retrieved performance measurements having their associated times in the selected time range; and displaying an indication of the retrieved portions of log data having their associated times in the selected time range.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus.

The computer readable medium can be a machine readable storage device, a machine readable storage substrate, a memory device, a composition of matter effecting a machine readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a data store management system, an operating system, or a combination of one or more of them, A propagated signal is an artificially generated signal, e.g., a machine generated electrical, optical, or electromagnetic signal, that is generated to encode information for transmission to suitable receiver apparatus.

A computer program (also known as a program, software, software application, script, or code), can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., on or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, architecture provider or reviewer, embodiments of the subject matter described in this specification can be implemented on a computer having a display device, e.g., a CRT (cathode ray tube) to LCD (liquid crystal display) monitor, for displaying information to the user and a keyboard and a pointing device, e.g., a mouse or a trackball, by which the user can provide input to the computer. Other kinds of devices can be used to provide for interaction with a user, architecture provider or reviewer as well; for example, feedback provided to the user can be any form of sensory feedback, e.g., visual feedback, auditory feedback, or tactile feedback; and input from the user, architecture provider or reviewer can be received in any from, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specifics, these should not be construed as limitations on the scope of the invention or of what may be claimed, but rather as descriptions of features specific to particular embodiments of the invention. Certain features that are described in this specification in the context or separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method for improving data analysis of performance of components in an information technology environment, the method comprising:

acquiring, by a computer system, performance measurements for a performance metric, each of the performance measurements indicating an extent of performance of at least one hardware or software component of an information technology (IT) environment at a particular time for the performance metric;

acquiring, by the computer system, log data representing activity of the at least one hardware or software component of the IT environment;

comparing, by the computer system, the performance measurements to a threshold value to determine a portion of the performance measurements having a specified relationship to the threshold value;

correlating, by the computer system, a portion of the log data with at least one of the performance measurements in the portion of the performance measurements having the specified relationship to the threshold value, the correlation based on a correlation criterion; and causing display, via a graphical user interface, of an indication of the portion of the log data and an indication of the at least one of the performance measurements having the specified relationship to the threshold value to indicate performance of the at least one hardware or software component of the IT environment for the performance metric in association with the correlated log data wherein the indications of the correlated portion of log data and the at least one of the performance measurements facilitate determining unsatisfactory performance of a hardware or software component of the information technology (IT) environment and implementing a modification to the IT environment to address the unsatisfactory performance of the hardware or software component.

2. A method as recited in claim 1, further comprising:
causing display of the portion of the log data and the at least one of the performance measurements.

3. A method as recited in claim 1, further comprising:
causing concurrent display of the portion of the log data and the at least one of the performance measurements.

4. A method as recited in claim 1, further comprising:
causing concurrent display of a listing of raw log data from the portion of the log data and the at least one of the performance measurements.

5. A method as recited in claim 1, wherein said correlating is based on a user-specified correlation criterion.

6. A method as recited in claim 1, wherein said correlating is based on a user-specified correlation criterion that is not a time-based criterion.

7. A method as recited in claim 1, wherein said correlating is based on a user-specified correlation criterion that relates to a machine in the IT environment.

8. A method as recited in claim 1 further comprising:
obtaining the correlation criterion from a user input to a graphical user interface element that enables a user to input a search criterion as said correlation criterion but does not enable input of a complete search query.

9. A method as recited in claim 1 further comprising:
obtaining the correlation criterion from a user's selection from a drop-down list in a graphical user interface.

10. A method as recited in claim 1, wherein said correlating is based on the correlation criterion that relates to a machine in the IT environment and is specified by a user's selection from a drop-down list of machines included in the IT environment.

11. A method as recited in claim 1 further comprising, prior to said correlating:
obtaining the correlation criterion from a search query input by a user into a query box in a text-based search query language.

12. A method as recited in claim 1 further comprising storing each of the acquired performance measurements and each of the acquired log data with a time-stamp in a time-series data store wherein said correlating further comprises identifying the portion of the log data and the at least one of the performance measurements that have time stamps that satisfy a user-specified time criterion.

13. A method as recited in claim 1, wherein the performance measurements have been determined by direct measurement of a hardware or software component in the IT environment.

14. A method as recited in claim 1, wherein the log data are derived from a text-based log file.

15. A method as recited in claim 1, wherein the performance measurements are not derived from a log file and are acquired independently of the log data.

16. A method as recited in claim 1, wherein the performance measurements are acquired independently of the log data, and wherein the performance measurements have been determined by direct measurement of a hardware or software component in the IT environment and the log data are derived from a text-based log file.

17. A method as recited in claim 1, wherein the performance measurements are acquired independently of the log data by direct measurement of a hardware or software component in the IT environment, and the log data are acquired independently of the performance measurements.

18. A method as recited in claim 1, wherein acquiring the performance measurements comprises acquiring, via an application programming interface (API), the performance measurements from a third-party software application that collects the performance measurements.

19. A method as recited in claim 1, wherein the performance measurements are stored in a first time-series data store, and the log data are stored in a second time-series data store separate from the first time-series data store.

20. A method as recited in claim 1, wherein the performance measurements are stored in a time-series data store in a first format, and the log data are stored in said time-series data store in a second format different from the first format.

21. A method as recited in claim 1, wherein the performance measurements are stored in a first time-series data store in a first format, and the log data are stored in a second time-series data store separate from the first time-series data store in a second format different from the first format.

22. A method as recited in claim 1, wherein the performance measurements are stored in a first time-series data store in a first format, and the log data are stored in a second time-series data store separate from the first time-series data store in a second format different from the first format;
the method further comprising:
receiving a user-specified search query in a query language for searching the first and second time-series data stores, the user-specified search query containing the correlation criterion;
wherein said correlating further includes, in response to the user-specified search query, searching the first time-series data store for performance data that satisfy the correlation criterion and searching the second time-series data store for log data that satisfy the correlation criterion.

23. A method as recited in claim 1, wherein the performance measurements are stored in a first time-series data store in a first format, and the log data are stored in a second time-series data store separate from the first time-series data store in a second format different from the first format;
the method further comprising:
receiving a user-specified search query in a query language for searching the first and second time-series data stores, the user-specified search query containing the correlation criterion, wherein the correlation criterion comprises a user-specified value or a user-specified range of values, for a user-specified field;

wherein said correlating further includes, in response to the user-specified search query, searching the first time-series data store for performance data that satisfy the correlation criterion and searching the second time-series data store for log data that satisfy the correlation criterion.

24. A method as recited in claim 1, further comprising:
acquiring structure data indicative of structure characteristics of the IT environment;
storing the acquired structure data indicative of structure characteristics of the IT environment; and
correlating a performance characteristic of the IT environment with a structure characteristic of the IT environment, based on the stored performance measurements and stored structure data.

25. A method as recited in claim 1, further comprising:
acquiring structure data indicative of structure characteristics of the IT environment, wherein the structure data is derived from the log data from the IT environment;
storing the acquired structure data indicative of structure characteristics of the IT environment; and
correlating a performance characteristic of the IT environment with a structure characteristic of the IT environment, based on the stored performance measurements and stored structure data.

26. A method as recited in claim 1, wherein the at least one performance metric comprises a performance metric for at least one hardware or software resource of a computer system.

27. A method as recited in claim 1, wherein the at least one performance metric comprises a performance metric for at least one virtual machine or virtual machine host.

28. A method as recited in claim 1, wherein the at least one performance metric comprises a performance metric for a virtual machine cluster.

29. A non-transitory machine-readable storage medium for use in a processing system of a data intake and query system, the non-transitory machine-readable storage medium storing instructions, an execution of which in the processing system causes the processing system to perform operations comprising:
acquiring, by a computer system, performance measurements a performance metric, each of the performance measurements indicating an extent of performance of at least one hardware or software component of an information technology (IT) environment at a particular time for the performance metric;
acquiring, by the computer system, log data representing activity of the at least one hardware or software component of the IT environment;
comparing, by the computer system, the performance measurements to a threshold value to determine a portion of the performance measurements having a specified relationship to the threshold value;
correlating, by the computer system, a portion of the log data with at least one of the performance measurements in the portion of the performance measurements having the specified relationship to the threshold value, the correlation based on a correlation criterion; and
causing display, via a graphical user interface, of an indication of the portion of the log data and an indication of the at least one of the performance measurements having the specified relationship to the threshold value to indicate performance of the at least one hardware or software component of the IT environment for the performance metric in association with the correlated log data wherein the indications of the correlated portion of log data and the at least one of the performance measurements facilitate determining unsatisfactory performance of a hardware or software component of the information technology (IT) environment and implementing a modification to the IT environment to address the unsatisfactory performance of the hardware or software component.

30. A system comprising:
a communication device through which to communicate on a computer network; and
at least one processor operatively coupled to the communication device and configured to perform operations including
acquiring, by a computer system, performance measurements for a performance metric, each of the performance measurements indicating an extent of performance of at least one hardware or software component of an information technology (IT) environment at a particular time for the performance metric;
acquiring, by the computer system, log data representing activity of the at least one hardware or software component of the IT environment;
comparing, by the computer system, the performance measurements to a threshold value to determine a portion of the performance measurements having a specified relationship to the threshold value;
correlating, by the computer system, a portion of the log data with at least one of the performance measurements in the portion of the performance measurements having the specified relationship to the threshold value, the correlation based on a correlation criterion; and
causing display, via a graphical user interface, of an indication of the portion of the log data and an indication of the at least one of the performance measurements having the specified relationship to the threshold value to indicate performance of the at least one hardware or software component of the IT environment for the performance metric in association with the correlated log data wherein the indications of the correlated portion of log data and the at least one of the performance measurements facilitate determining unsatisfactory performance of a hardware or software component of the information technology (IT) environment and implementing a modification to the IT environment to address the unsatisfactory performance of the hardware or software component.

* * * * *